United States Patent [19]

Morikawa et al.

[11] Patent Number: 5,528,285
[45] Date of Patent: Jun. 18, 1996

[54] TV TELEPHONE SYSTEM WHICH SENDS AND RECEIVES IMAGE DATA TO ANOTHER TV TELEPHONE SYSTEM AND HAVING POWER SUPPLY AND IMAGE DISPLAY CONTROL

[75] Inventors: Shigenori Morikawa, Kokubunji; Akihiro Tsukamoto, Hamura, both of Japan

[73] Assignee: Casio Computer Co., Ltd., Tokyo, Japan

[21] Appl. No.: 232,771

[22] Filed: Apr. 25, 1994

[30] Foreign Application Priority Data

| Apr. 30, 1993 | [JP] | Japan | 5-128285 |
| Jun. 1, 1993 | [JP] | Japan | 5-156049 |
| Jun. 8, 1993 | [JP] | Japan | 5-163965 |
| Jul. 13, 1993 | [JP] | Japan | 5-195374 |

[51] Int. Cl.⁶ .................................................. H04N 7/10
[52] U.S. Cl. ................................................ 348/14; 379/96
[58] Field of Search ............................. 379/96–99, 93, 379/90, 110, 53; 348/14–20

[56] References Cited

U.S. PATENT DOCUMENTS

| 4,336,524 | 6/1982 | Levine . | |
| 4,387,271 | 6/1983 | Artom . | |
| 4,560,833 | 12/1985 | Weber et al. . | |
| 4,928,300 | 5/1990 | Ogawa et al. ............................ | 348/14 |
| 5,189,691 | 2/1993 | Dunlap . | |

FOREIGN PATENT DOCUMENTS

| 0500091 | 8/1992 | European Pat. Off. . | |
| 4225741 | 9/1993 | Germany . | |
| 1-20740 | 1/1989 | Japan . | |
| 1-5276 | 1/1989 | Japan ..................................... | 379/53 |
| 1-132261 | 5/1989 | Japan ..................................... | 379/53 |
| 2-39693 | 2/1990 | Japan . | |
| 2-105753 | 4/1990 | Japan ..................................... | 379/53 |
| 2206767 | 1/1989 | United Kingdom . | |

OTHER PUBLICATIONS

C. Colby, "Build this video telephone", Radio Electronics, Mar. 1991, pp. 33–37, 42.
Communications Report, Nikkei Communications, Jan. 12, 1987, pp. 48–50.
Net Nachrichten Elektronik Unk Telematik, vol. 44, No. 3, Mar. 1990, Heidelberg, DE, pp. 80–81, XP000102792; Michael Winter, "Kompreimierung Ohne Kompromisse" (The Whole Document).
I.E.E.E. Journal On Selected Areas In Communications, vol. SAC-4, No. 4, Jul. 1986, New York, NY, pp. 633–639, *FIG. 7* XP000313573; Hans–Jurgen Mosel "Home Communication Systems".
I.E.E.E. Global Telecommunications Conference & Exhibition, vol. 1, 28 Nov. 1988, Hollywood, Florida, pp. 32–36, XP000044908; Komiya Et Al, "An Approach To The Multifunction Graphic Terminal For The ISDN Environment" *FIG. 6*.

*Primary Examiner*—Wing F. Chan
*Attorney, Agent, or Firm*—Frishauf, Holtz, Goodman, Langer & Chick

[57] ABSTRACT

Disclosed is a TV telephone system that comprises a TV telephone apparatus, which includes image pickup means, display means and an input/output port to connect to another apparatus, and a station, which includes a modulation/demodulation section to connect to a telephone line and an input/output port to connect to the TV telephone apparatus, whereby when the TV telephone apparatus is connected to the station, an image is exchanged therebetween over a telephone line using the image pickup means and display means of the TV telephone apparatus.

10 Claims, 50 Drawing Sheets

ONE FRAME OF MULTIPLEXED CODE

TV TELEPHONE SYSTEM WHICH SENDS AND RECEIVES IMAGE DATA TO ANOTHER TV TELEPHONE SYSTEM AND HAVING POWER SUPPLY AND IMAGE DISPLAY CONTROL

BACKGROUND OF THE INVENTION

1. Field of the Invention

The present invention relates to a television telephone apparatus.

2. Description of the Related Art

According to the recent development of highly information-oriented society, there is an increasing demand for communication media by which a vast amount of various types of information are transmitted fast. To fulfill such a demand in Japan, the "analog telephone band still picture video communication system" was established in 1988 as a standard communication system to allow for communication of a monochromatic image between parties over a communication line. The standards was amended in 1989 so that a color image as well as a monochromatic image can be exchanged. Various television (TV) telephone apparatuses which conform to those standards have been developed so far. The TV telephone apparatuses are expected to become popular because of their advantages that visual information can be sent to cover voice-based information or explanation which is often difficult to consume or visualize and that telephone communication is possible while watching the caller's or receiver's expressions.

TV telephone apparatuses are classified by types of communication networks to be linked and the types of image and voice transmission functions. For example, some TV telephone apparatuses are connected to an analog public telephone line to transmit a monochromatic still picture or a color still picture, or to transmit a color dynamic image. The still-picture TV telephone apparatus, which is connected to an analog public telephone line to send a monochromatic still picture, employs a system for directly transmitting image data without compression. For monochromatic image data of 64 gray scales (6 bits) with one screen consisting of 100×160 pixels, for example, data of about 100×160×6= 96000 bits (about 11.7 Kbytes) has been transmitted at a transfer rate of about 8740 bps (bit per second). This takes about 11 seconds to send one screen of image data.

Image data carries a large amount of information so that direct processing of image data is not practical in view of memory capacity, communication speed and so forth. As a solution, there has been proposed a color dynamic-image TV telephone apparatus which compresses image data and voice data to about 1/20 to 1/100 before transmission to thereby ensure transmission and reception of a dynamic image at a rate of two to ten frames per second using an analog telephone band.

As the compressed transmission of image data will transfer a considerable amount of data, a slight transmission delay will not affect the progression of telephone communication so much. Therefore, variable length coding (e.g., variable length coding system which conforms to H. 261 of the CCITT (Comité Consultatif International Télégraphique et Téléphonique) regulations) is typically employed.

In compressed transmission of voice data, digitalization of voice data can compress the length of the average produced bits. Generally speaking, if entropy compression (e.g., Hoffman coding) which does not guarantee the maximum bit length is adapted for voice signals, a large transmission delay of voice signals occurs when voice signals are converted to a long bit length by the entropy compression. This would greatly affect the progression of telephone communication. In this respect, voice data is encoded with a fixed bit length before transmission.

TV telephone apparatuses, which are connected to such an analog communication network, have a communication function to transmit/receive image data and voice data in multiplexed form. A communication protocol corresponding to the communication networks to be linked and a coding system for image data and voice data, which are affixed to a protocol-based communication signal for transmission/reception, are specified for each type of communication network by the CCITT regulations, etc.

The conventional TV telephone apparatuses generally have an integrated telephone function and therefore become inevitably large.

Liquid crystal (LC) televisions recently become popular and are installed on vehicles or used to watch TV programs, such as sport programs. Pocket-size LC televisions have been developed so that users can watch TV programs any time on their ways to offices or on business trips.

Telephones are often used outside offices, but they of course permit only voice communication.

In the conventional TV telephone apparatus which compresses image data and voice data before transmission, a camera as an image input/output unit, a CRT (Cathode Ray Tube) as an image display unit, and a telephone as a voice input/output unit are designed as one integrated unit to transmit compressed data. It is therefore difficult to provide compact and light portable TV telephone apparatuses. Further, the existing telephones cannot be used in such a TV telephone apparatus. In other words, the convention TV telephone apparatuses have been designed as non-portable so that, once the apparatuses are installed, it is hard to move them around and use them at any desired location.

The image quality of liquid crystal display (LCD) devices has been improved and are expected as a replacement of CRT. The use of the LCD device will contribute to a reduction of consumed power and will ensure compact and light TV telephone apparatuses. The telephone function may be designed separable from the TV telephone apparatuses so that those apparatuses become more compact and lighter. In addition, it is unreasonable that a person, if carrying an LC television that can show a dynamic image, is restricted to transmit only voices at time of using a telephone.

The conventional TV telephone apparatuses, even if designed compact and light, still require a troublesome connection of various input/output (I/O) terminals, a power terminal, etc. every time they are used as TV telephones. In particular, in a case that a TV telephone apparatus whose portability is important is likely to be carried out often, it is quite troublesome since the user should disconnect the I/O terminals, etc. when carrying the apparatus out, and should connect them again when using it. In addition, it is necessary to charge the battery of the TV telephone apparatus occasionally, and connect a full-charged or additional battery for a long time transmission/reception. This makes the conventional TV telephone apparatus further troublesome. As various I/O terminals, a power terminal, etc. should be connected upon every usage, persons who are not familiar with such connection will not easily make such connections. In other words, the conventional TV telephone apparatus is not user friendly.

SUMMARY OF THE INVENTION

It is therefore an object of the present invention to provide a TV telephone apparatus, which is compact and light to be portable and will ensure transmission/reception of high-quality images without requiring connection of every one of terminals, such as various I/O terminals and a power terminal.

According to an aspect of the present invention, there is provided a TV telephone system comprising a TV telephone apparatus including image pickup means, display means and an input/output port to connect to another apparatus; and a station including a modulation/demodulation section to connect to a telephone line and an input/output port to connect to the TV telephone apparatus, whereby when the TV telephone apparatus is connected to the station, an image is transmitted and received over a telephone line using the image pickup means and display means of the TV telephone apparatus.

According to another aspect of the present invention, there is provided a TV telephone system that comprises a TV telephone apparatus, which includes a modulation/demodulation section to connect to a telephone line, image pickup means, display means, an input/output port to connect to another apparatus and a power input terminal; and a station, which includes an input/output port to connect to the TV telephone apparatus and a power output terminal whereby the station is electrically connected to the TV telephone apparatus, and supplies power to the TV telephone apparatus. When TV telephone apparatus is connected to the station or a telephone line, an image is transmitted and received over a telephone line using the image pickup means and display means of the TV telephone apparatus.

According to a still another aspect of the present invention, there is provided a TV telephone system that comprises a TV telephone apparatus, which includes image pickup means, display means, a modulation/demodulation section to connect to a telephone line, and an input/output port to connect to another apparatus; and a station, which includes image pickup means, display means, a modulation/demodulation section to connect to a telephone line, an input/output port to connect to the TV telephone apparatus and a connecting terminal to connect to a telephone, whereby the station is electrically connected to the TV telephone apparatus and the telephone. When TV telephone apparatus is connected to the station or a telephone line, an image is transmitted and received over a telephone line using the image pickup means and display means of the TV telephone apparatus, and the station executes transmission and reception of an image over the telephone line using the image pickup means and display means of the station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

First Embodiment

Second Embodiment

Figure 14:
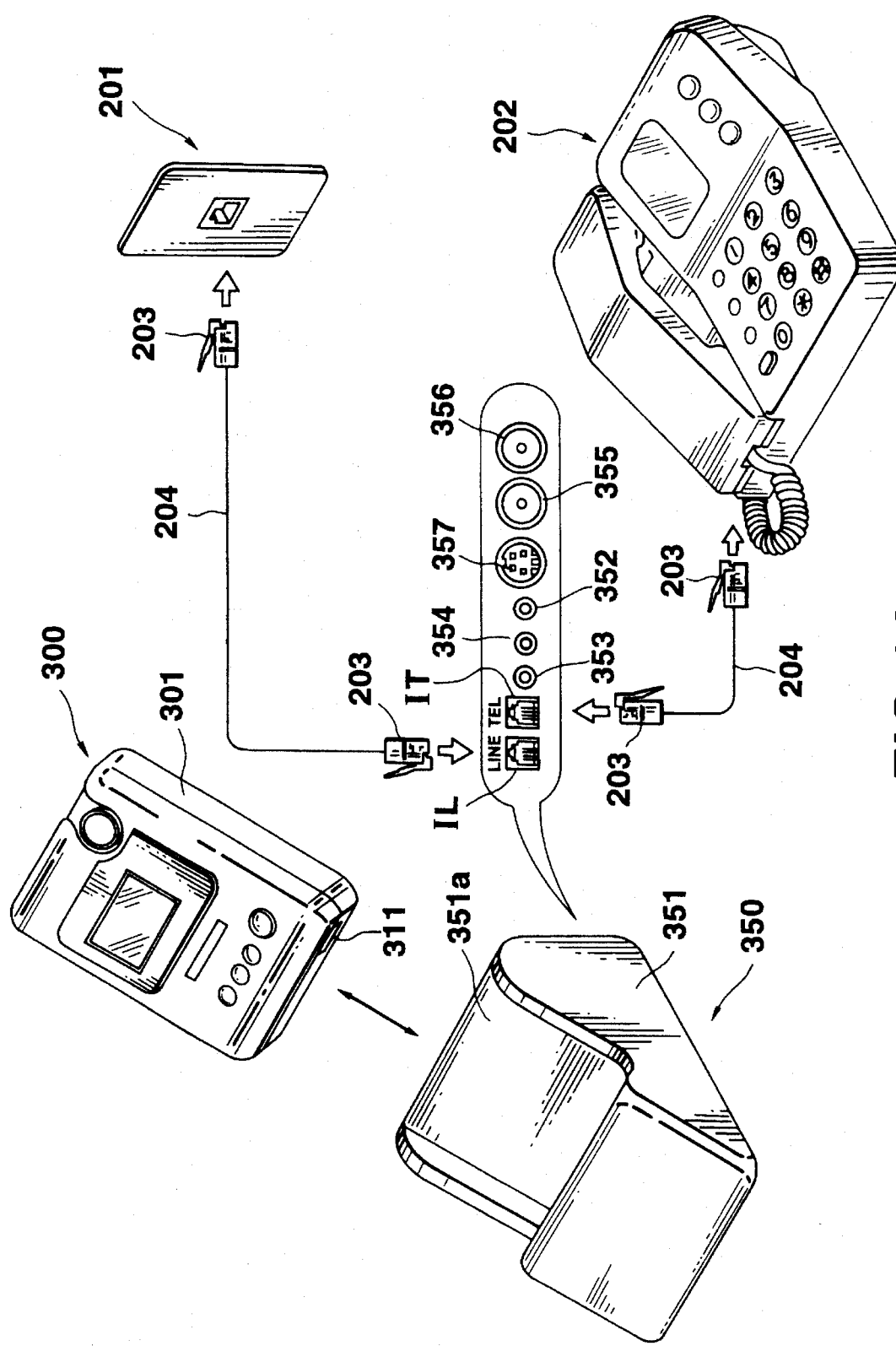
Figure 15:
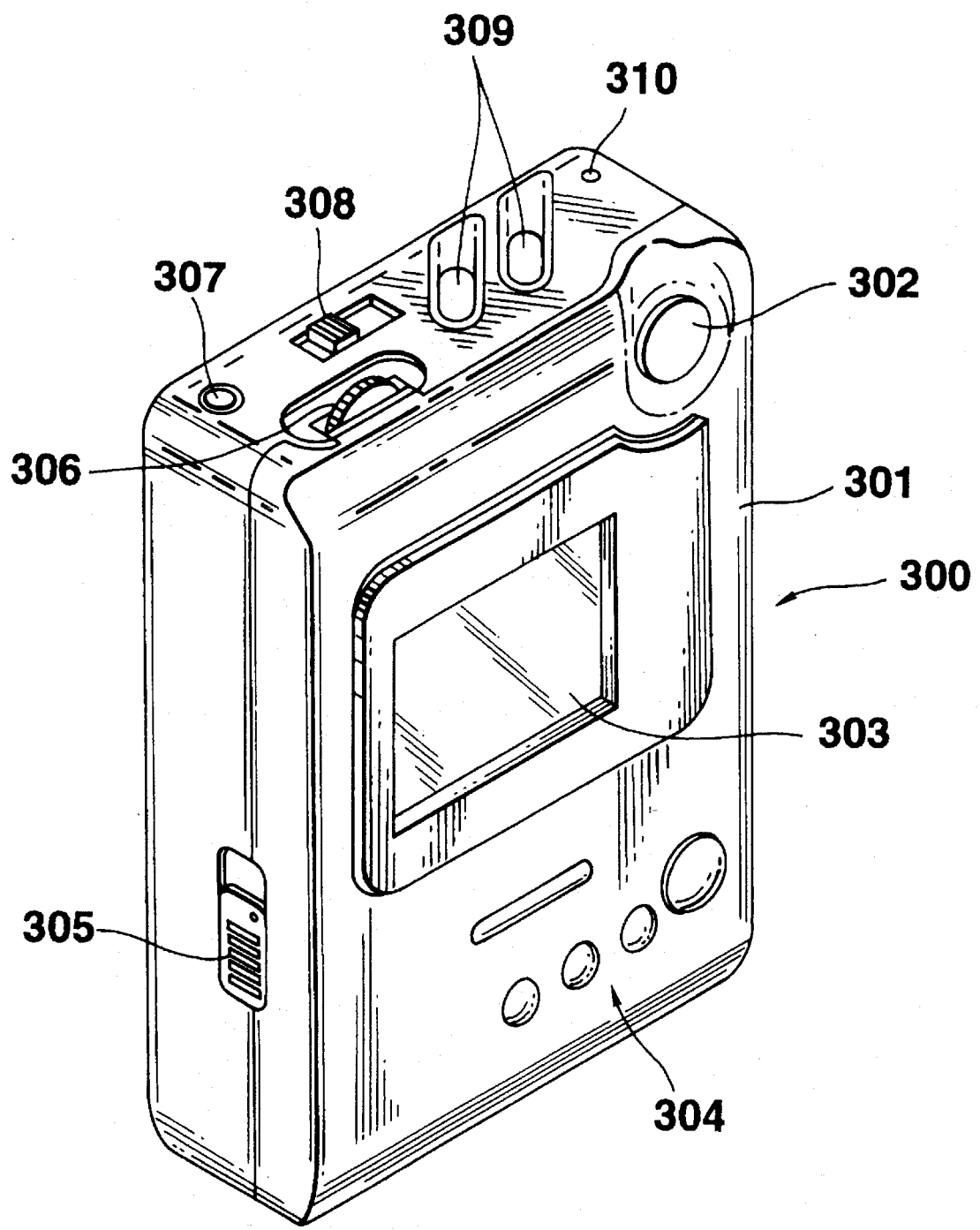
Figure 16:
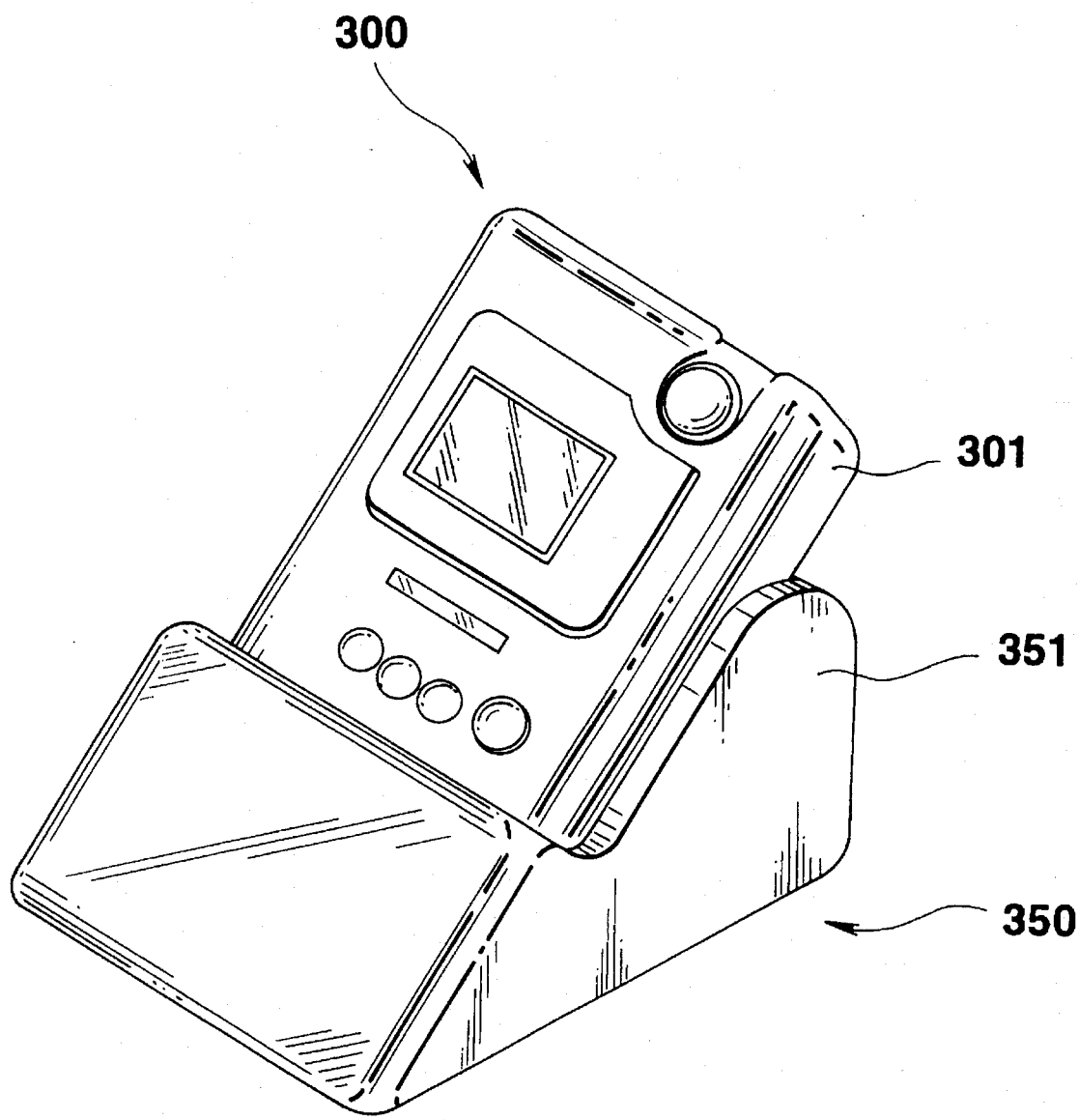

FIG. 14 is a diagram showing the connection of a pocket type telephone apparatus equipped with a TV telephone station;

FIG. 15 is a perspective view of the pocket type telephone apparatus equipped with the TV telephone station in FIG. 14; and FIG. 16 is a diagram showing the pocket type telephone apparatus mounted on the TV telephone station.

Third Embodiment

Figure 17:
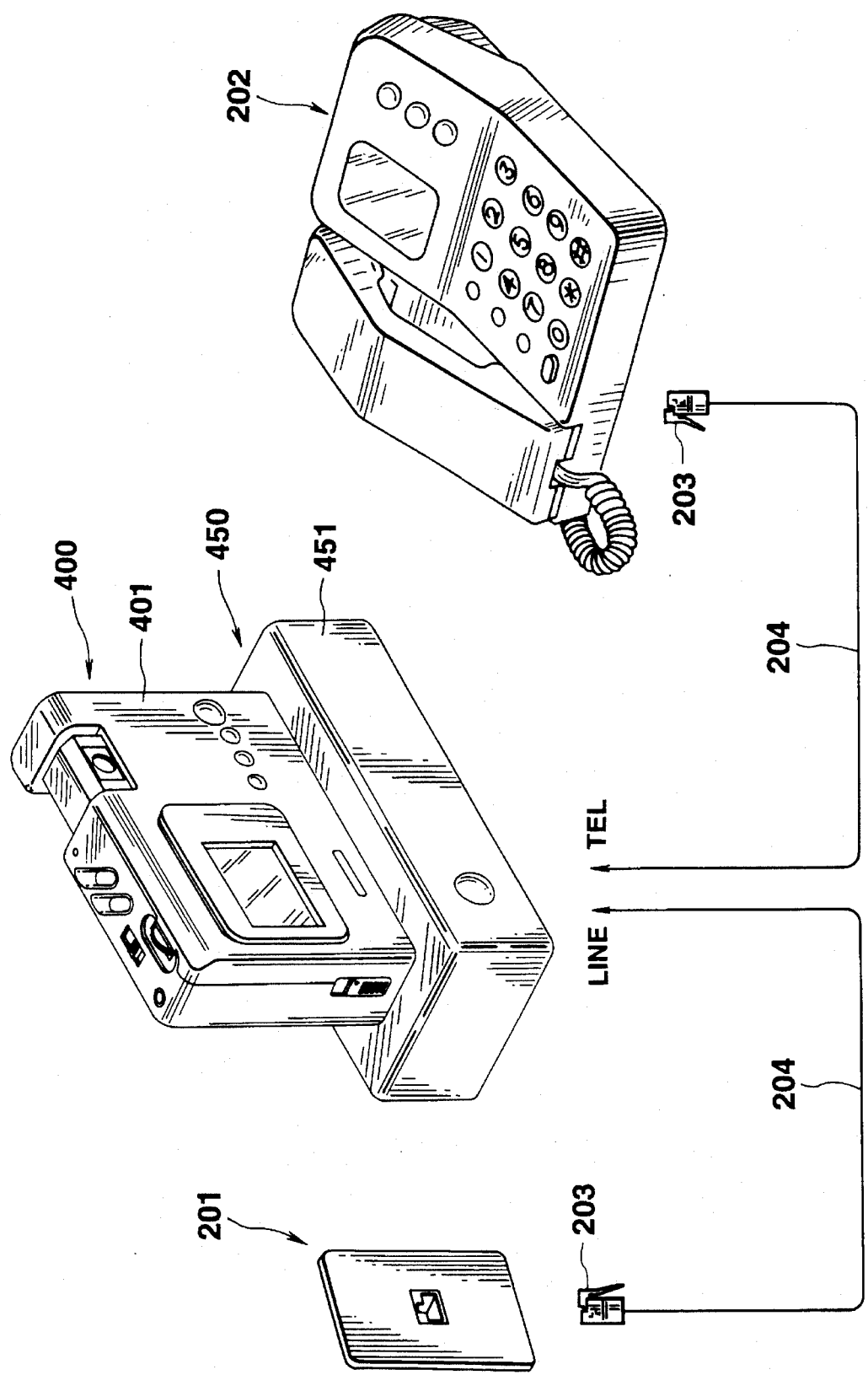
Figure 18:
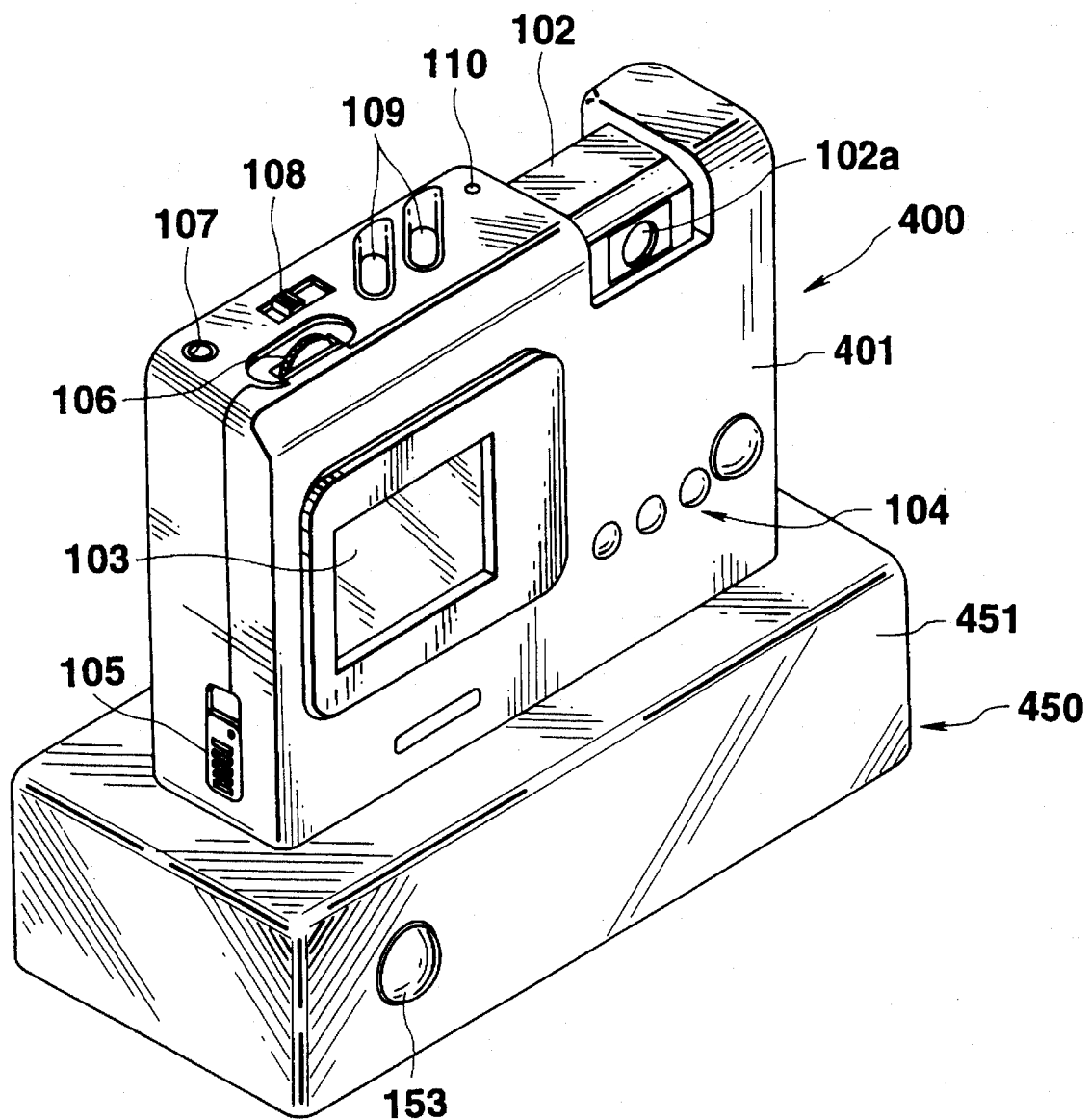
Figure 19:
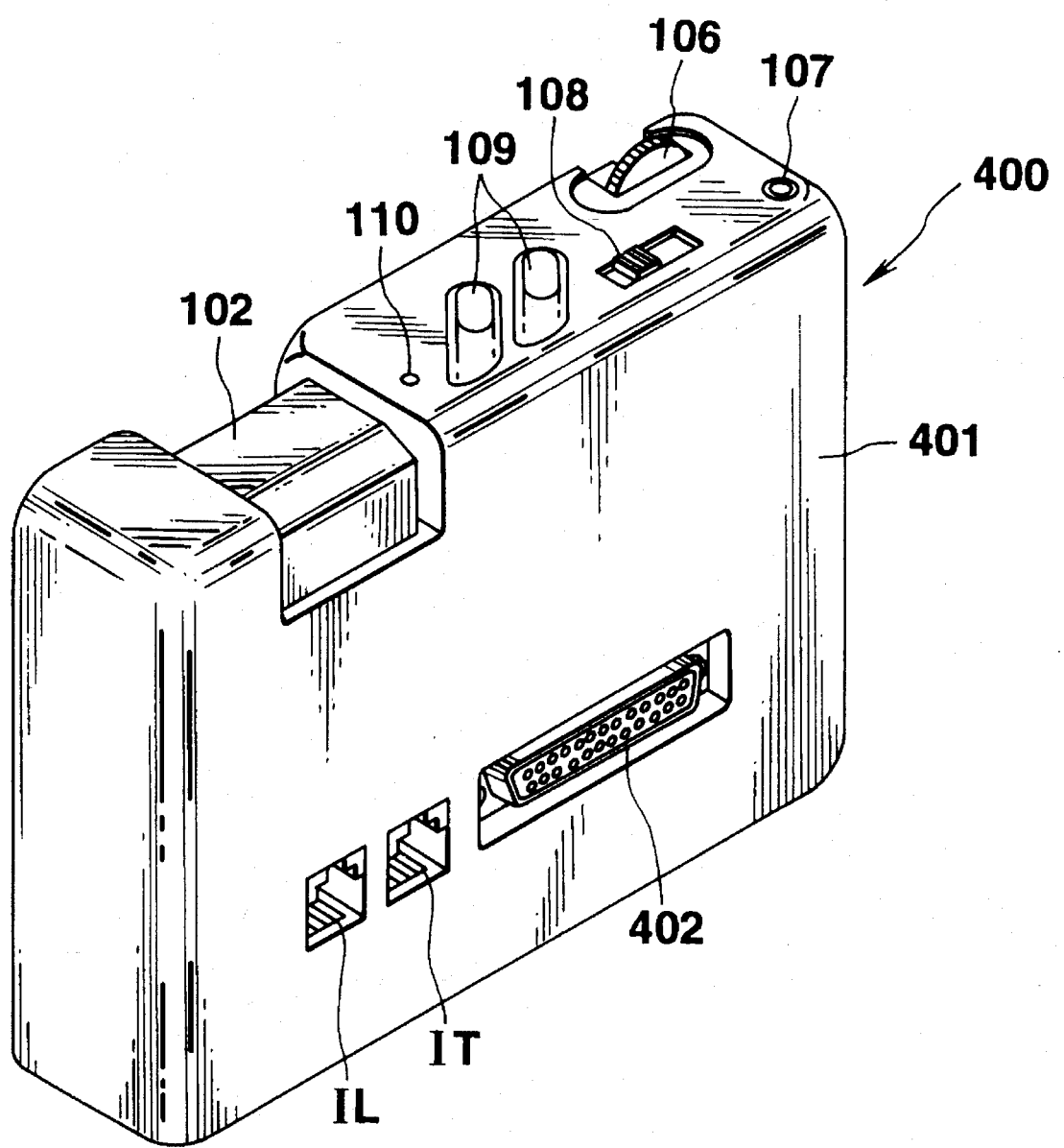
Figure 20:
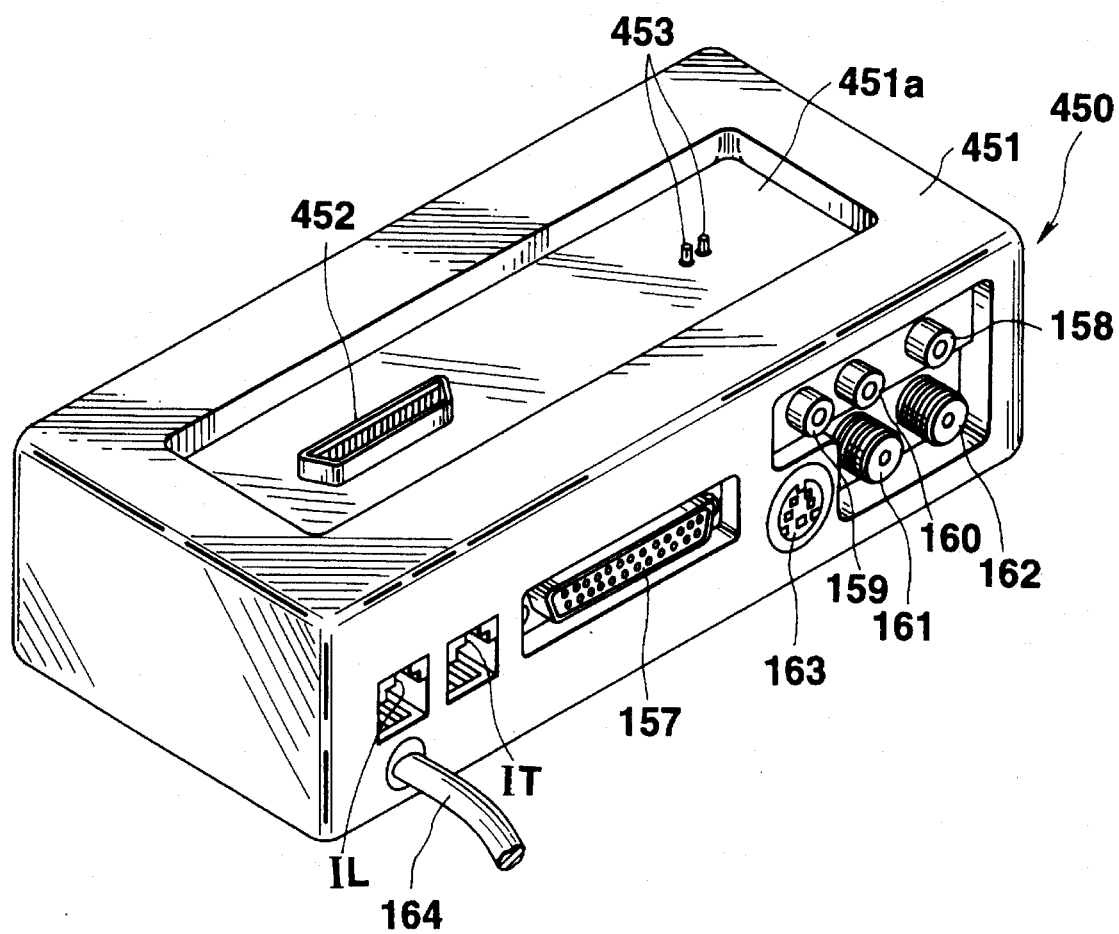
Figure 21:
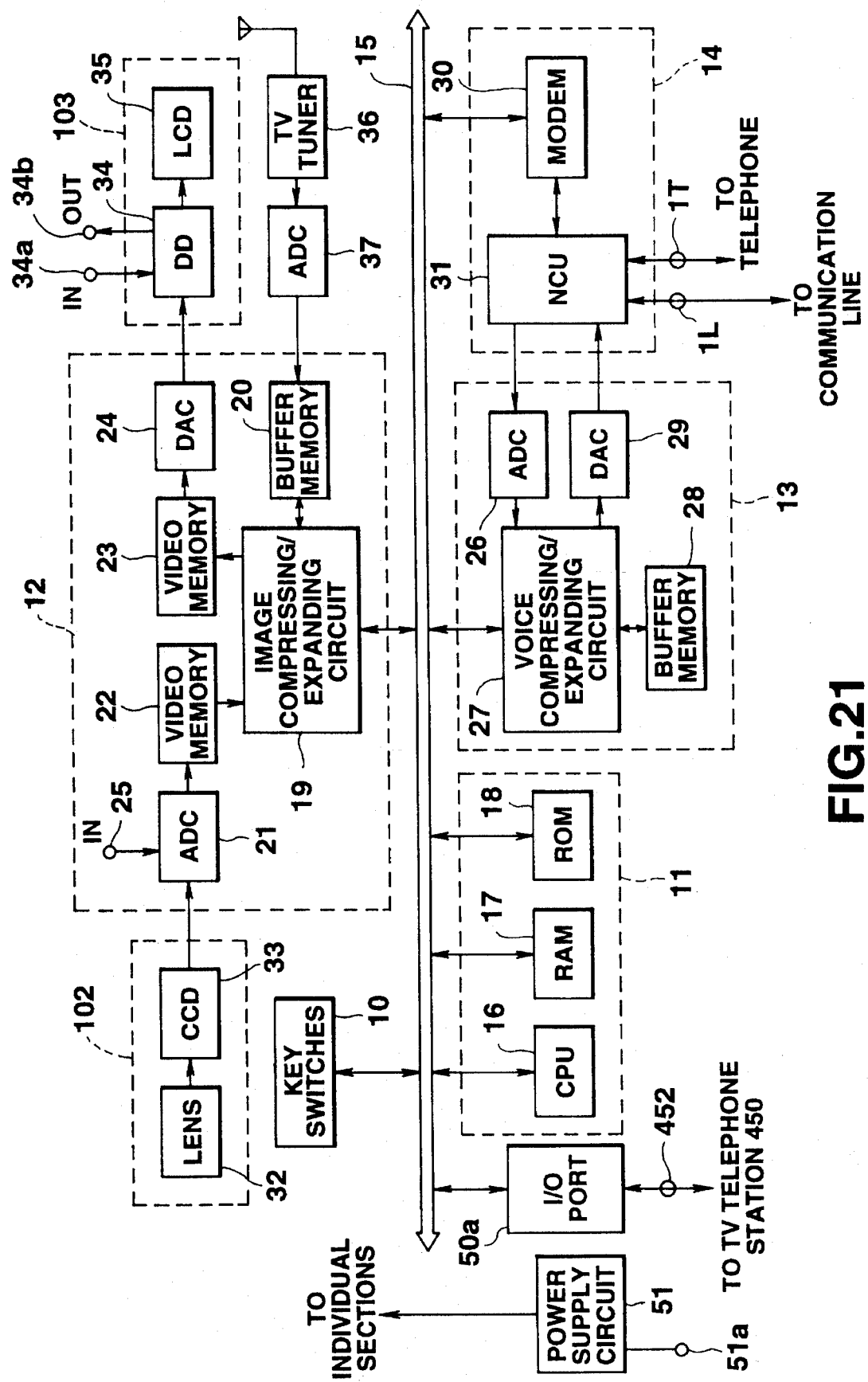
Figure 22:
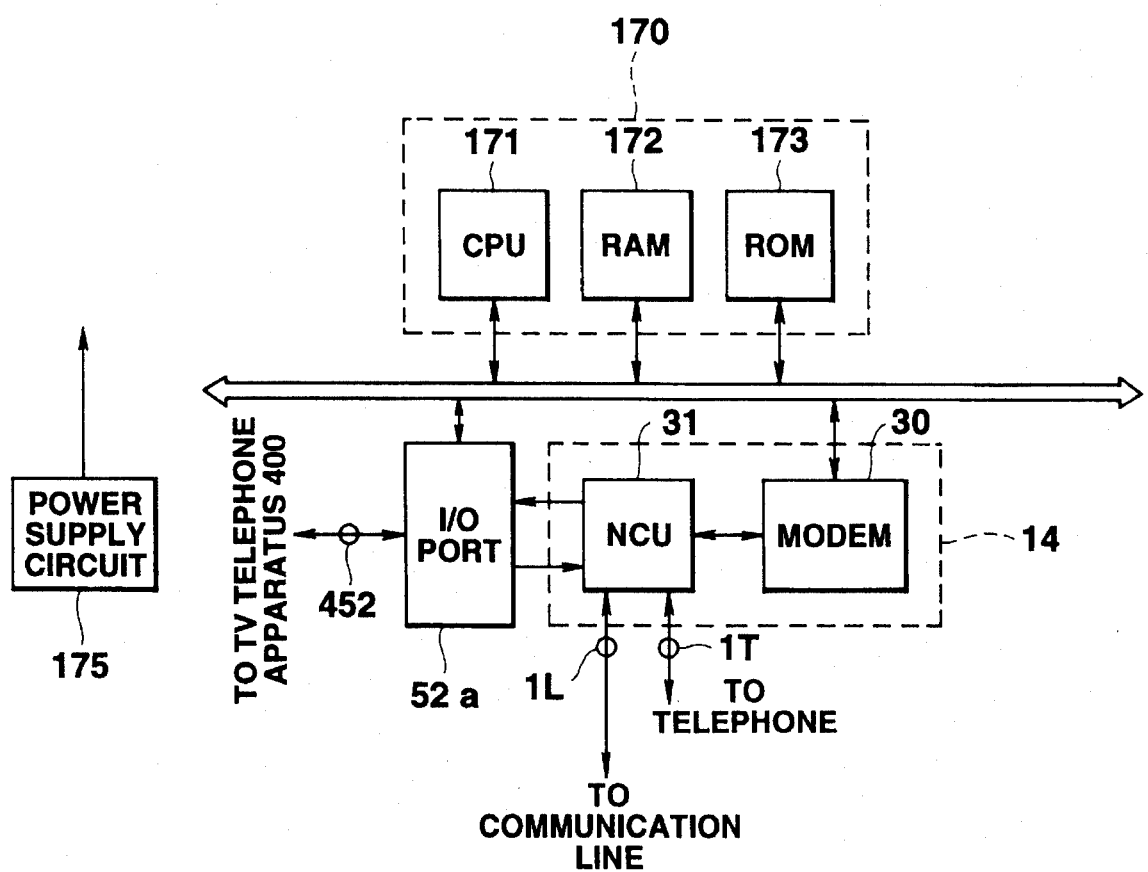

FIG. 17 is a diagram showing the connection of a TV telephone apparatus equipped with a TV telephone station;

FIG. 18 is a perspective view of the TV telephone apparatus equipped with the TV telephone station in FIG. 17;

FIG. 19 is a perspective view showing the TV telephone apparatus in FIG. 18 from the rear side;

FIG. 20 is a perspective view showing the TV telephone station in FIG. 18 from the rear side;

FIG. 21 is a block diagram showing the general structure of the TV telephone apparatus; and FIG. 22 is a block diagram showing the general structure of the TV telephone station.

Fourth Embodiment

Figure 23:
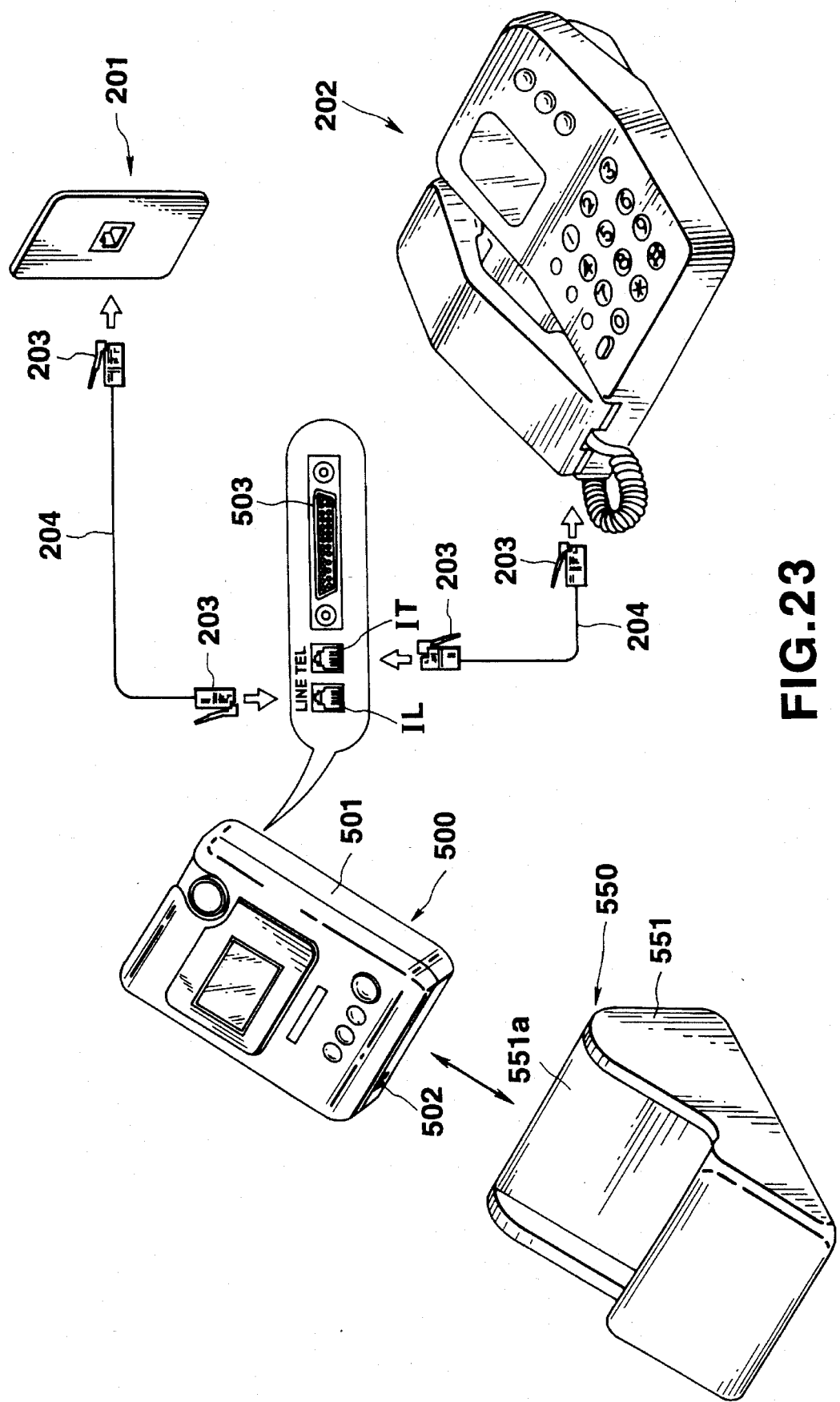
Figure 24:
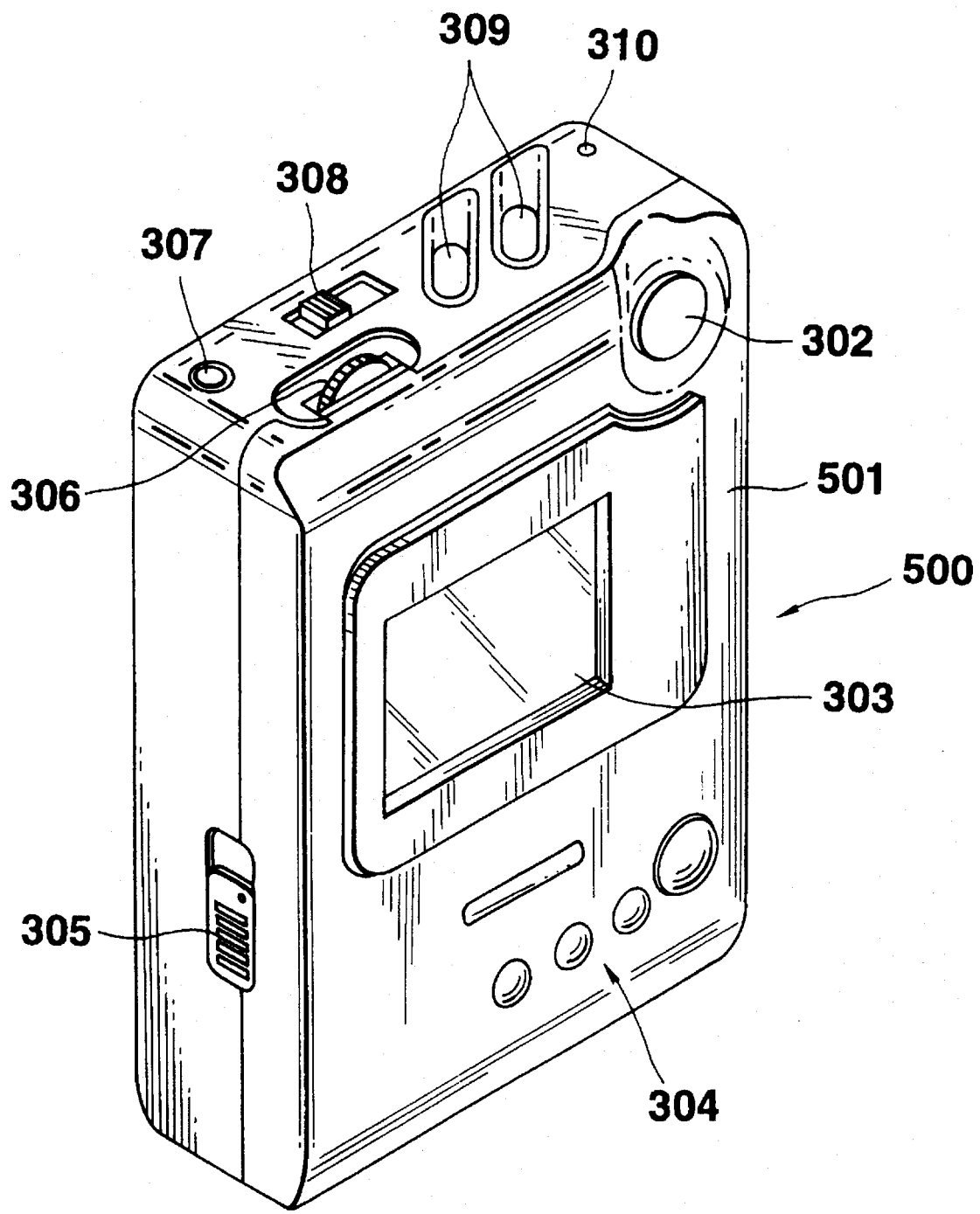
Figure 25:
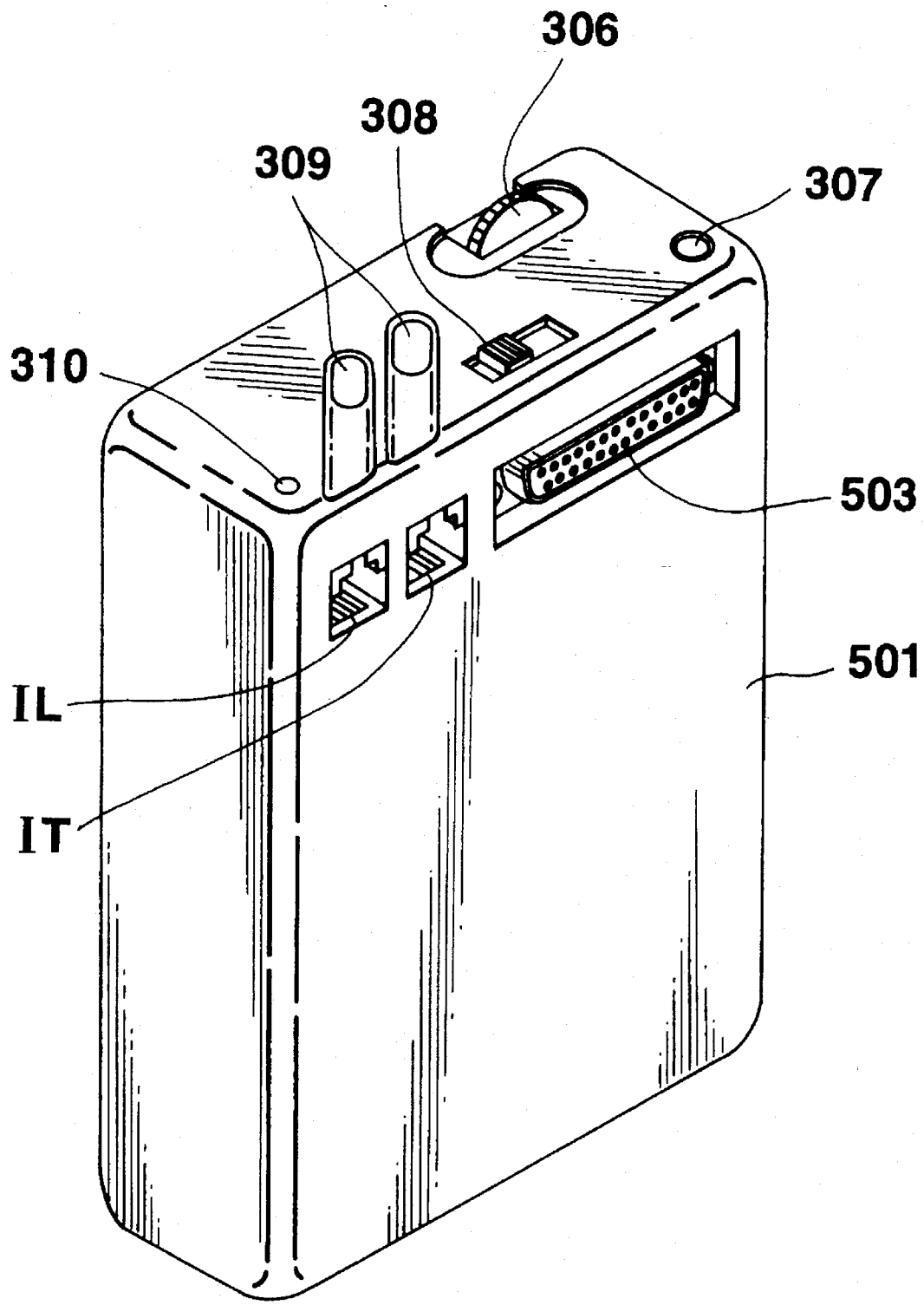
Figure 26:
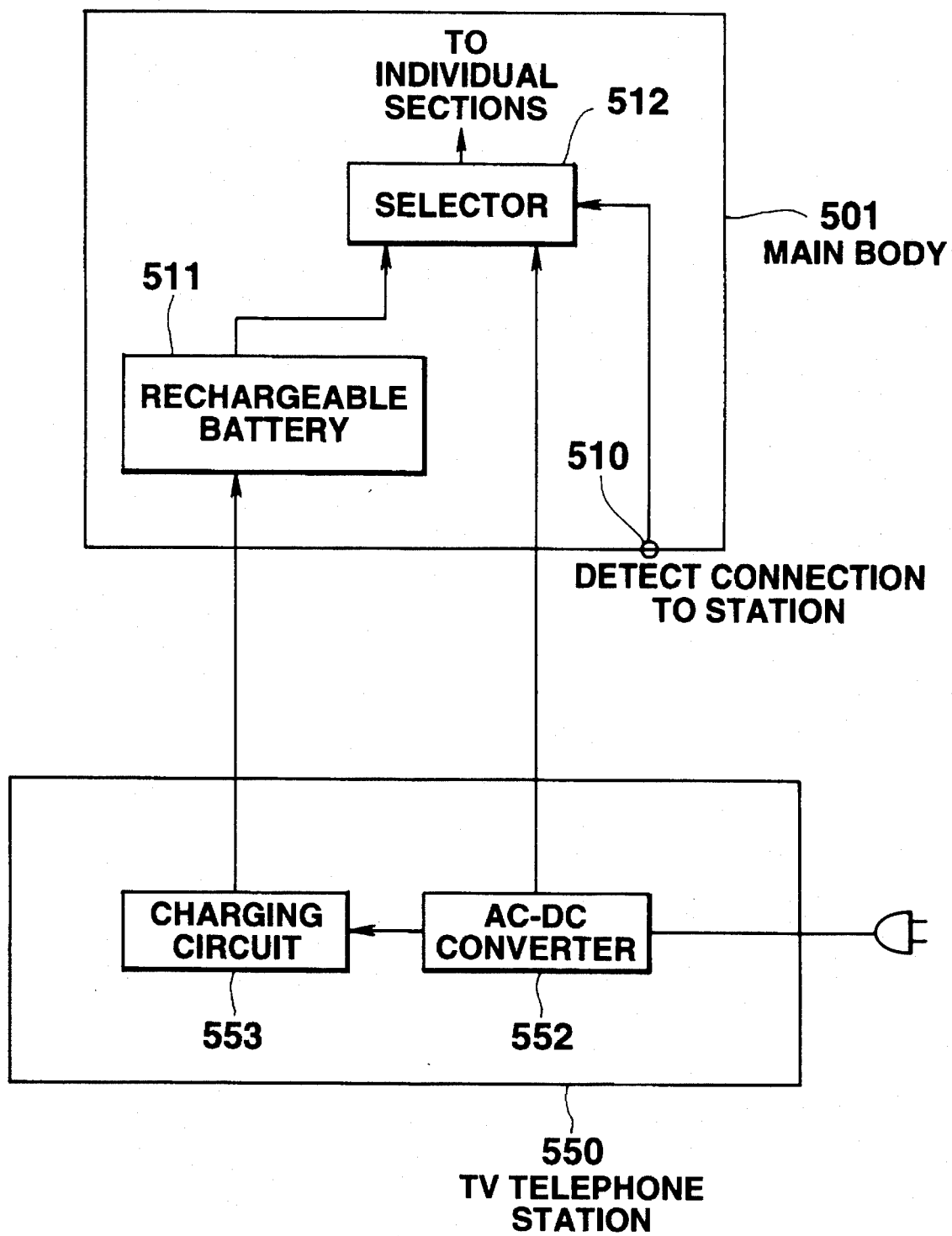
Figure 27:
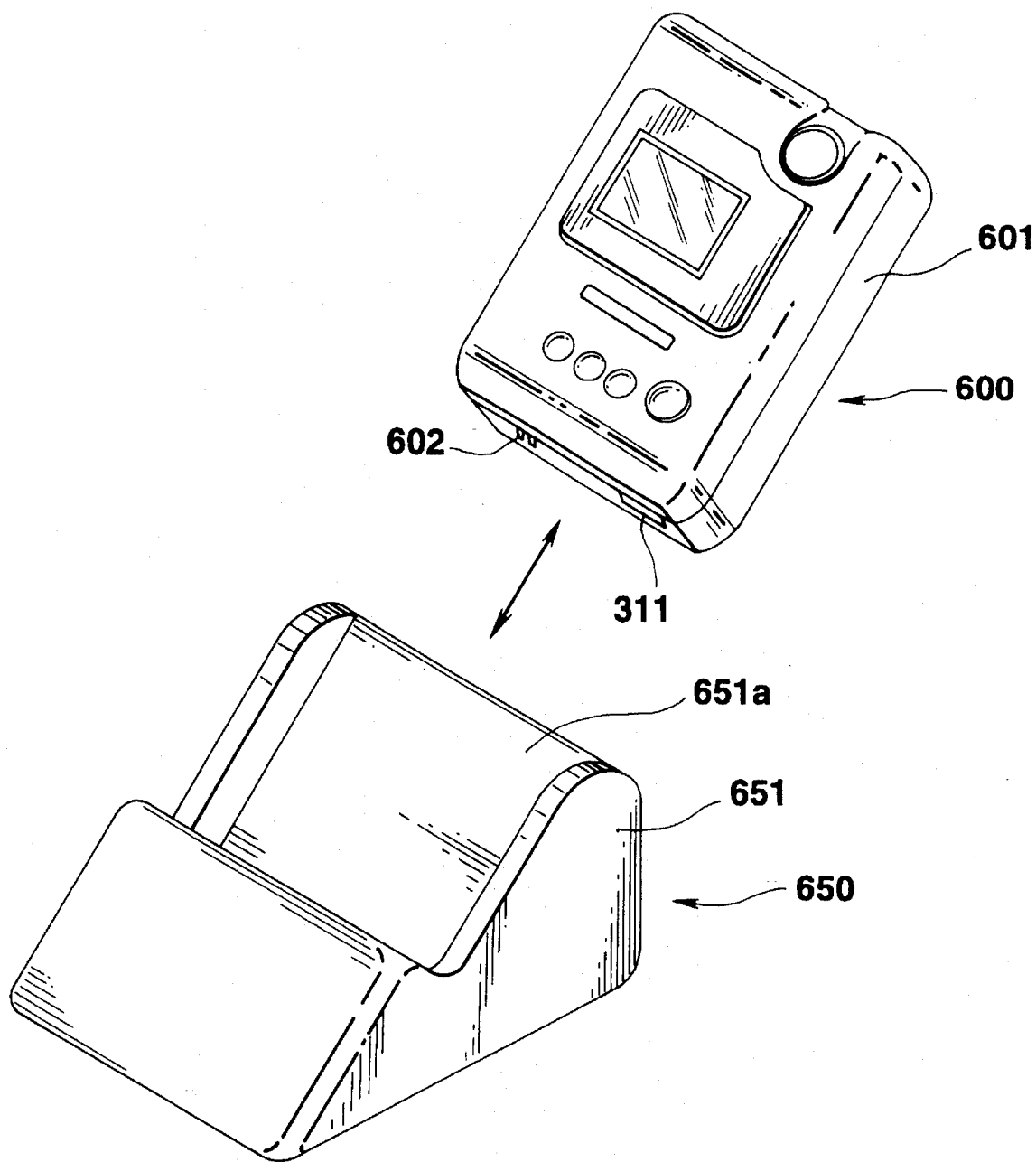

FIG. 23 is a diagram showing the connection of a pocket type telephone apparatus equipped with a TV telephone station;

FIG. 24 is a perspective view of the pocket type telephone apparatus equipped with the TV telephone station in FIG. 23;

FIG. 25 is a diagram showing the pocket type telephone apparatus in FIG. 23;

FIG. 26 is a diagram showing the power-supply connection between the pocket type telephone apparatus and the TV telephone station; and FIG. 27 is a diagram showing a modification of the fourth embodiment.

Fifth Embodiment

Figure 28:
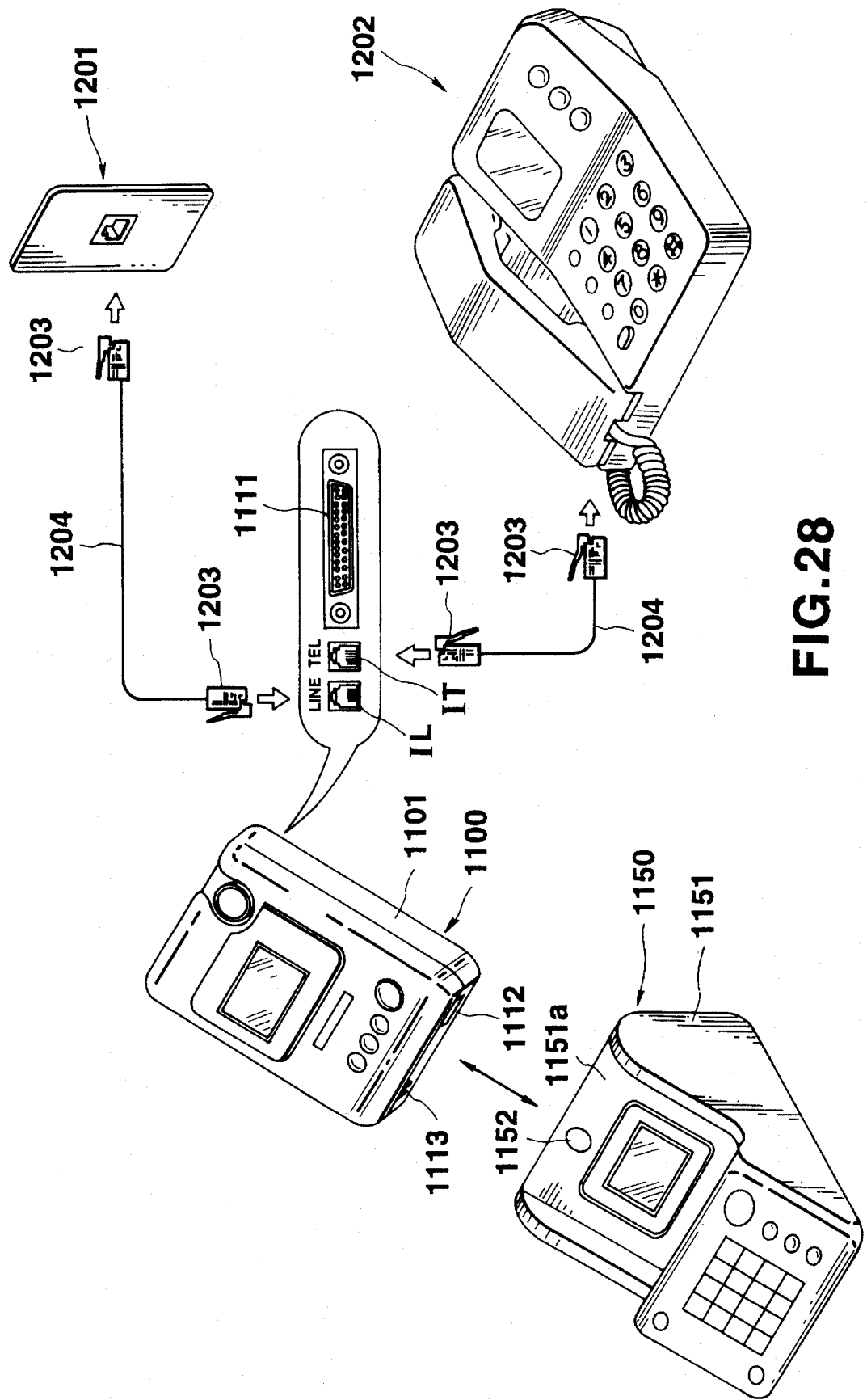
Figure 29:
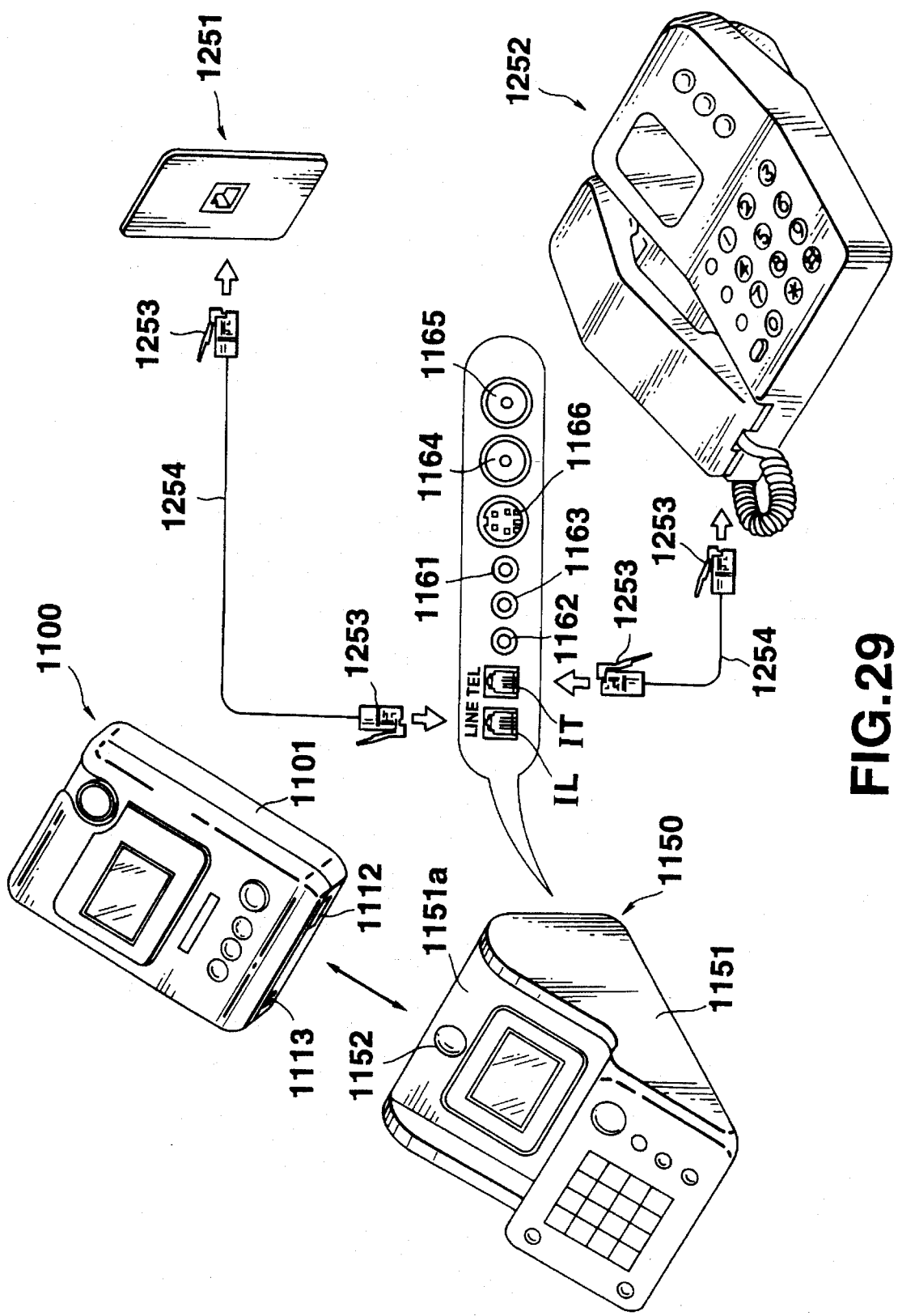
Figure 30:
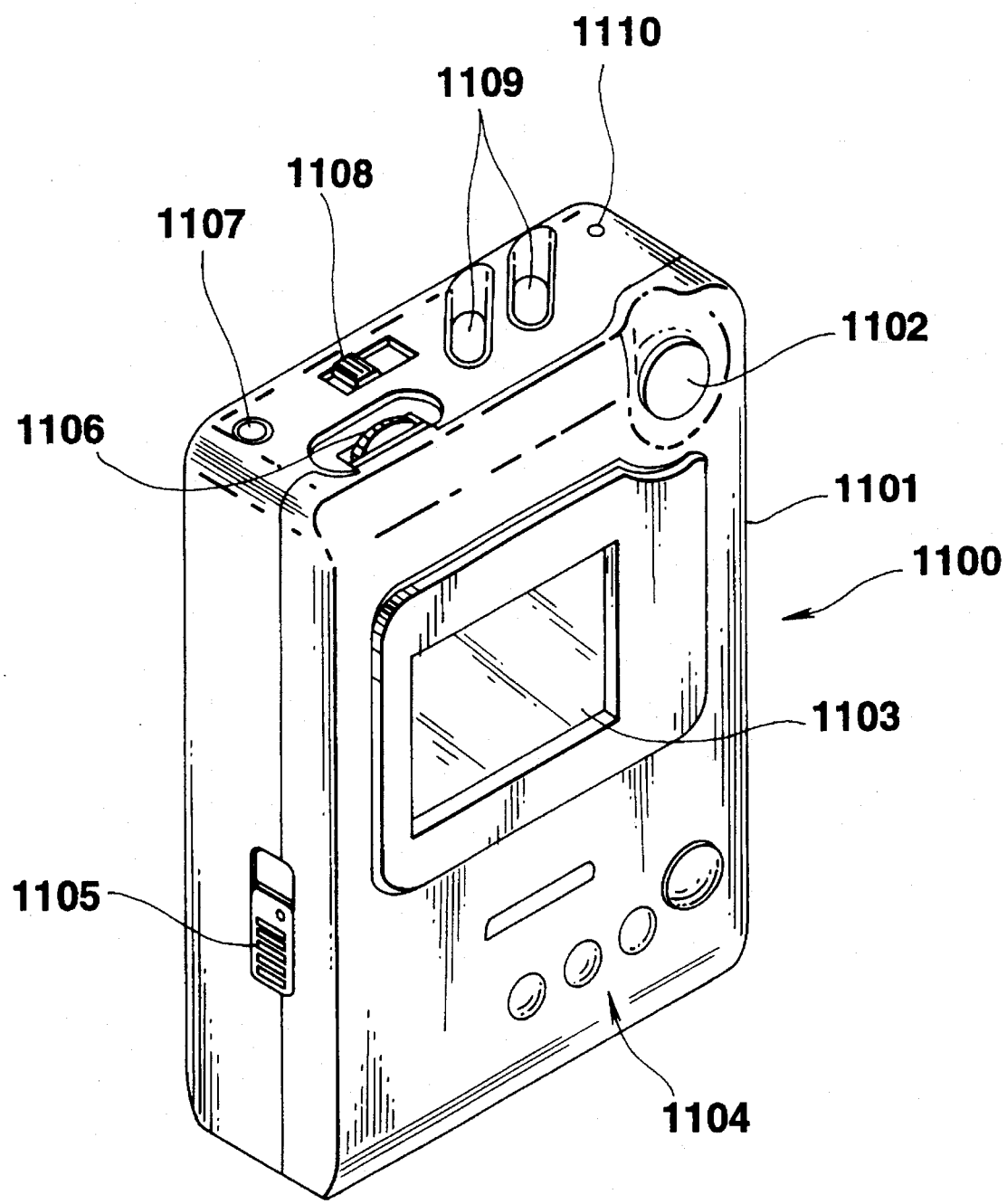
Figure 31:
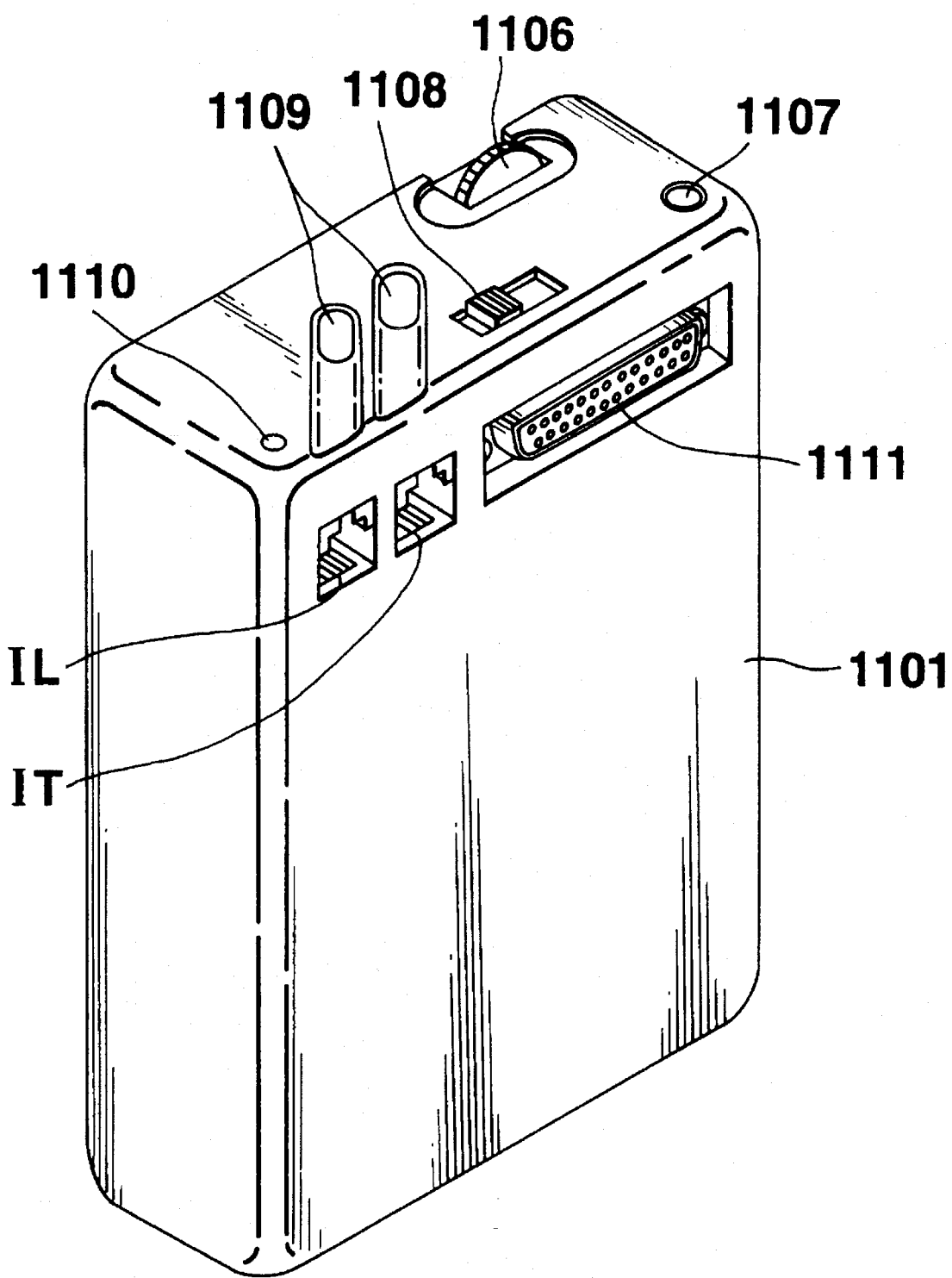
Figure 32:
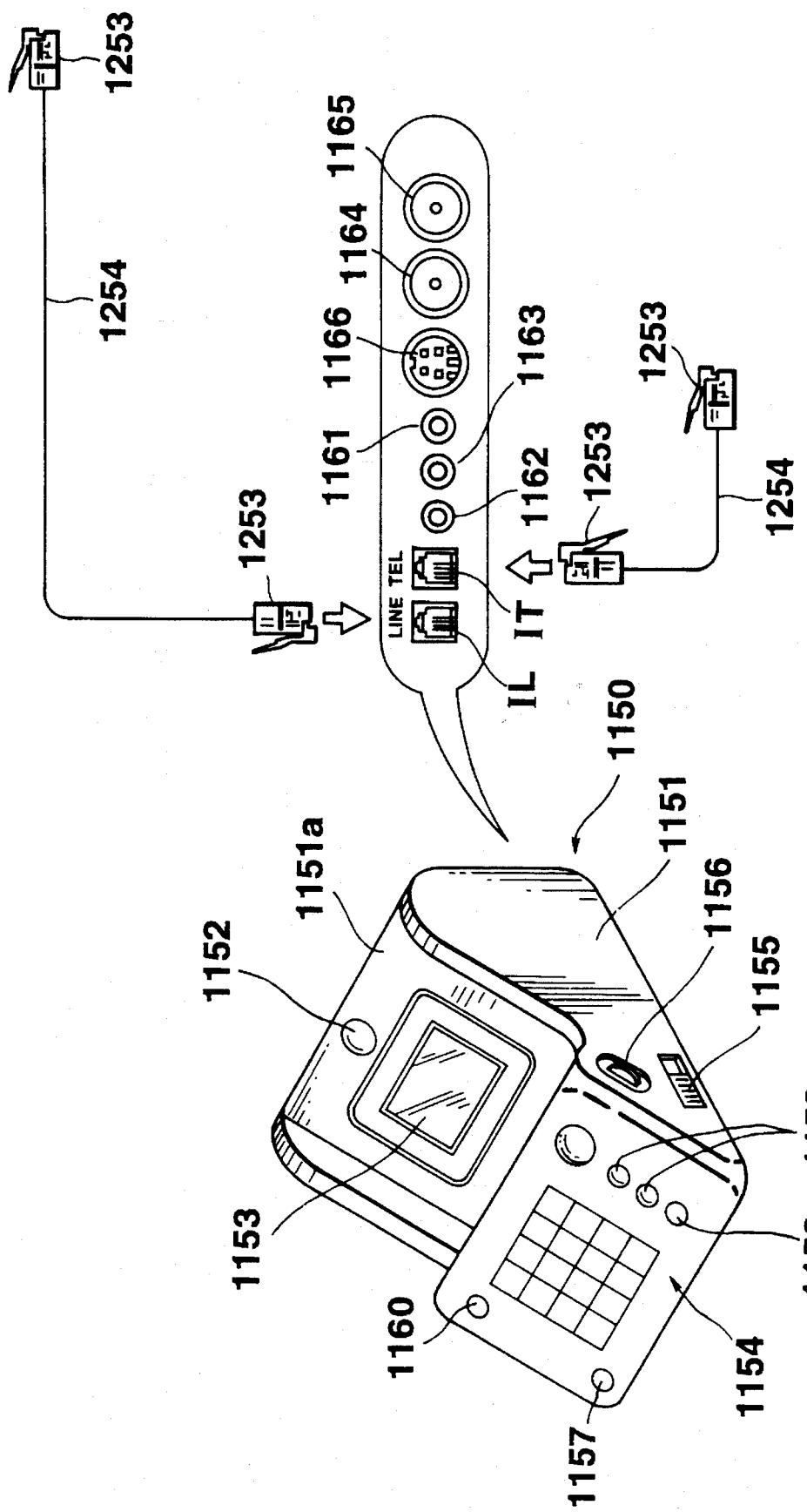
Figure 33:
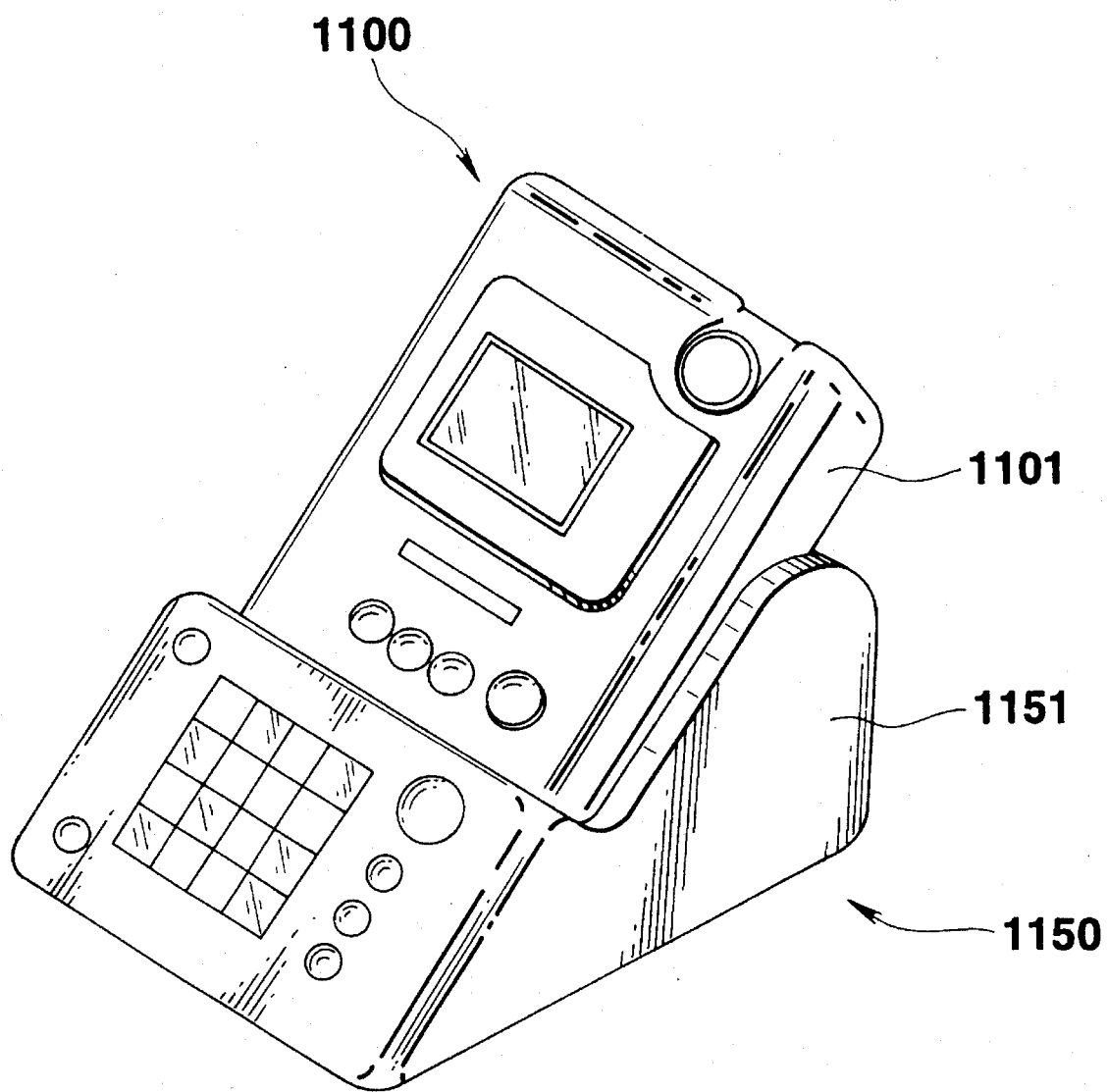
Figure 34:
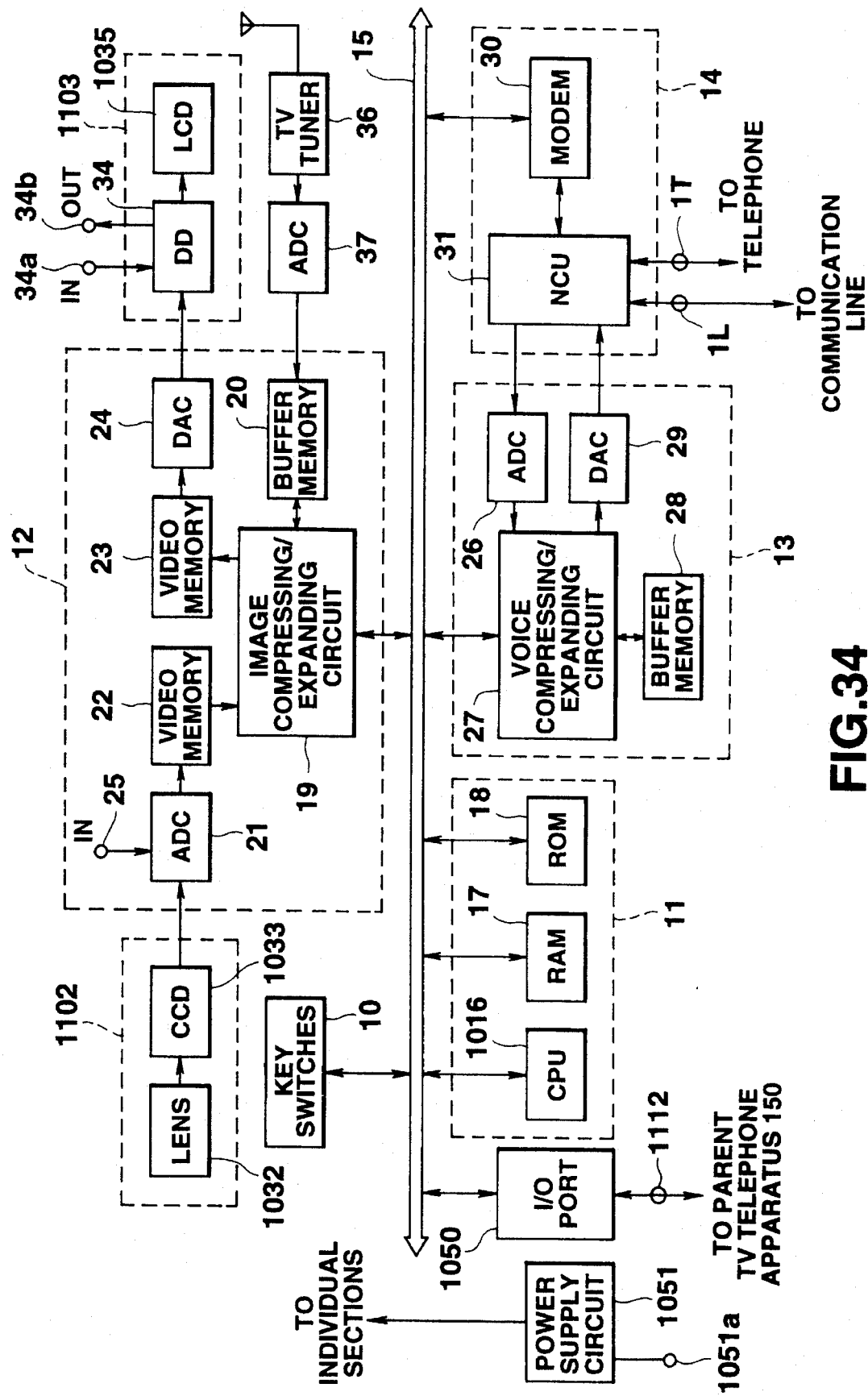
Figure 35:
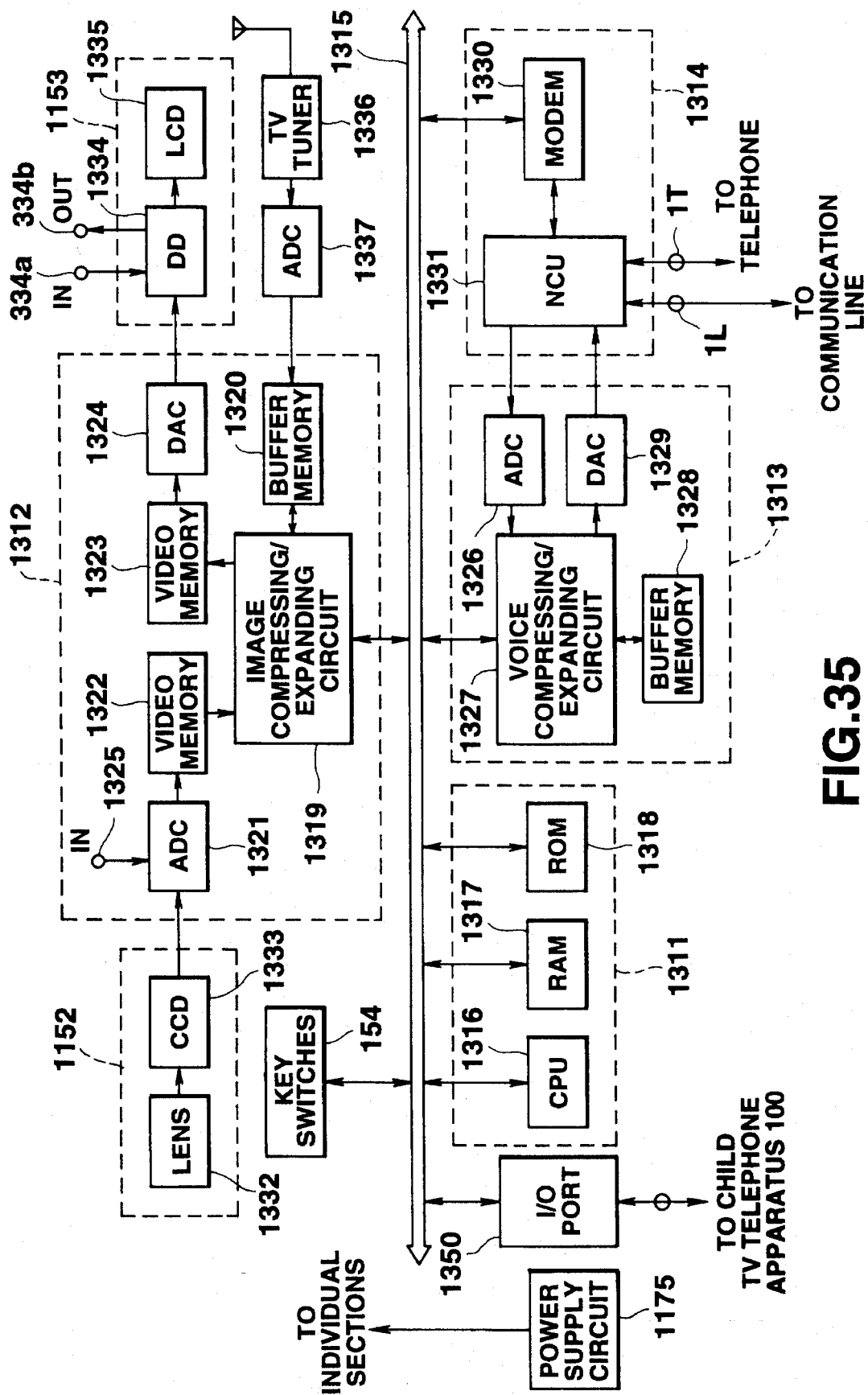

FIG. 28 is a diagram showing the connection of a TV telephone system equipped with detachable parent and child TV telephone apparatuses;

FIG. 29 is a diagram showing the connection of the parent TV telephone apparatus to an external unit;

FIG. 30 is a perspective view of the child TV telephone apparatus;

FIG. 31 Is a perspective view showing the child TV telephone apparatus from the rear side;

FIG. 32 is a perspective view of the parent TV telephone apparatus;

FIG. 33 is a diagram showing the child telephone apparatus mounted on the parent TV telephone apparatus;

FIG. 34 is a block diagram showing the general structure of the child TV telephone apparatus; and FIG. 35 is a block diagram showing the general structure of the parent TV telephone apparatus.

Sixth Embodiment

Figure 36:
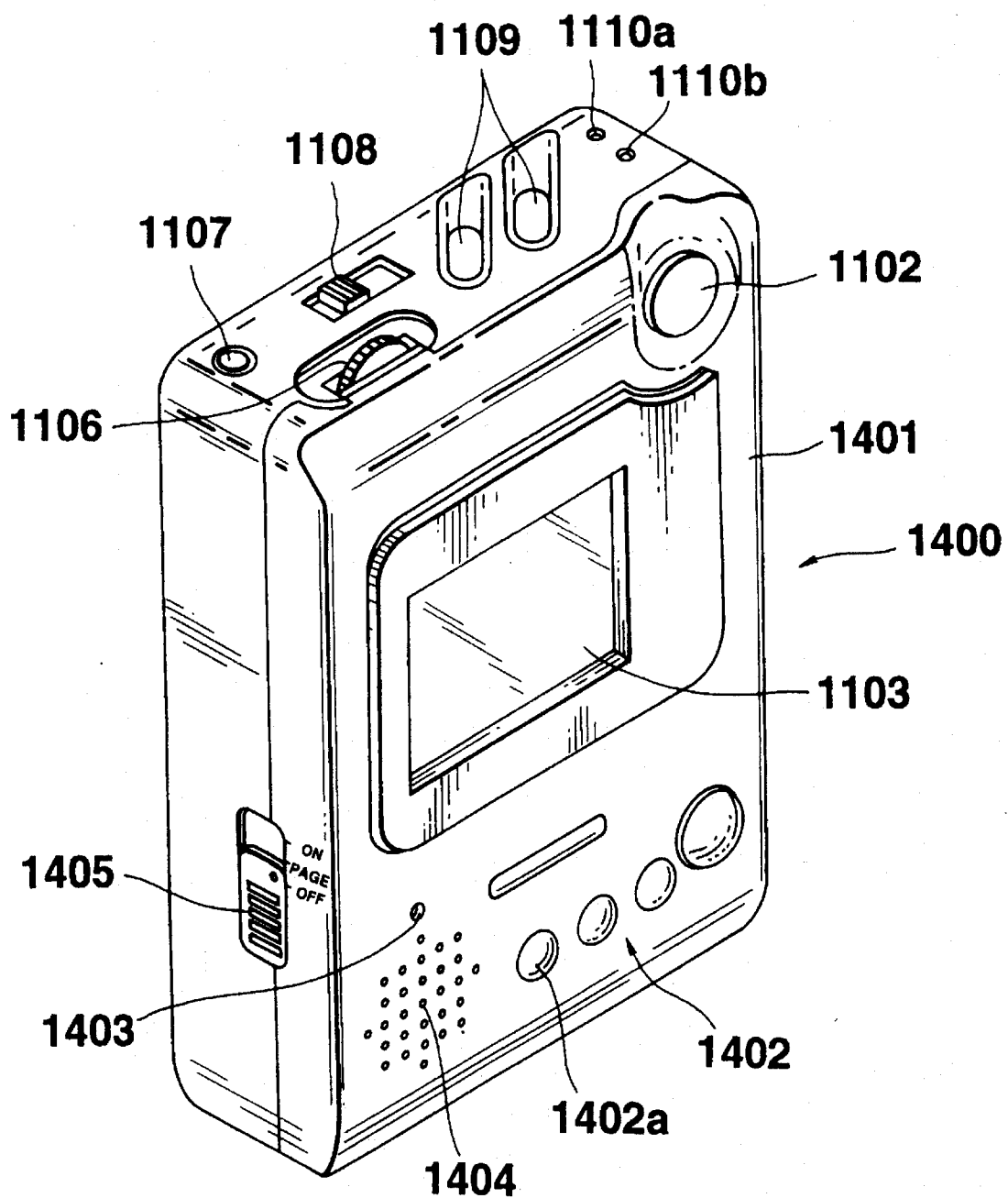
Figure 37:
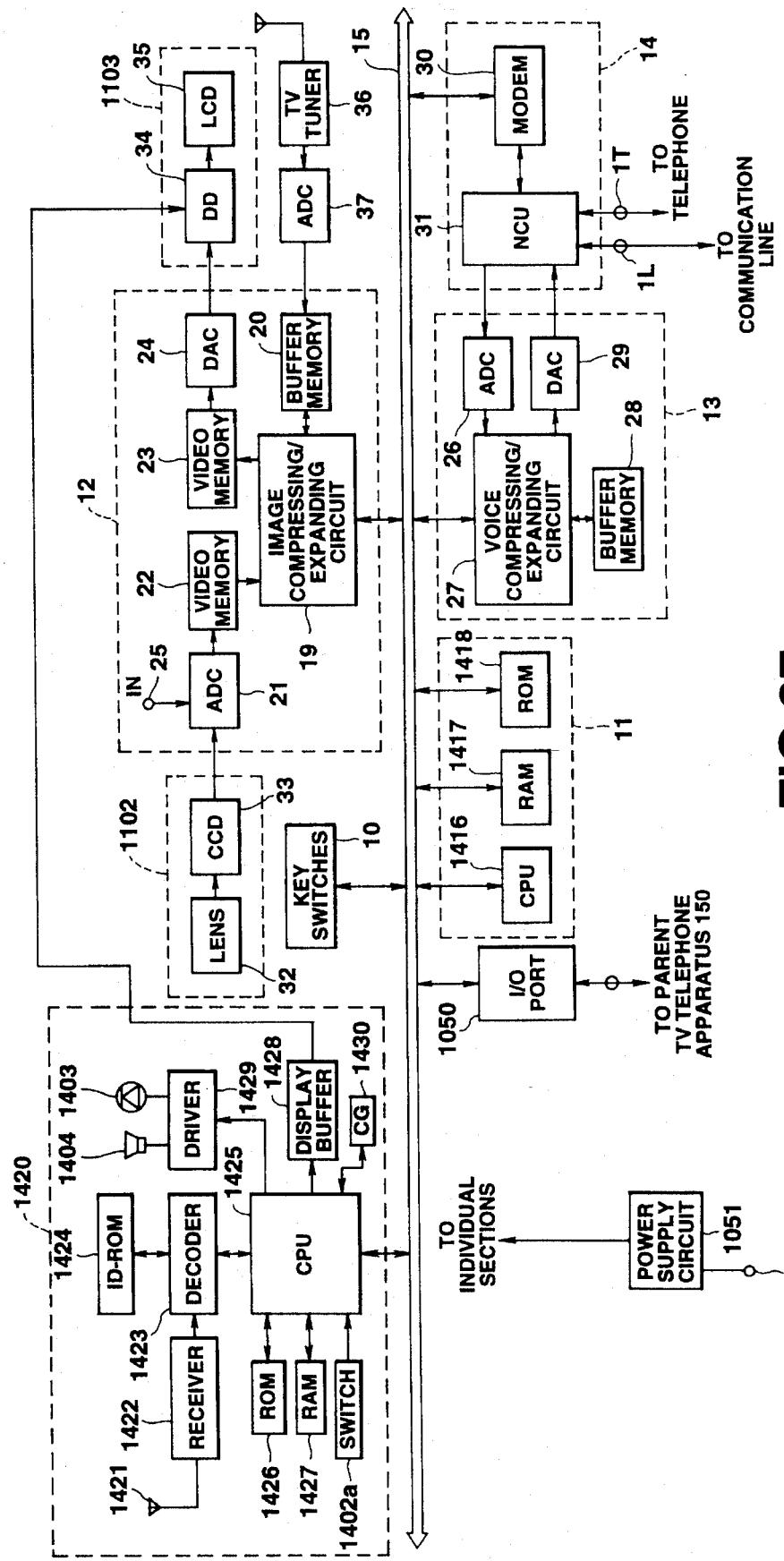

FIG. 36 is a perspective view of a child TV telephone apparatus with an integrated pager function; and FIG. 37 is a block diagram showing the general structure of the child TV telephone apparatus with the integrated pager function.

Seventh Embodiment

Figure 38:
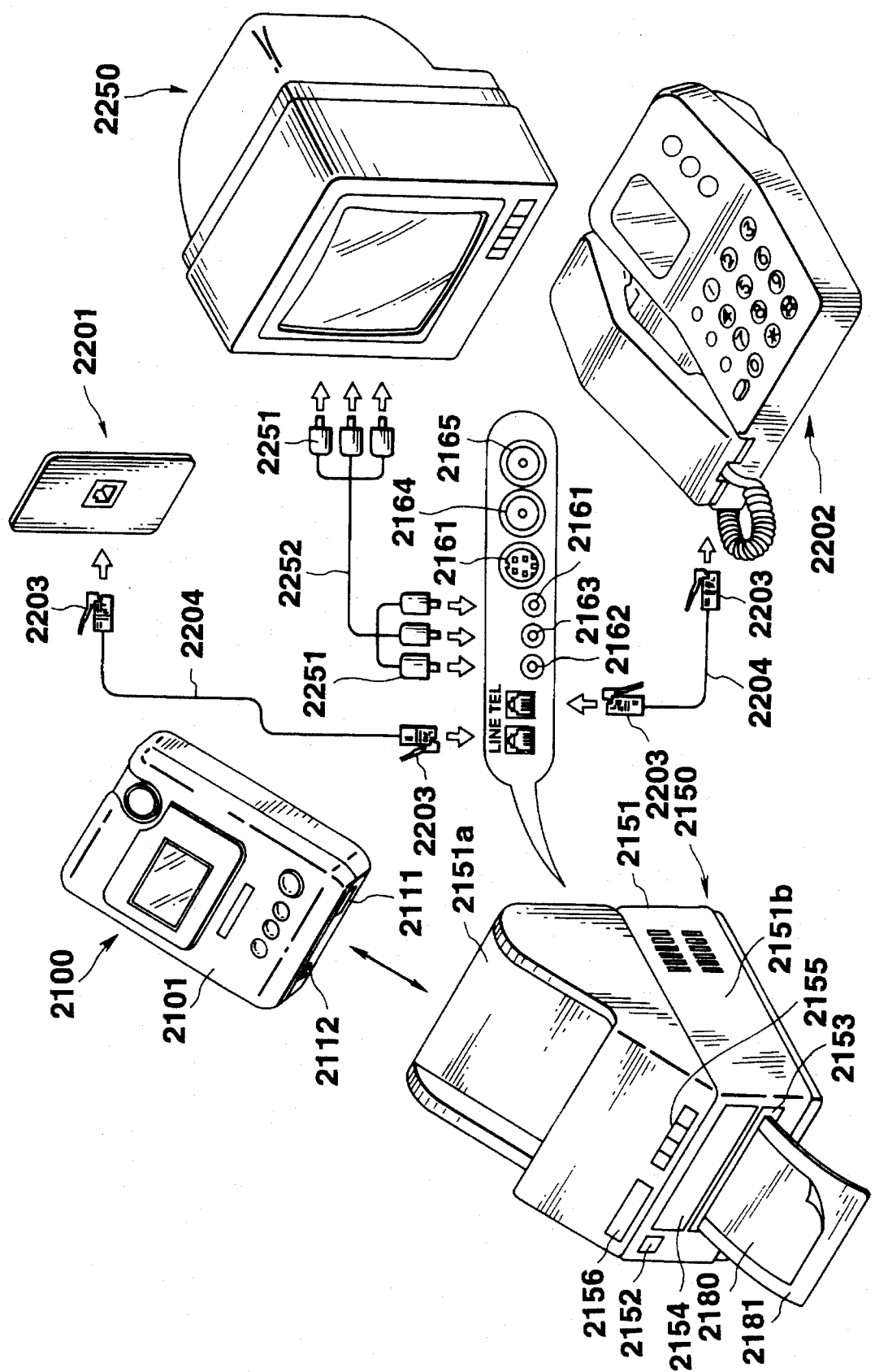
Figure 39:
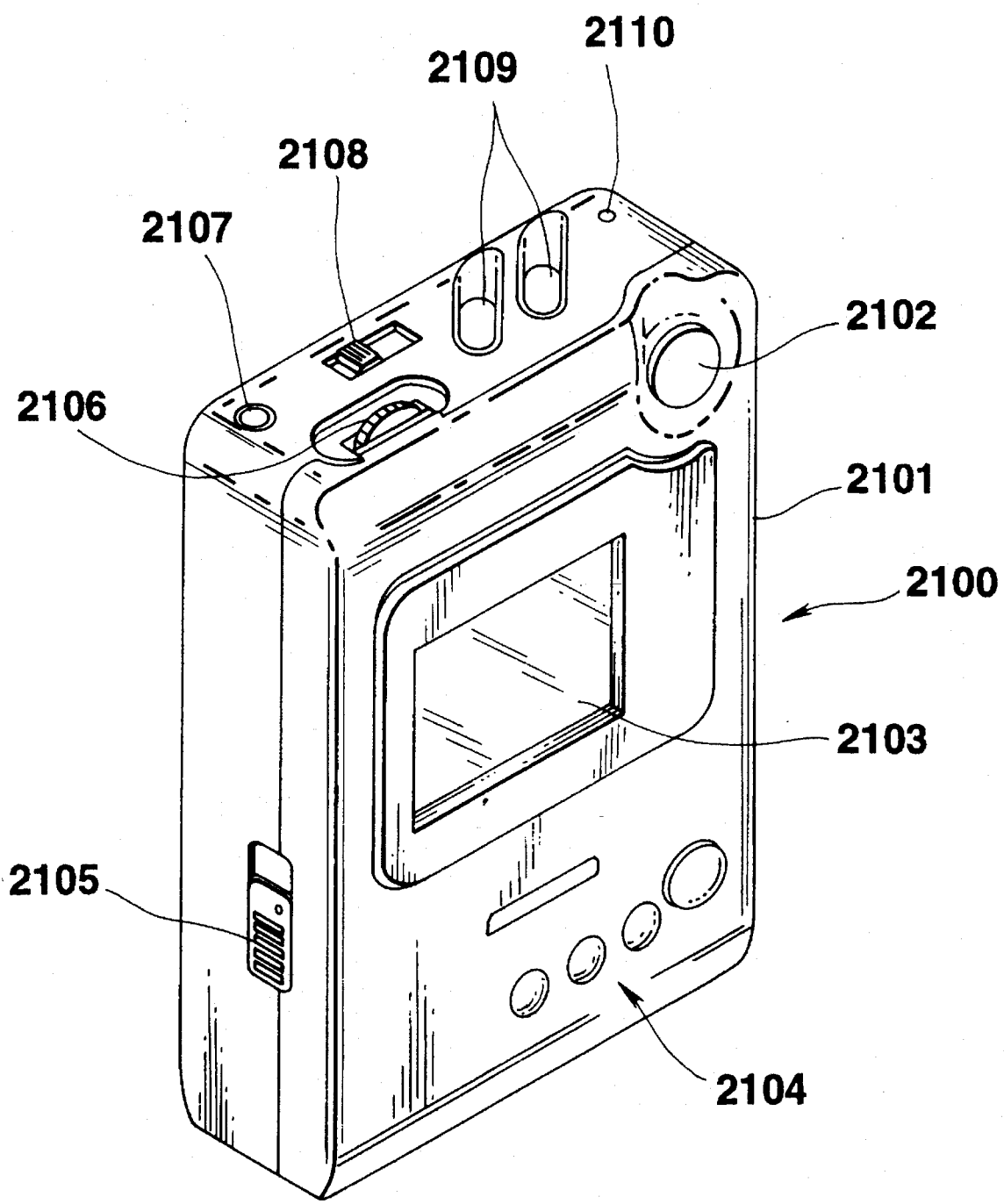
Figure 40:
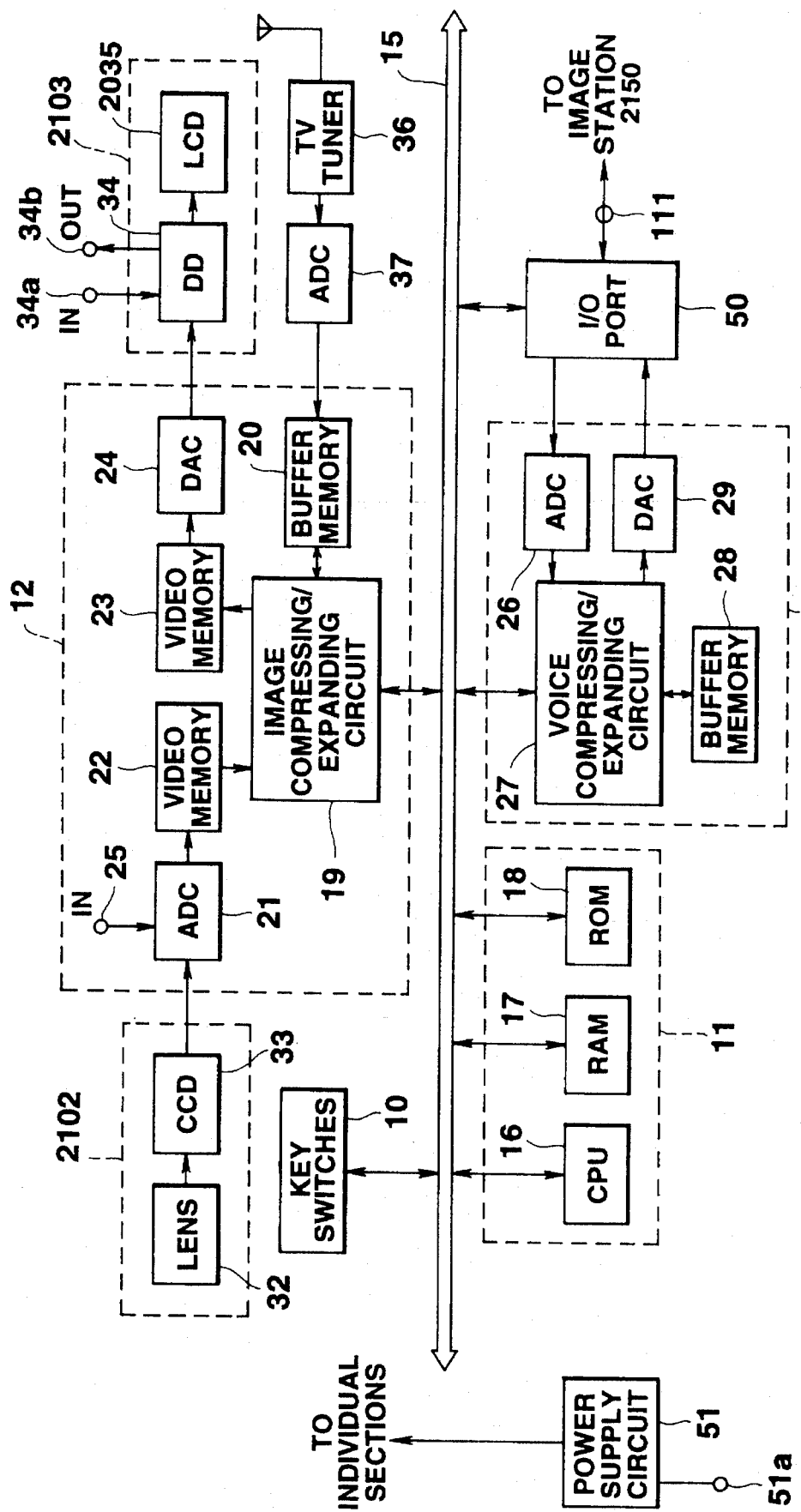
Figure 41:
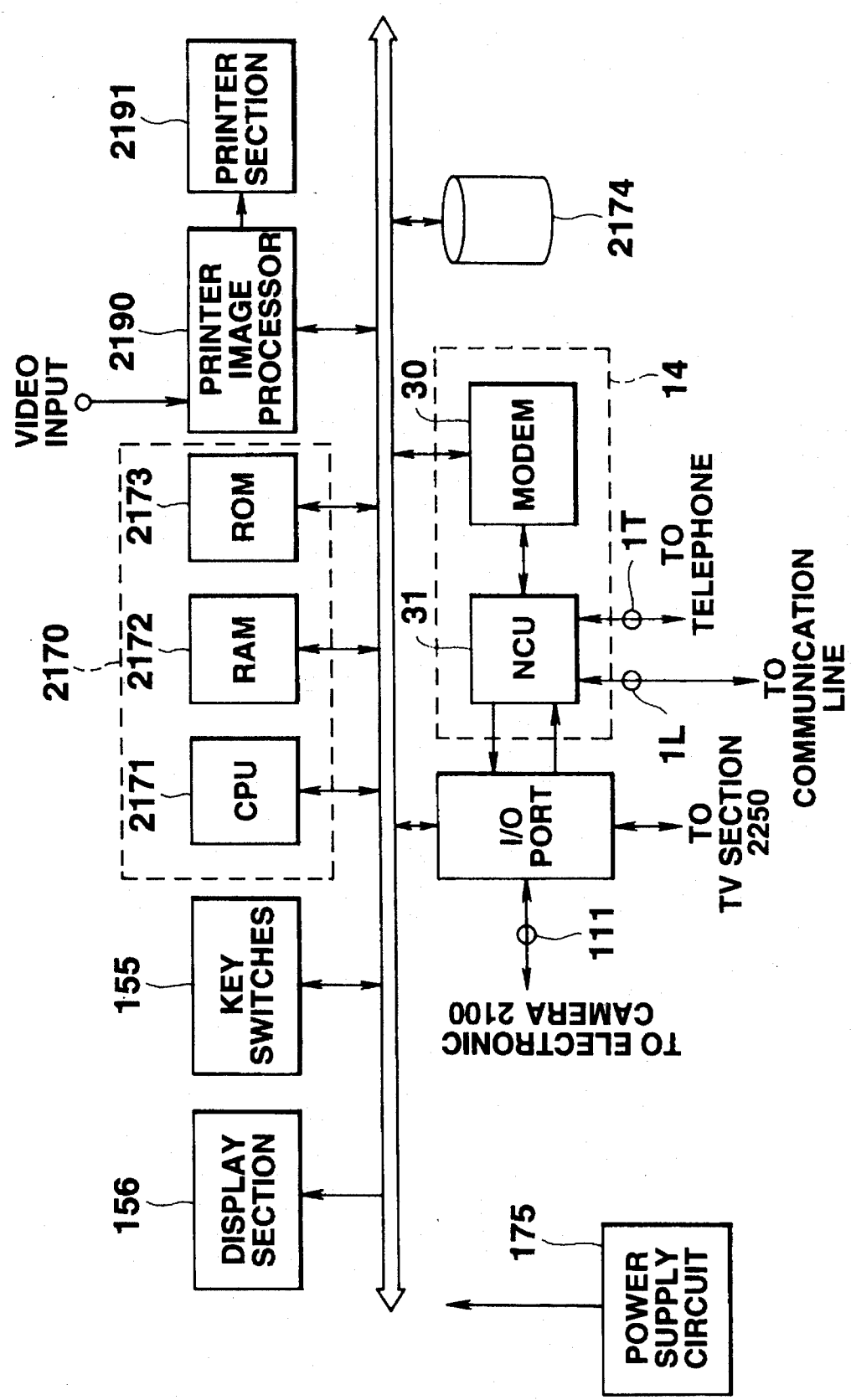
Figure 42:
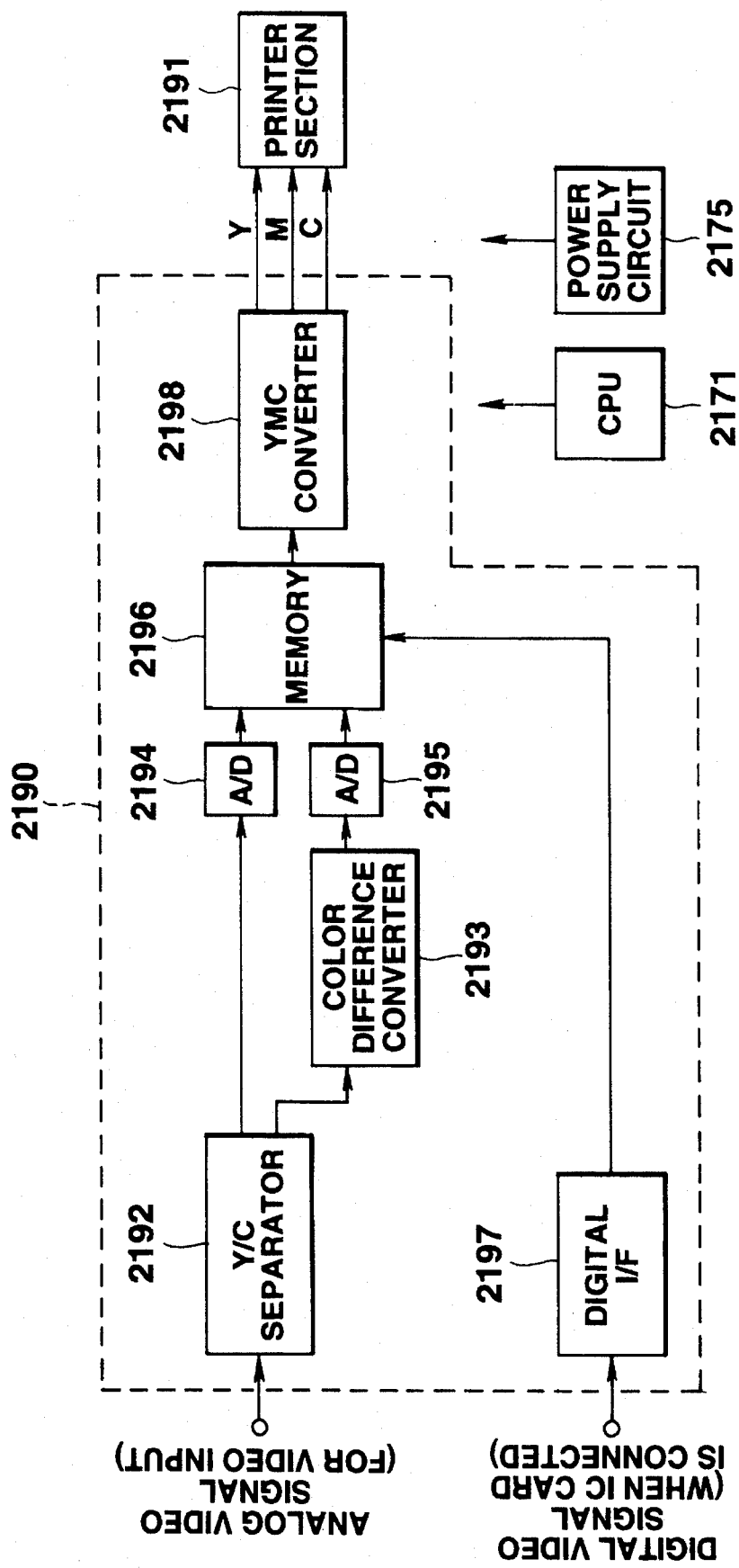

FIG. 38 is a diagram showing the connection of an electronic camera equipped with an image station;

FIG. 39 is a perspective view of the electronic camera equipped with the image station in FIG. 38;

FIG. 40 is a block diagram showing the general structure of the electronic camera;

FIG. 41 is a block diagram showing the general structure of the image station; and FIG. 42 is a block diagram of a card seal printer section of the image station.

Eighth Embodiment

Figure 43:
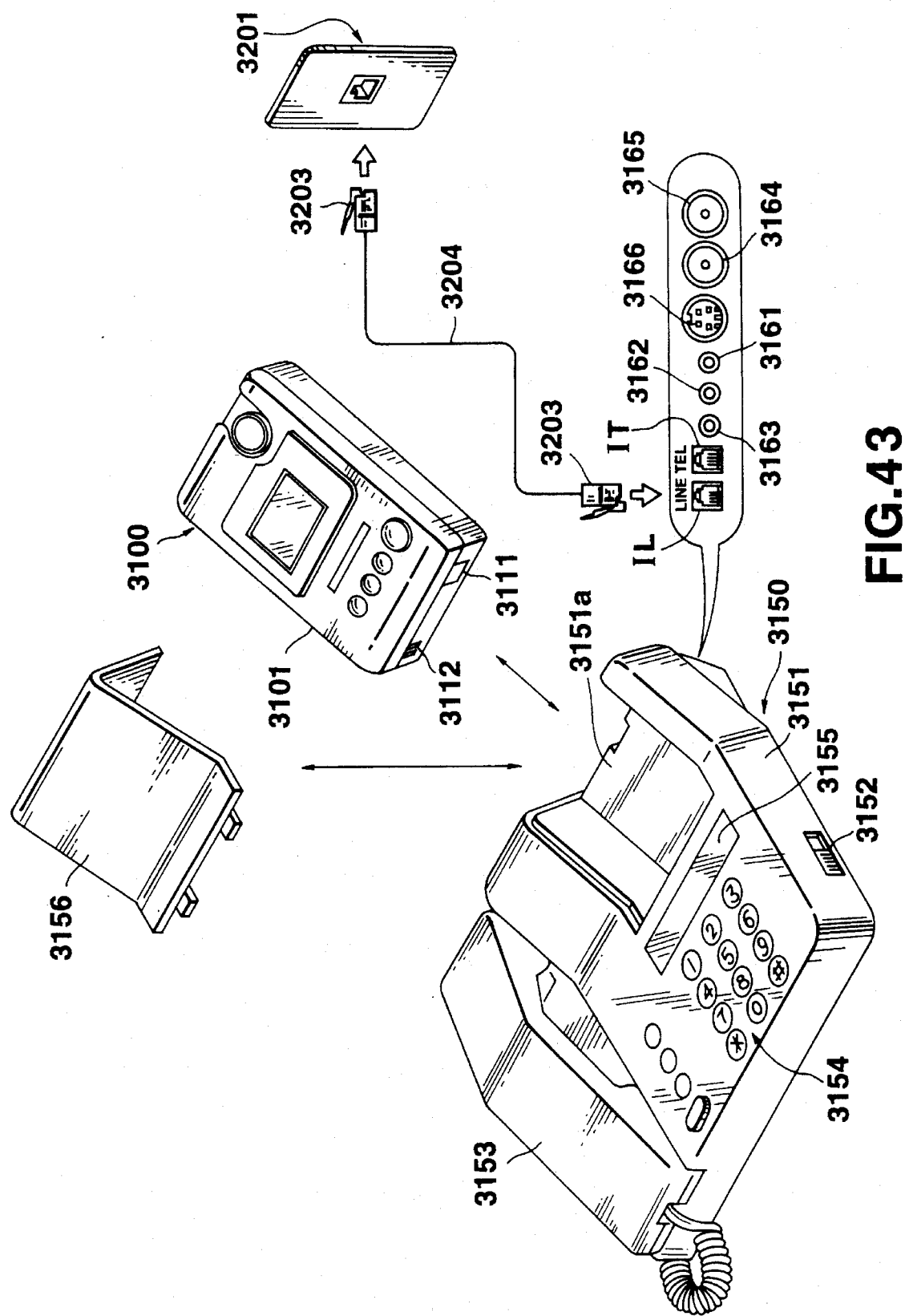
Figure 44:
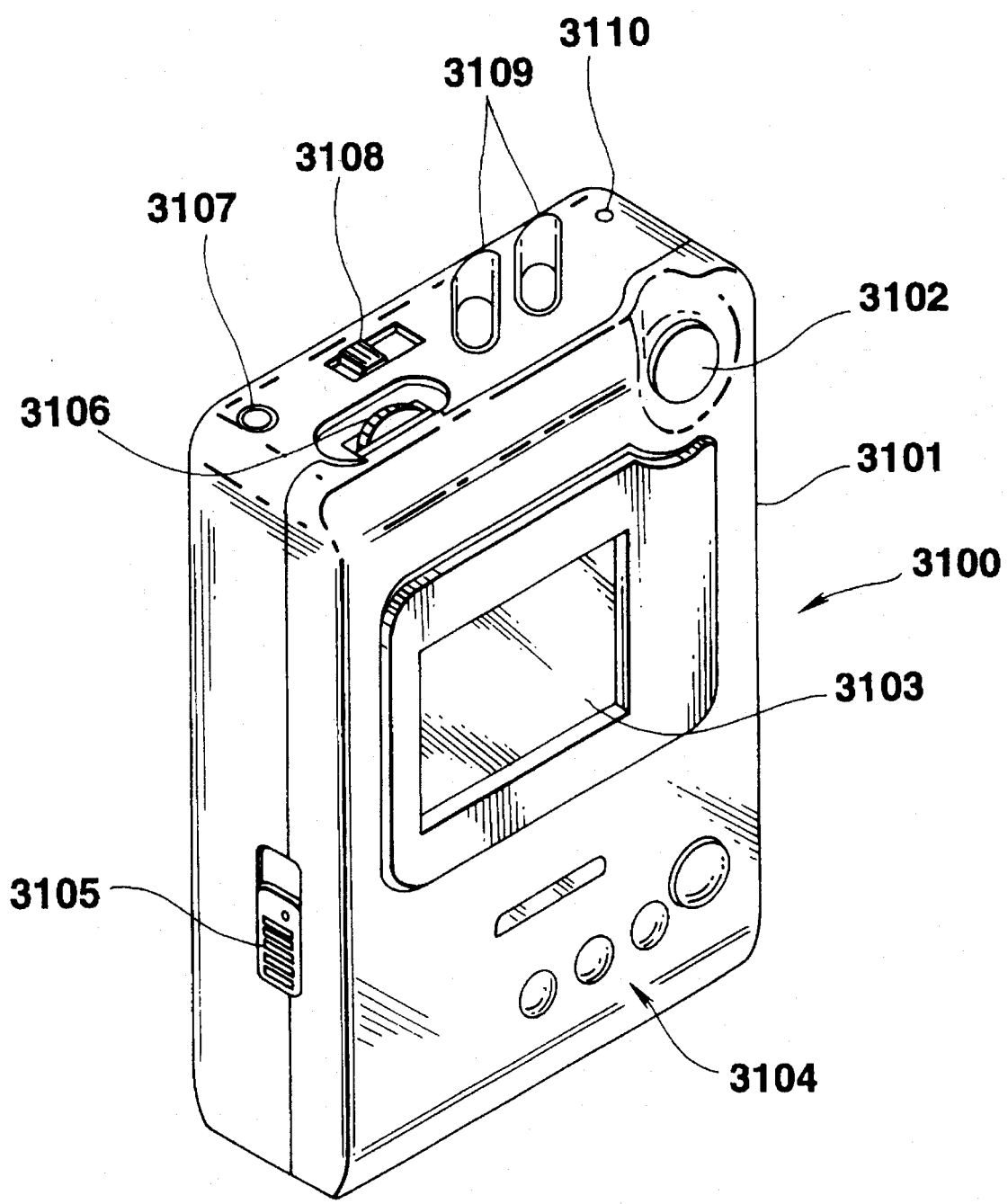
Figure 45:
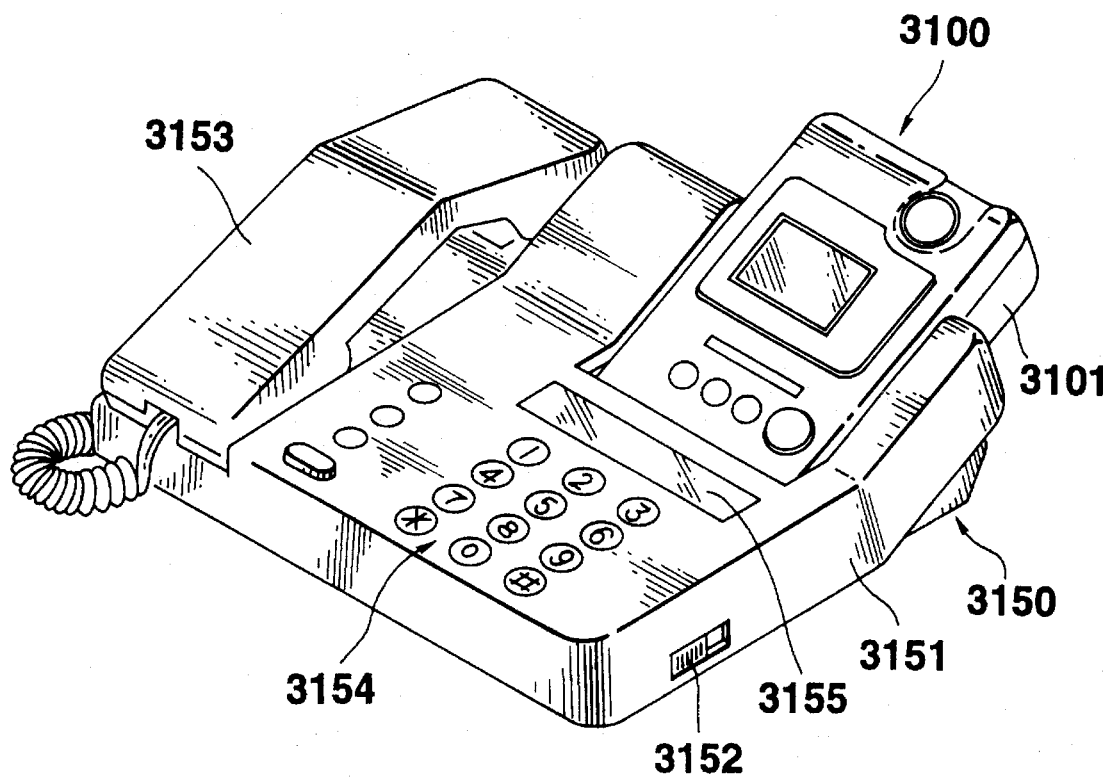
Figure 46:
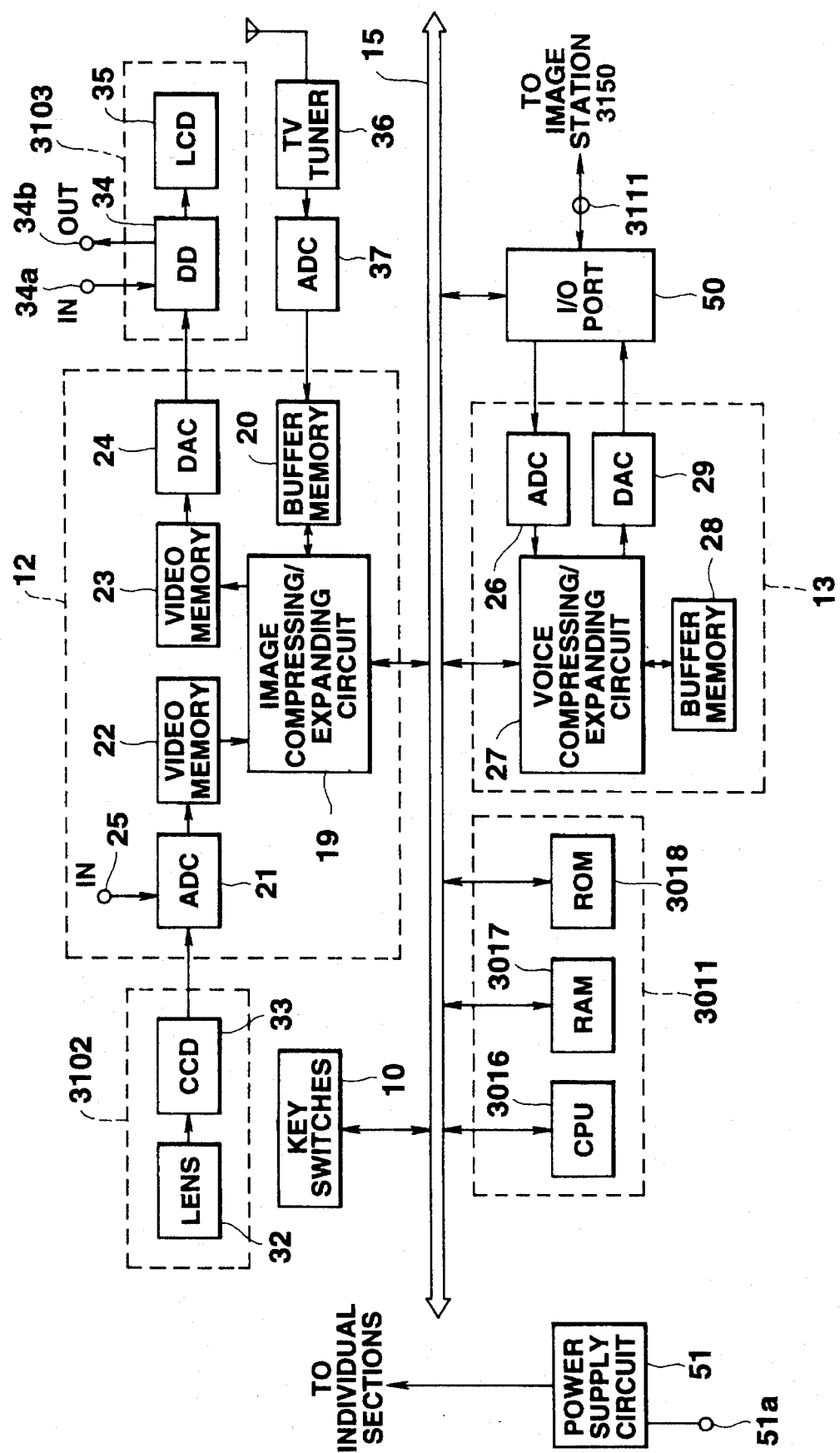
Figure 47:
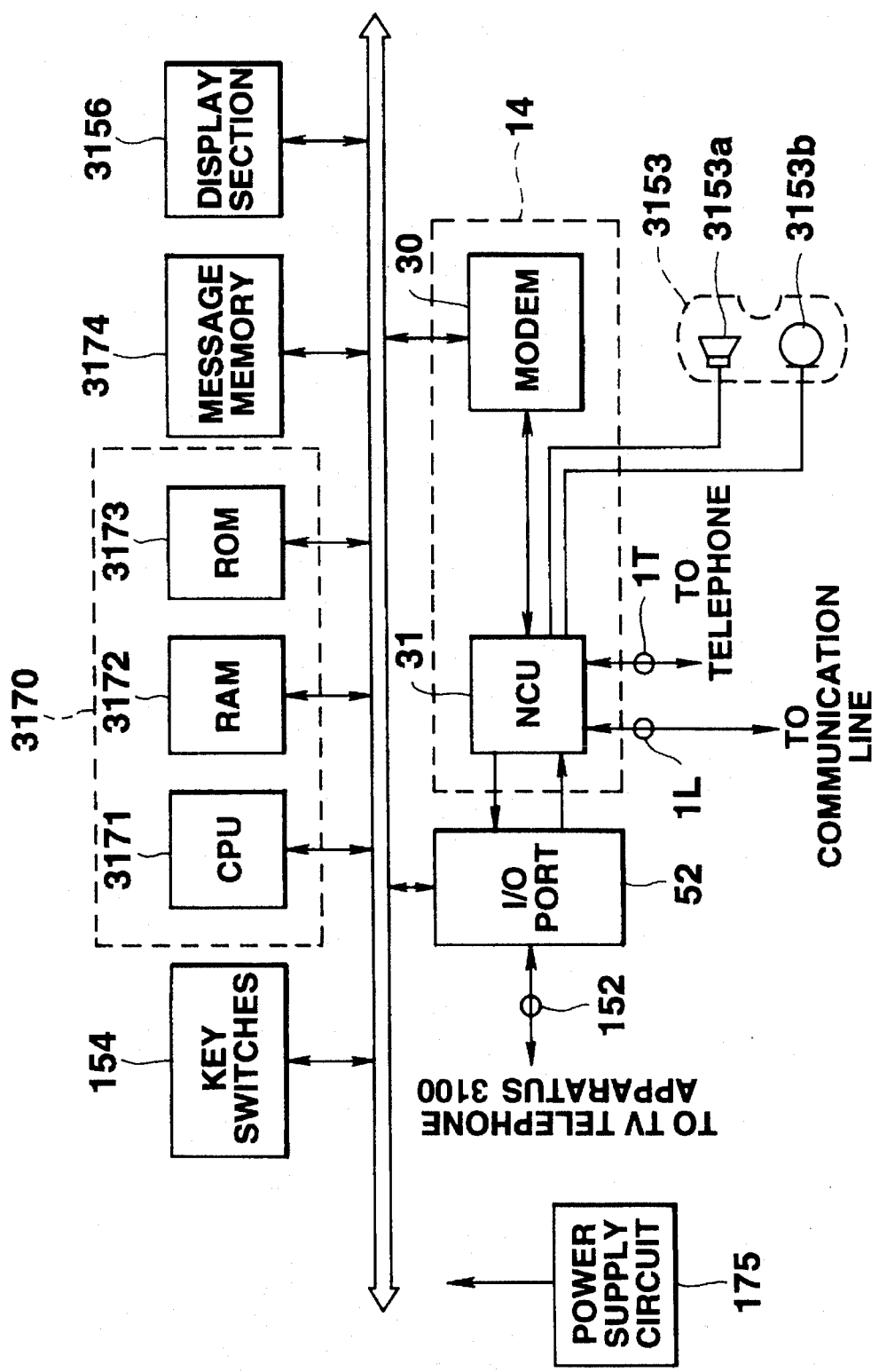
Figure 48:
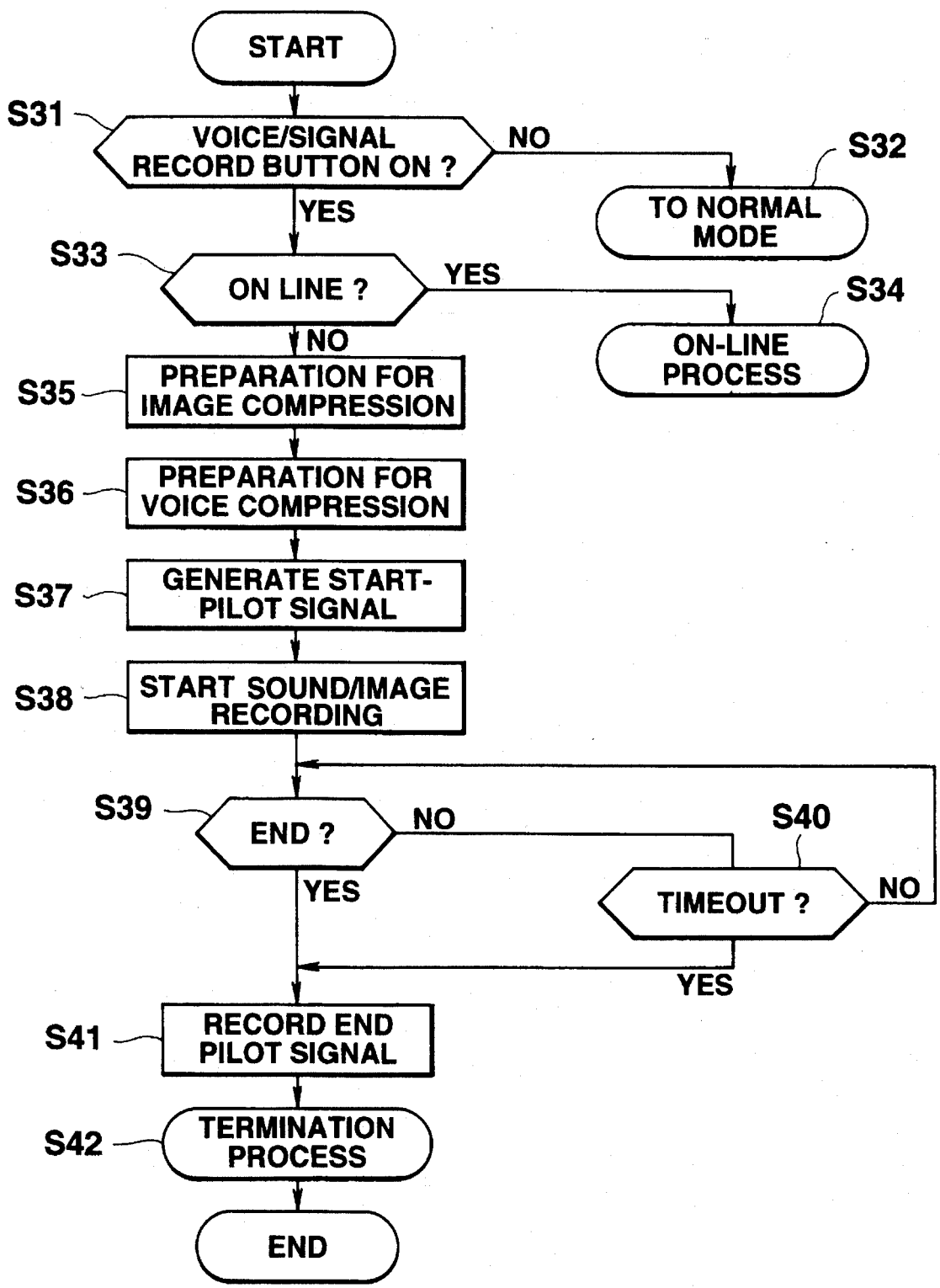
Figure 49:
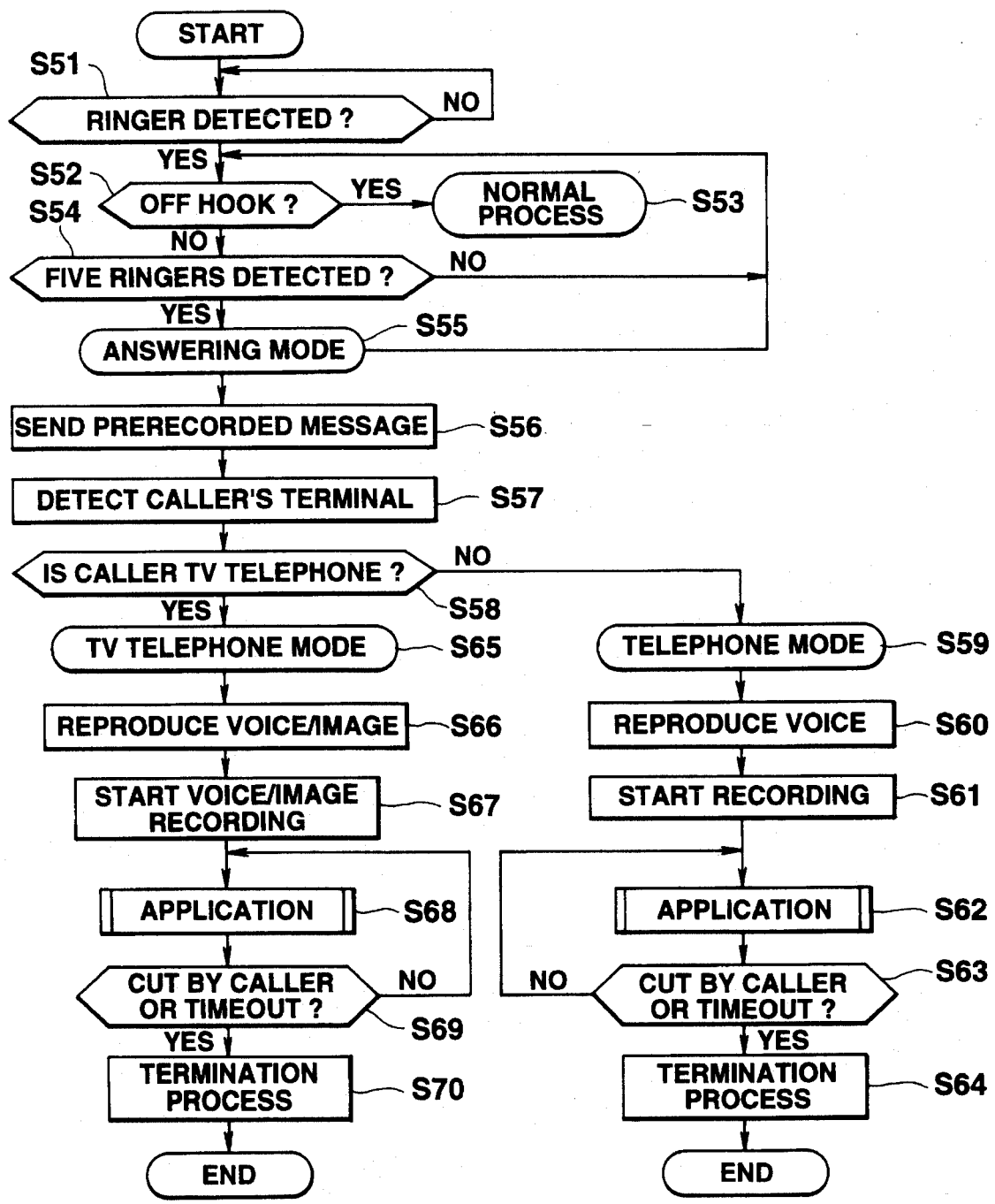
Figure 50:
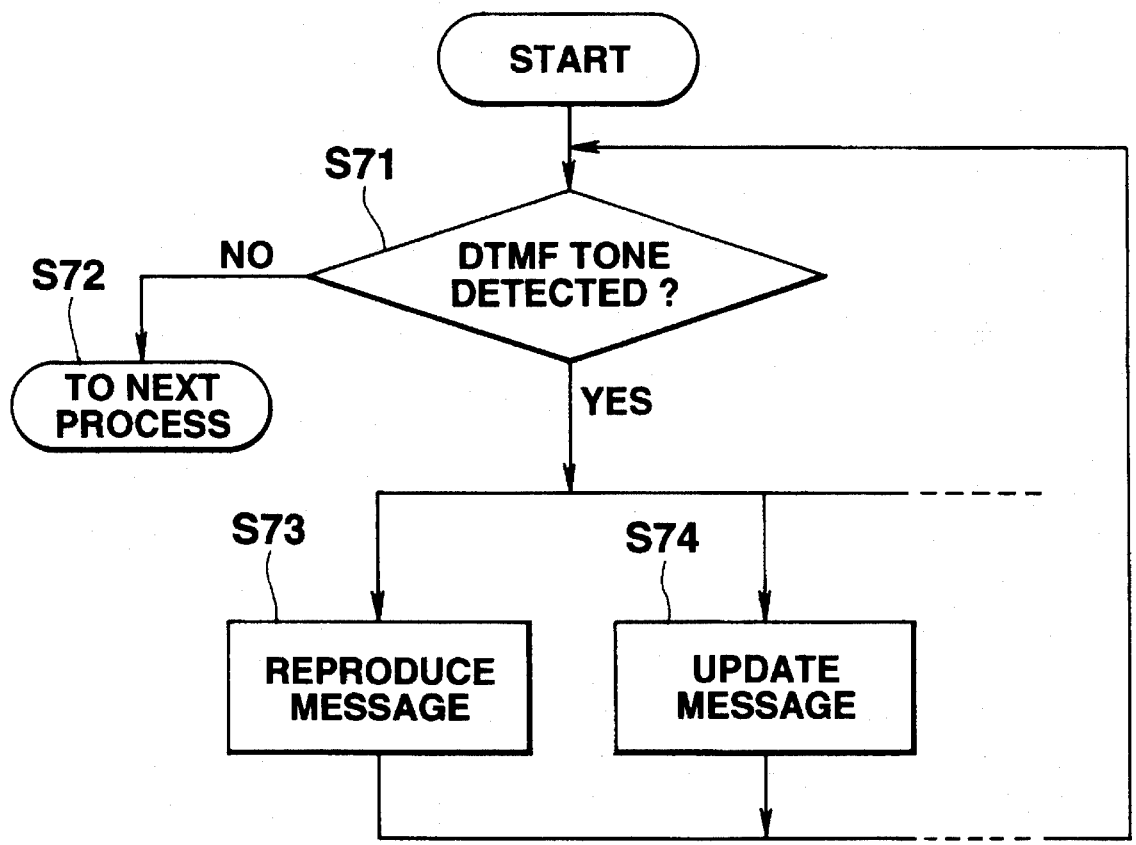

FIG. 43 is a diagram showing the connection of a TV telephone apparatus equipped with a TV telephone station;

FIG. 44 is a perspective view of the TV telephone apparatus in FIG. 43;

FIG. 45 is a diagram showing the connection between the TV telephone station and the TV telephone apparatus;

FIG. 46 is a block diagram showing the general structure of the TV telephone apparatus;

FIG. 47 is a block diagram showing the general structure of the TV telephone station;

FIG. 48 is a flowchart for explaining an auto-answering process of the TV telephone station and TV telephone apparatus;

FIG. 49 is a flowchart for explaining an auto-answering process of the TV telephone station and TV telephone apparatus; and FIG. 50 is a flowchart for explaining an auto-answering process of the TV telephone station and TV telephone apparatus.

DETAILED DESCRIPTION OF THE PREFERRED EMBODIMENTS

Embodiments of the present invention will now be described below with reference to the accompanying drawings.

First Embodiment

A TV telephone apparatus according to the first embodiment of the present invention will be described with reference to FIGS. 1 through 13. In the first embodiment, a telephone function is incorporated on the station side.

First, the structure of the first embodiment will be discussed with reference to FIGS. 1 through 8. The following description will be given with reference to the case where an ordinary analog telephone subscriber line is used as a communication line.

Figure 1:
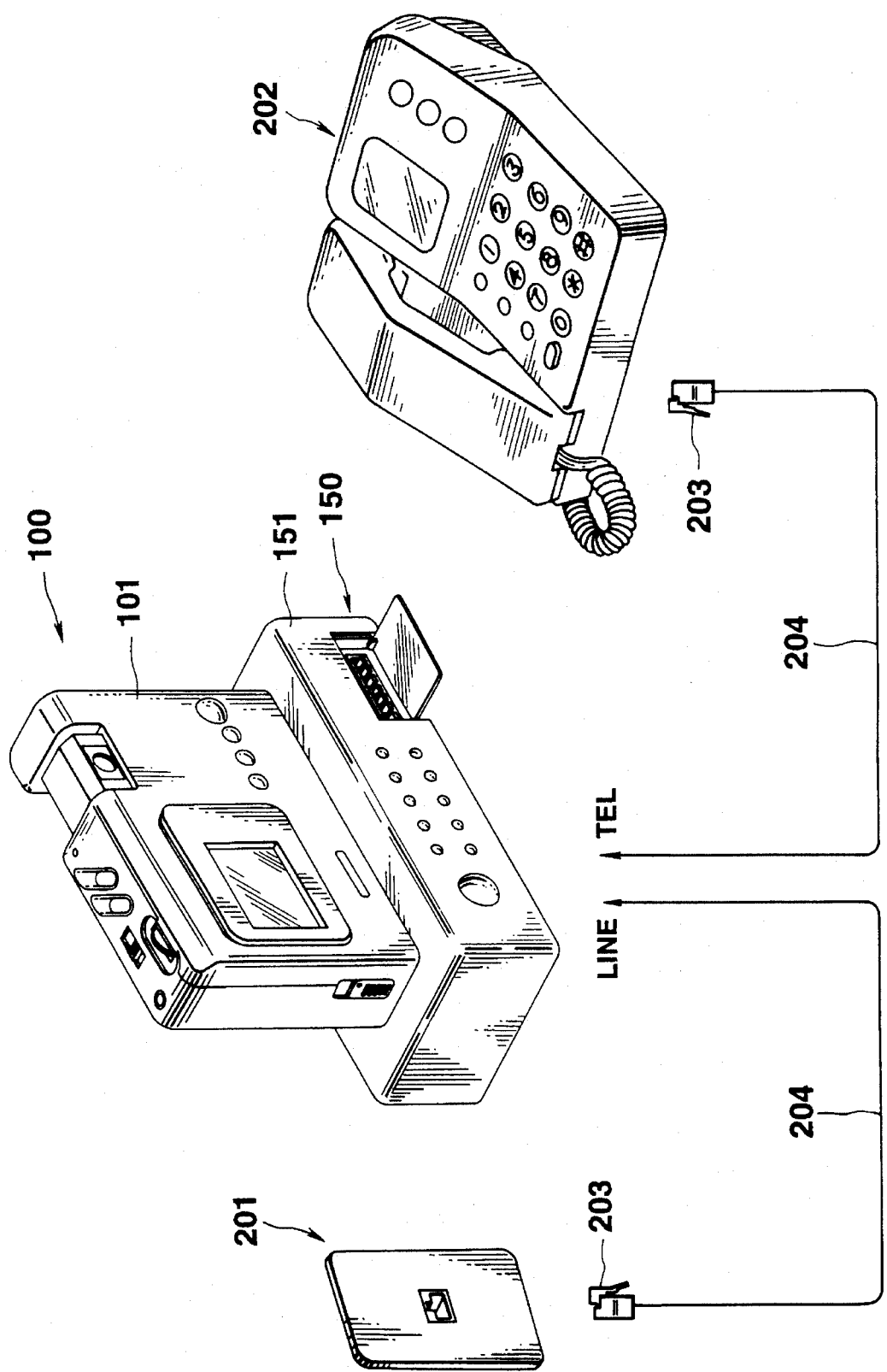
FIG. 1 is a diagram showing the connection of a TV telephone apparatus equipped with a TV telephone station.

FIG. 1 is a diagram for explaining the connection of a TV telephone apparatus equipped with a TV telephone station. Referring to FIG. 1, the TV telephone apparatus equipped with a TV telephone station according to the first embodiment comprises a portable TV telephone apparatus 100 and a TV telephone station 150 having an integrated telephone function. The TV telephone apparatus 100 is designed to transmit and receive high-quality images, uses a liquid crystal display (LCD) device to become compact and light, and is detachably mounted to the TV telephone station 150. The TV telephone station 150 is connected between a telephone line and a telephone to transmit and receive image data and voice data over the telephone line. The TV telephone station 150 where the TV telephone apparatus 100 is to be mounted, is connected between a modular jack type socket 201 and a telephone 202, and has a LINE I/O terminal 1L to connect to an analog public telephone line and a TEL I/O terminal 1T to connect to the telephone 202. The socket 201 and the LINE I/O terminal 1L, or the TEL I/O terminal 1T and the telephone 202 are connected by a modular cable 204 that has modular plugs 203 at both ends.

Figure 2:
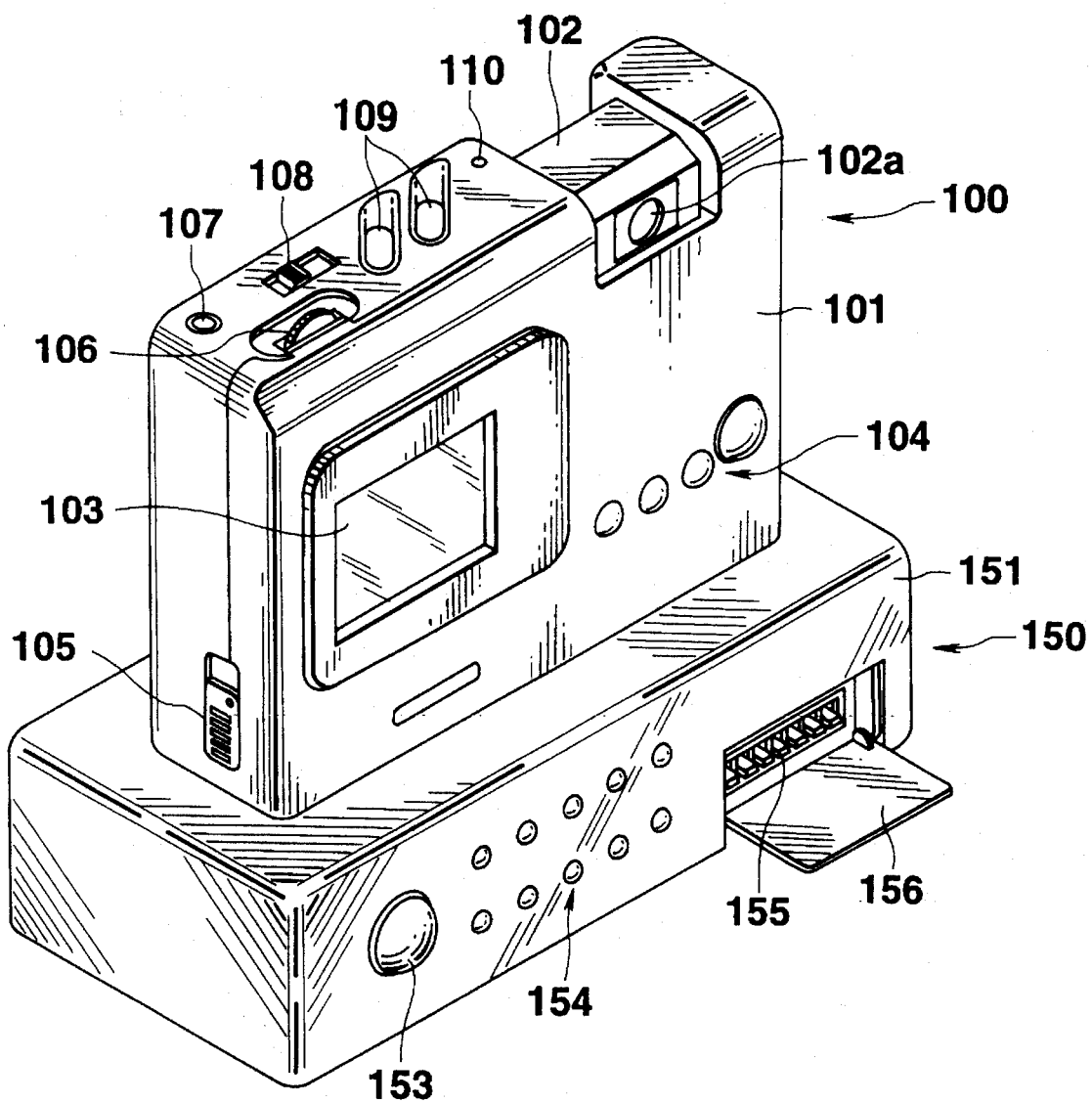
FIG. 2 is a perspective view of the TV telephone apparatus equipped with the TV telephone station in FIG. 1.
Figure 3:
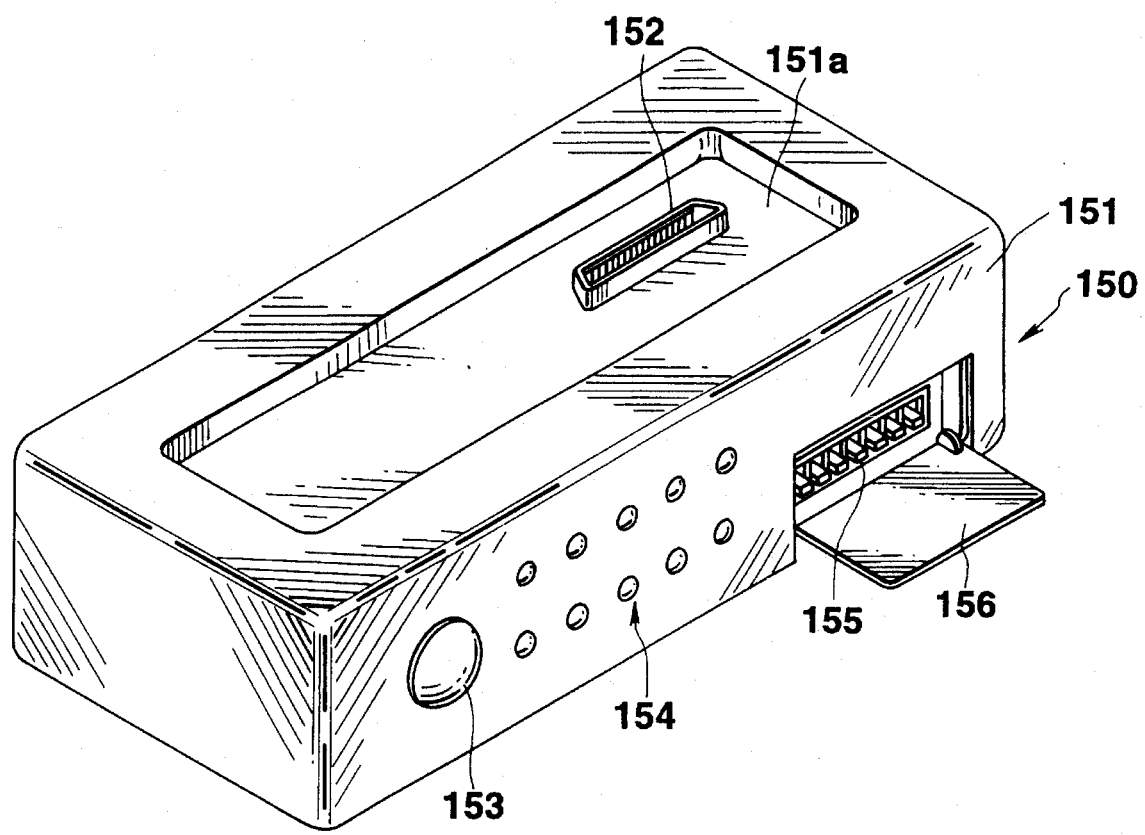
FIG. 3 is a perspective view of the TV telephone station in FIG. 2.

FIG. 2 is a perspective view of the TV telephone apparatus equipped with the TV telephone station in FIG. 1, and FIG. 3 is a perspective view of the TV telephone station in FIG. 2. In FIG. 2, the TV telephone apparatus 100 has a case 101 which has a horizontally elongated, narrow rectangular shape. A camera section 102 is mounted on the top left portion of the case 101, and is supported at the top portion of the case 101 to be rotatable 180 degrees in the forward and backward direction. Therefore, the angle of the lens 102a of the camera 102 can be adjusted within the range of 180 degrees in the forward and backward direction of the case 101, so that an object image can be picked up within 180 degrees in that direction. A liquid crystal display (LCD) section 103 and a key input section 104 are provided at the front of the case 101. The LCD section 103 has a DD (Display Driver) 34 and LCD (Liquid Crystal Display) 35, and the key input section 104 includes a plurality of key switches 10 that an operator uses to select and instruct various processes for the TV telephone apparatus 100, as will be described later with reference to FIG. 6. The LCD section 103 is a TFT (Thin Film Transistor) type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. Power switch 105 is provided on one side of the case 101 to turn on or off the main power supply of the TV telephone apparatus 100.

Provided at the top of the case 101 are a volume dial 106 for adjusting the volume of voice, an earphone terminal 107, a selector switch 108 for switching one mode to another, a tuning button 109, and a power indicter 110 which indicates the ON/OFF state of the main power supply. Provided at the bottom of the case 101 an I/O port (not shown) to connect to an I/O port terminal 152 provided at a recessed portion 151a of a case 151 of the TV telephone station 150, which will be discussed later. The horizontally long shape of the case 101 improves the stability of the TV telephone apparatus 100 when placed down or mounted on the station 150. The volume dial 106 is used to control the volume of a sound coming through an earphone. The tuning button 109 is used to increase or decrease the tuning frequency. The earphone terminal 107 is where an earphone that serves as a wire antenna is coupled, and also serves as an antenna terminal.

The TV telephone station 150, when connected with the compact, light and portable TV telephone apparatus 100, expands the functions of the TV telephone apparatus 100. The TV telephone station 150 of this embodiment incorporates a MODEM (Modulation and DEModulation) and NCU (Network Control Unit) which achieve a telephone function. When connected between the modular jack type socket 201 and the telephone 202, the TV telephone station 150 transmit and receive image data and voice data by the integrated telephone function.

In FIG. 2, the case 151 of the TV telephone station 150 has a rectangular shape wider and deeper than the case 101 of the TV telephone apparatus 100, and is short as compared with its width and depth so that the TV telephone apparatus 100 can stably stand upright when mounted. The recess 151a is formed at the top center of the case 151 to surely position the TV telephone apparatus 100 at a predetermined position, as shown in FIG. 3. The TV telephone apparatus 100 will be mounted on the TV telephone station 150 by placing the bottom of the TV telephone apparatus 100 on the recess 151 at the top center of the case 151. The aforementioned I/O port terminal 152 is provided at the top center of the recessed portion 151a of the case 151 and connects to the I/O port terminal (not shown) provided at the bottom of the TV telephone apparatus 100. When the TV telephone apparatus 100 is mounted on the recess 151a of the case 151 of the TV telephone station 150, their I/O ports engage with each other to ensure data exchange between the apparatus 100 and the station 150.

As shown in FIGS. 2 and 3, provided at the front of the case 151 are a power switch 153 to turn on or off the TV telephone station 150, an LED 154 for indicating a communication state, and a dip switch 155 for setting the communication environments of a MODEM 30 and NCU 31, which will be discussed later. The dip switch 155 is closed by a cover 156 provided at the front of the case 151 after setting is completed.

Figure 4:
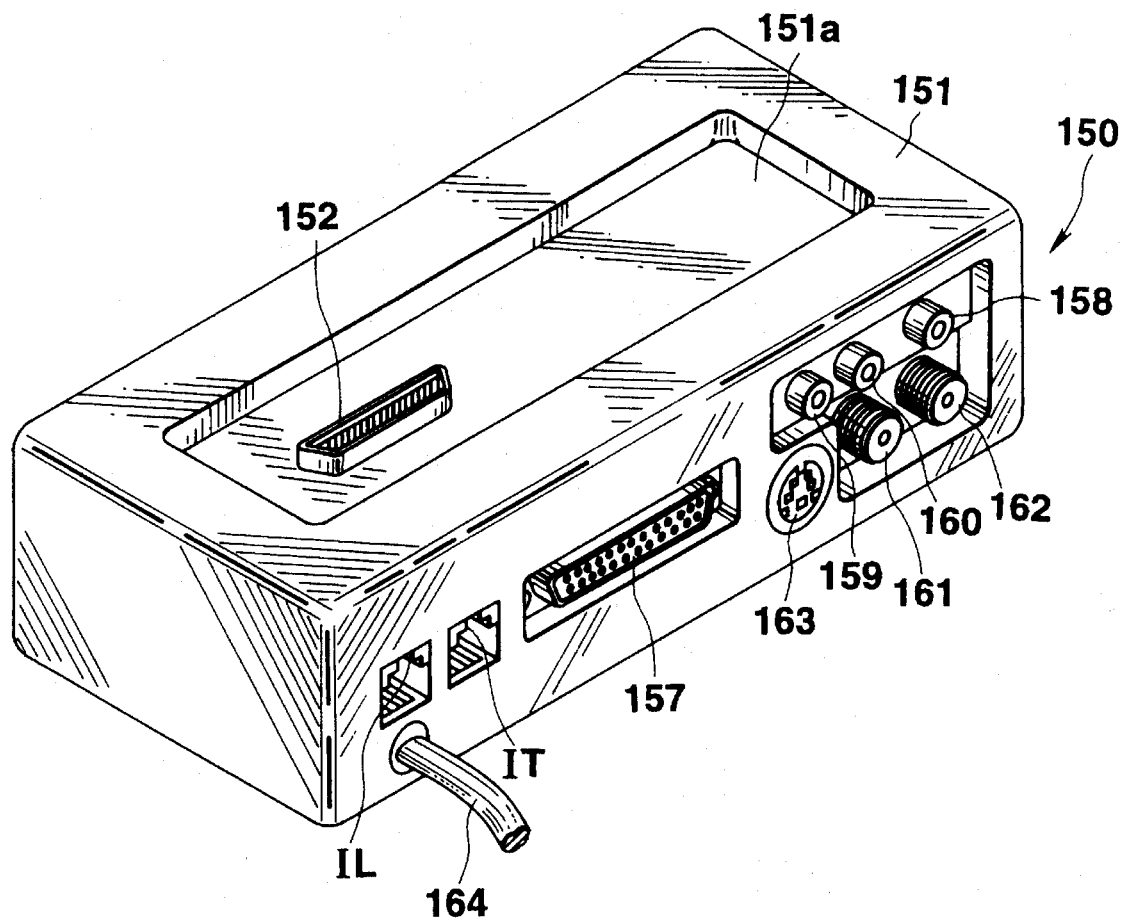
FIG. 4 is a perspective view showing the TV telephone station in FIG. 2 from the rear side.
Figure 5:
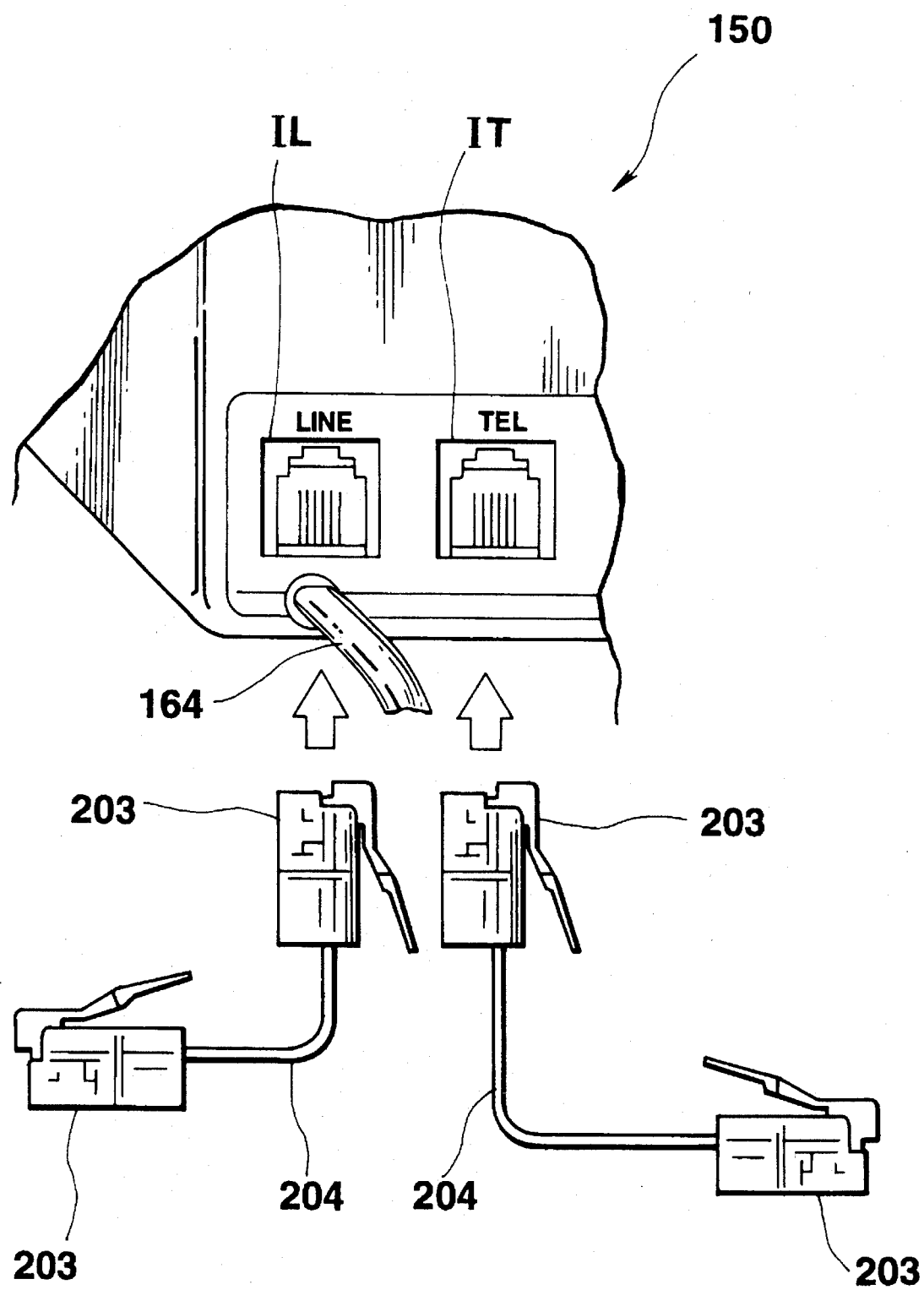
FIG. 5 is an enlarged view for explaining the structure of the essential portion in FIG. 4.

FIG. 4 is a perspective view showing the back of the TV telephone station in FIG. 2, and FIG. 5 is an enlarged view for explaining the structure of the essential portion in FIG. 4. Provided at the back of the case 151 are the aforementioned LINE I/O terminal IL and TEL I/O terminal 1T, an I/O port 157 for data input/output via a predetermined cable, a pin terminal 158 for receiving and sending a video signal, pin terminals 159 and 160 for receiving and sending a voice signal, a VHF antenna terminal 161 for receiving a VHF signal, a UHF antenna terminal 162 for receiving a UHF signal, an S terminal 163 for receiving and sending a video signal, and a power cord 164, as shown in FIG. 4. As shown in FIG. 5 which presents an enlarged illustration of the essential portion, the TV telephone station 150 intervenes between the socket 201 (FIG. 1) and the telephone 202 and is connected between the socket 201 and the telephone 202 by the modular cables 204 having the modular plugs 203 connected to the LINE I/O terminal 1L and the socket 201 and connected to the TEL I/O terminal 1T and the telephone 202.

In this case, since the TV telephone station 150 is designed on the premise that it is left in a house, an office or the like, the TV telephone station 150 may be left always connected to the socket (telephone line) 201 and the telephone 202. With this connection, even data exchange with the portable TV telephone apparatus 100 can be accomplished by connecting this TV telephone apparatus 100 to a telephone line or like outside the house.

Figure 6:
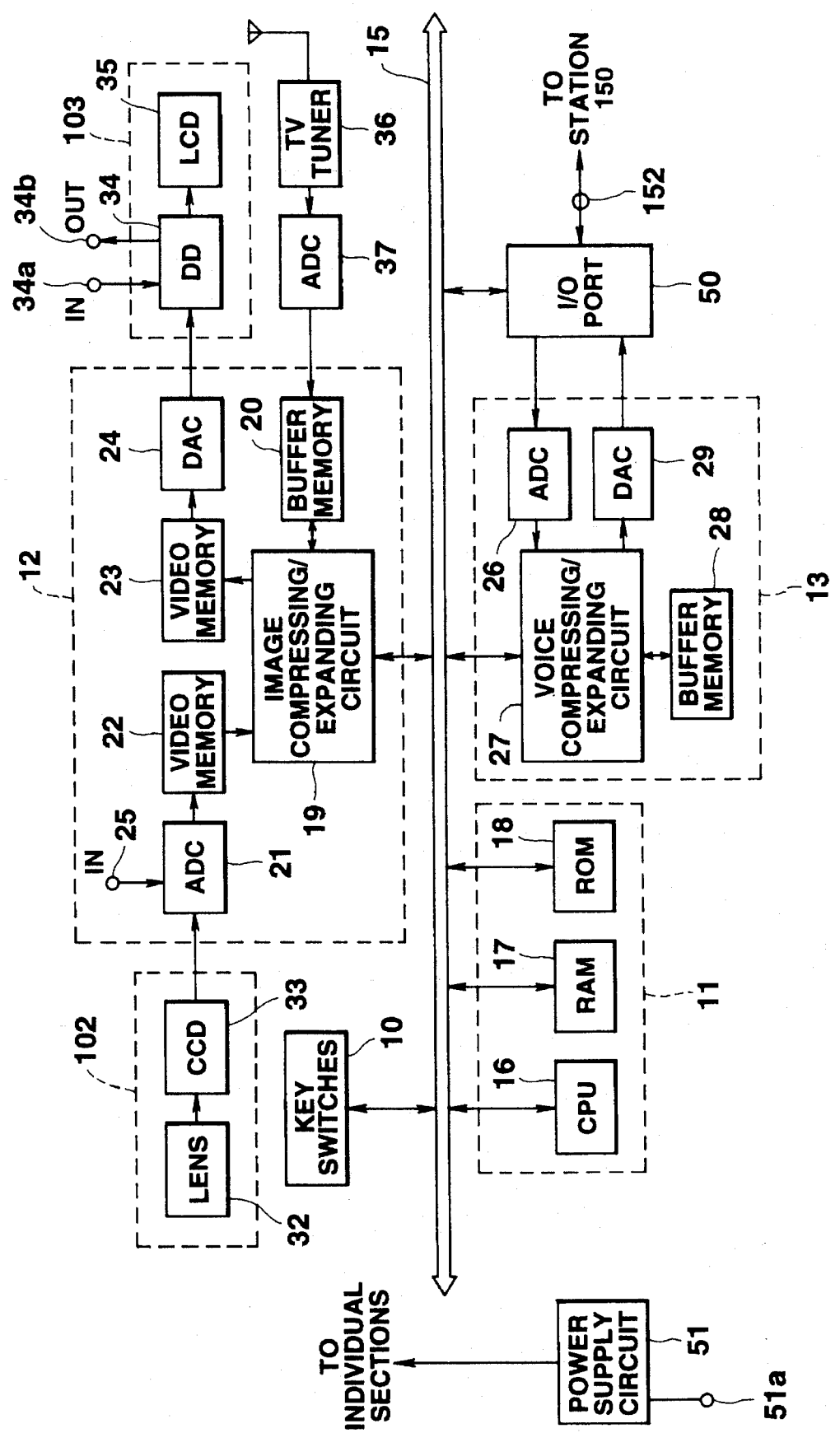
FIG. 6 is a block diagram showing the general structure of the TV telephone apparatus.

FIG. 6 presents a block diagram showing the schematic structure of the TV telephone apparatus 100 shown in FIG. 2. In FIG. 6, the TV telephone apparatus 100 comprises the camera section 102, the LCD section 103, a controller 11, an image processor 12, and a voice processor 13. The key input section 104, controller 11, image processor 12, voice processor 13 and an I/O port 50 are connected together by a bus 15.

The key input section 104, as shown in FIG. 2, has a plurality of key switches 10 that the operator uses to select and instruct various processes for the TV telephone apparatus 100.

The controller 11 comprises a CPU (Central Processing Unit) 16, RAM (Random Access Memory) 17, and ROM (Read Only Memory) 18. The I/O port 50 is an I/O mechanism which receives necessary data from outside and sends out data to an external device. The bus 15 is a signal line to connect the key switches 10, controller 11, image processor 12 and voice processor 13 together, and includes an address bus for specifying an address and a data bus for transferring data. The CPU 16 outputs various control signals over the bus 15 to the individual sections of the TV telephone apparatus 100 to control those sections, and runs a communication control program according to the type of the communication line to be linked. When the TV telephone apparatus 100 is mounted on the TV telephone station 150, the TV telephone station 150 receives multiplexed image data and voice data from the linked TV telephone apparatus of the other party, demodulates those data in a MODEM section 14 (see FIG. 7) and sends the demodulated data to the CPU 16. The CPU 16 separates the demodulated image data and voice data from each other, and sends compressed image data to an image compressing/expanding circuit 19 via the bus 15 while sending compressed voice data to a voice compressing/expanding circuit 27 via the bus 15. Further, the CPU 16 multiplexes the compressed image data sent from the image compressing/expending circuit 19 via the bus 15 and the compressed voice data sent from the voice compressing/expanding circuit 27 via the bus 15, and outputs the multiplexed image data and voice data to the MODEM section 14 of the TV telephone station 150 via the bus 15. The RAM 17 is a semiconductor memory for storing program data, which is used in the programmed processing that is executed by the CPU 16, the compressed image data and voice data, etc. The ROM 18 is a semiconductor memory for storing the program, data, etc. which are used inside the TV telephone apparatus 100.

The image processor 12 includes the image compressing/expanding circuit 19, a buffer memory 20, an ADC (Analog to Digital Converter) 21, a video memories (VRAMs) 22 and 23, and a DAC (Digital to Analog Converter) 24. The image compressing/expanding circuit 19 compresses (encodes) the image data stored in the video memory 22 by performing DCT (Discrete Cosine Transform), quantization and Hoffman coding every block of 8×8 pixels, based on a predetermined encoding system, such as JPEG (Joint Photographic (Coding) Experts Group) algorithm according to the type of images to be dealt with (still picture in this case), expands (decodes) compressed image data, which has been received over a communication line and has been demodulated by the MODEM section 14 in the TV telephone station 150, and stores the expanded image data into the video memory 23. The image compressing/expanding circuit 19 has a function to process image data, sent over the communication line as a color video signal of 110×160 pixels in 4096 colors (12 bits) at the maximum, as a YC signal which consists of a luminance signal (hereinafter referred to as "Y signal") equivalent to 220×279 pixels and a color signal (hereinafter referred to as "C signal") equivalent to 4096 colors. The 12-bit data of 110×160 pixels will be converted to 12-bit digital image data of 220×279 pixels. The data compression ratio in the image compression is about 7/100 (about 8/1000) in view of the image quality after expansion. The buffer memory 20 temporarily stores compressed image data coming from the image compressing/expanding circuit 19, and the compressed image data stored in this buffer memory 20 will be read piece by piece in response to a control instruction from the CPU 16. If the buffer memory 20 is given a sufficient memory capacity, plural blocks of image data picked up by the camera section 102 can be stored in compressed form, so that the TV telephone apparatus 100 may be used as an electronic still camera. The ADC 21 converts the image signal (analog signal) from the camera section 102 to a signal (digital signal) that can be processed in the image processor 12, and sends the resultant signal to the video memory 22. The video memories 22 and 23 are semiconductor VRAMs for storing image data (digital data) from the ADC 21 or the compressed or expanded image data (digital data) from the image compandor 19. The DAC 24 converts the image signal (digital signal) in the image data, stored in the video memory 23, to a signal (analog signal) that can be displayed on the LCD section 103, and sends the resultant signal to the LCD section 103. As an analog data driver is used as the data driver for an LCD 28 (to be described later) in first embodiment, the DAC 24 is needed. If a digital data driver is used as the data driver, however, this DAC 24 becomes unnecessary.

The voice processor 13 includes an ADC 26, the voice compandor 27, a buffer memory 28 and a DAC 29. The ADC 26 converts the voice signal (analog signal) which is input from the telephone 202 via the MODEM section 14, NCU 31 and I/O port 52 of the TV telephone station 150 and the I/O port 50 of the TV telephone apparatus 100, to a signal (digital signal) that can be processed in the voice processor 13, and sends the resultant signal to the voice compressing/ expanding circuit 27. The voice compressing/expanding circuit 27 compresses (encodes) the input data from the bus 15 by a predetermined encoding system, which is accomplished by means for analyzing the digital voice data from the ADC 26 over a given period of time according to, for example, a CELP (Code Excited Linear Prediction) algorithm, means of synthesizing the waveforms of voice data based on the analyzed parameters, means for calculating an error between the input waveform and the synthesized waveform, and other necessary means, and outputs the compressed voice data to the DAC 29. The voice compressing/expanding circuit 27 expands (decodes) the compressed image data, which has been received over the communication line and has been demodulated by the MODEM section 14 in the TV telephone station 150, and outputs the expanded image data to the DAC 29. The data compression ratio in the voice compression is about 5/100 (about 50/1000) in view of the voice quality after expansion. The buffer memory 28 temporarily stores compressed voice data coming from the voice compressing/expanding circuit 27. The compressed voice data stored in the buffer memory 28 will be read piece by piece in response to a control instruction from the CPU 16.

The camera section 102 comprises a lens 32 and a CCD (Charge Coupled Device) 33 in FIG. 6. The lens 32 is an optical lens made of glass or plastic, and is installed on the main body of the TV telephone apparatus 100. The CCD 33 generates an electric signal based on the intensity of light formed by the lens 32, and outputs this electric signal (analog signal) to the image processor 12.

The LCD section 103 includes the aforementioned DD 34 and LCD 35. Reference numeral "36" denotes a TV tuner, reference numeral "37" is an ADC, reference numeral "34a" is a video input terminal and reference numeral "34b" is a video output terminal. The DD 34 drives the LCD 35 to display an image on the LCD 35 based on the video signal input from the image processor 12 or the video signal coming from the video input terminal 34a. More specifically, the DD 34 converts the input video signal to an analog video signal (analog RGB signal) of a predetermined bit with 220×279 pixels and outputs the analog video signal to the LCD 35. The LCD 35 is a color LCD device having an LCD panel of TFT type which is one of active matrix types, and displays a color video signal in 4096 colors (12 bits) at the maximum when driven by the DD 34. As mentioned earlier, the number of display pixels of the LCD 35 is 110×160.

In general, an LCD is considerably thin, and is easily made compact and lighter, as compared with a CRT or other similar image display means. Since the active matrix type LCD can allow the intermediate tone to be finely controlled, can provide a higher contrast ratio and has a faster response, as compared with a direct matrix type LCD, the active matrix type LCD is a very effective device in the fields where multi-color display of a high-quality image is demanded. Particularly, the active matrix type LCD which uses three-terminal TFTs will provide a high-quality image that matches with that of a CRT.

The TV tuner 36 receives predetermined TV broadcasting waves, and outputs the video signals via the ADC 37 to the buffer memory 20.

The ADC 37 converts the analog video signal from the TV tuner 36 to a digital signal.

A power supply circuit 51 has a rechargeable batter and a voltage regulator, and regulates the supply voltage of the rechargeable battery with the voltage regulator to supply the regulated supply voltage to the individual sections of the TV telephone apparatus 100. Although the power supply circuit 51 uses a rechargeable battery in the first embodiment, it may use a non-rechargeable battery like a dry battery as well.

Figure 7:
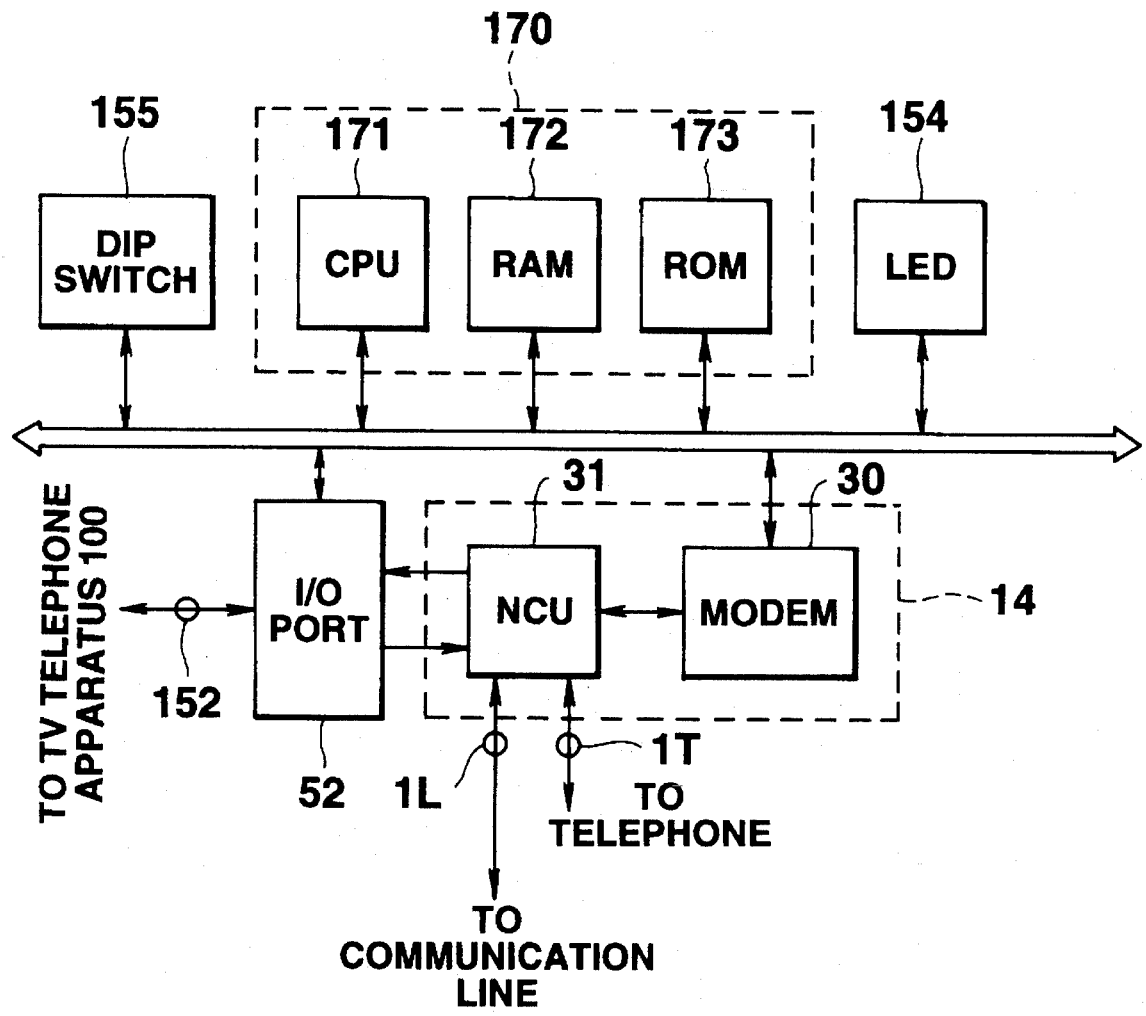
FIG. 7 is a block diagram showing the general structure of the TV telephone station.

FIG. 7 presents a block diagram showing the schematic structure of the TV telephone station 150 shown in FIG. 2. In FIG. 7, the TV telephone station 150 comprises the power switch 153, the LED 154, the dip switch 155, a controller 170, the MODEM section 14 and the I/O port 52.

The dip switch 155 is used to select various processes in the TV telephone station 50 and set the communication environments of the MODEM 30 and NCU 31.

The controller 170 comprises a CPU 171, RAM 172 and ROM 173. The CPU 171 controls the individual sections in the TV telephone station 150 and executes a communication control program according to the type of the communication line to be linked. When the TV telephone apparatus 100 is mounted on the TV telephone station 150, the CPU 171 receives multiplexed image data and voice data from the linked TV telephone apparatus of the other party, and demodulates those data in the MODEM section 14. The CPU 171 then separates the demodulated image data and voice data from each other, and sends compressed image data to the image compandor 19 while sending compressed voice data to the voice compressing/expanding circuit 27. Further, the CPU 171 multiplexes the compressed image data sent from the image compandor 19 and the compressed voice data sent from the voice compressing/expanding circuit 27, and outputs the multiplexed image data and voice data to the MODEM section 14. The RAM 172 is a semiconductor memory for storing program data, which is used in the programmed processing that is executed by the CPU 171, the voice data to be transmitted, etc. The ROM 173 is a semiconductor memory for storing the program, data, etc. which are used inside the TV telephone station 150.

The MODEM section 14 comprises the aforementioned MODEM 30 and NCU 31. As mentioned earlier, "1L and 1T" are I/O terminals for the communication line (ordinary subscriber line in this case). The I/O terminal 1L is connected to the modular jack type socket 201 via the modular cable 204, and the I/O terminal 1T to the telephone 202 also via the modular cable 204. The MODEM 30 and NCU 31 have a function as a modulator to convert a sequence of digital signals output from a computer or a terminal device to a transmission signal (analog signal) that can be transmitted over a communication line, and a function as a demodulator to restore a transmission signal (analog signal) received over the communication line to a digital signal that can be translated by a computer or a terminal device. The NCU 31 allows the use of an ordinary subscriber line as such a communication line. This MODEM 30 has an A/D converter and a buffer memory, and converts demodulated data to a digital signal and stores it in the buffer memory temporarily. The CPU 16 reads the data from this buffer memory, separates image data and voice data from each other, and sends the image data to the image compressing/expanding circuit 19 while sending the voice data to the voice compressing/expanding circuit 27. The MODEM 30 and NCU 31 in the first embodiment are capable of transmitting signals at the highest data transfer rate of 14400 bps for the analog public line. The MODEM 30 and NCU 31 puts a video code and a voice code in one frame that is a processing unit to thereby simultaneously transmit image data and voice data. One screen of image data will be transmitted as an intermittent image at a rate of one frame every three seconds.

Figure 8:
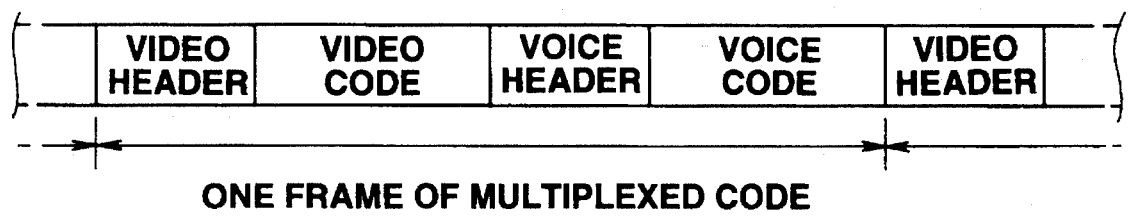
FIG. 8 is a diagram showing the structure of one frame of a multiplexed code.

FIG. 8 is a diagram showing the structure of one frame of a multiplexed code. The multiplexed code constituting one frame consists of video data of about 256 bytes (about 2048 bits), which has a video header and the video code, and voice data of about 256 bytes (about 2048 bits), which has a voice header and the voice code. The video code and voice code each includes an error correction code or redundancy checking code in addition to the video header or voice header affixed before the video code or the voice code. The total of the actual amount of image data included in the video code and the actual amount of voice data included in the voice code becomes 9600 bps of which 4800 bps are used for image data and the remaining 4800 bps for voice data.

More specifically, the data length of one frame is about 256 bytes for video data and about 256 bytes for voice data, amounting to about 512 bytes (about 4098 bits). The data transfer time for one frame therefore becomes about 280 ms (about 140 ms for video data and about 140 ms for voice data) at the transfer rate of 14400 bps. That is, about 2.57 frames of data are transmitted per second, and the amount of video data to be transmitted per second therefore is about 7300 bits (256×8×3.57=7311). According to the first embodiment, therefore, about 2500 bits of data, obtained by subtracting the actual image data (4800 bps) from about 7300 bits of data that is transmitted per second, includes information about the screen size, a command concerning image data transmission and the redundancy checking code.

Image data that is handled by the first embodiment is color image data in 4096 (12 bits) colors with 110×160 pixels per screen, and the amount of image data per screen is 110× 279×12=211200 bits (about 25.8 Kbytes). This image data is collectively compressed to about $^{68}/_{1000}$ to have 14400 bits in the image compressing process, and the 14400-bit image data is transmitted, 4800 bits per second, i.e., one frame every three seconds (=14400×4800), as an intermitted still picture. The amount of data that is actually transmitted per second is 70400 bits (about 8.6 Kbytes), obtained by dividing 211200 bits by 3, and this 70400-bit image data is compressed to about $^{68}/_{1000}$ to become a video code which includes 4800-bit image data. In this case, besides compressed image data obtained by collectively compressing one screen of image data, original image data may be divided in advance based on the transmission time and each divided image data may be compressed before transmission.

Voice data is treated as 12-bit digital data sampled at 8 KHz, and this voice data of 12×8000=96000 bits is compressed to about $^{50}/_{1000}$ to a voice code which includes 4800-bit voice data.

Next, the operation of the first embodiment will now be described with reference to FIGS. 1 through 12.

First, the operations of the controller 11 shown in FIG. 6 and the controller 170 shown in FIG. 7 will be discussed.

A program associated with the processing of the CPU 16 in the controller 11 is stored in the ROM 18 in the controller 11. The CPU 171 of the controller 170 gives control to the CPU 16 in the controller 11 when the TV telephone apparatus 100 is mounted on the TV telephone station 150 and a predetermined condition is met.

It is assumed in the following operational description of the first embodiment that the TV telephone apparatus 100 is mounted on the TV telephone station 150 and the apparatus 100 is connected to the LINE I/O terminal 1L and the TEL I/O terminal 1T of the TV telephone station 150 in a through state when the TV telephone apparatus 100 is powered off. Under this condition, a voice signal from the telephone 202 is output directly to the analog public line via a path from the TEL I/O terminal 1T to the LINE I/O terminal 1L, while a voice signal input from the analog public line is input directly to the telephone 202, passing through a path from the LINE I/O terminal 1L to the TEL I/O terminal 1T.

When the TV telephone apparatus 100 and TV telephone station 150 are powered on, the voice signal from the telephone 202 is input to the TV telephone apparatus 100 from the TEL I/O terminal 1T, is temporarily converted to a digital signal by the ADC 21, and then compressed through a predetermined compressing process in the voice compressing/expanding circuit 27. The compressed signal is then output on the bus 15. The voice signal on the bus 15 is then synthesized with the image signal by the CPU 16. The resultant signal is modulated by the MODEM 30 and NCU 31 of the TV telephone station 150 before being sent to the LINE I/O terminal 1L.

The input signal coming through the LINE I/O terminal 1L from the analog public line is demodulated by the MODEM 30 and NCU 31. The demodulated signal is then converted to a digital signal by a DSP (Digital Signal processor) in the MODEM 30. The digital signal is output on the bus 15 and is then separated into an image signal and a voice signal by the CPU 16. The voice signal is expanded by the voice compressing/expanding circuit 27 and is then converted to an analog signal by the DAC 24 before being output to the TEL I/O terminal 1L.

After powering on the TV telephone apparatus 100 and the TV telephone station 150, the operator lifts up the receiver of the telephone 202 to set an OFF hook state, and dials the telephone number of another party. As a result, the NCU 31 generates dial tones.

When the communication line is connected, the following transmission process and reception process will be executed.

In the transmission process and reception process, the TV telephone apparatus 100 and the TV telephone station 150 of this embodiment execute the image processing and voice processing in parallel. In the following description, therefore, the transmission process will be separately discussed for an image transmission process and a voice transmission process. The reception process will be separately discussed for an image reception process and a voice reception process.

In the image transmission process, image data picked up by the camera section 102 is stored via the ADC 21 into the video memory 22 and the image data in the video memory 22 is compressed through a predetermined compressing process by the image compressing/expanding circuit 19. The compressed image data is output to the MODEM section 14 of the TV telephone station 150 via the bus 15 and the I/O ports 50 and 52, and is then transmitted to the communicating destination. To record a self image (transmission image) which is displayed on the LCD 35 during talking, the operator should depress the image recording switch among the key switches 10, causing the image data to be stored in the video memory 23. Since the amount of one screen of image data is 211200 bits (about 25.8 Kbytes), the video memory 23, if having a capacity of 256 Kbytes, can store about nine to ten screens of image data. As one screen of compressed image data is 14400 bits (about 1.76 Kbytes), the RAM 17 should have an image-data storing area of about 18 Kbytes to store ten screens of compressed image data.

In the voice transmission process, the voice data input from the receiver of the telephone 202 is sent to the ADC 26 of the TV telephone apparatus 100 via the MODEM section 14 of the TV telephone station 150 and the I/O ports 52 and 50, and the voice data is compressed through a predetermined compressing process by the voice compressing/expanding circuit 27. The compressed voice data is sent via the bus 15 to the MODEM 30 in the MODEM section 14 of the TV telephone station 150, and is transmitted to the communicating destination via the NCU 31 and the I/O terminal 1L.

In the image reception process, the MODEM section 14 in the TV telephone station 150 determines whether or not there is an image reception signal. When there is an image reception signal, the demodulated image data is sent via the I/O ports 52 and 50 and the bus 15 to the image processor 12 where the received image data is expanded by the image compressing/expanding circuit 19. Then the expanded image data is stored in the video memory 23, and is output via the DAC 24 to the LCD section 103 so that it is displayed on the LCD 35. To record the image of the communicating party (reception image) which is displayed on the LCD 35 during talking, the operator should depress the image recording switch 10 for image recording, causing the image data to be stored in the video memory 23. Since the amount of one screen of image data is about 25.8 Kbytes, the video memory 23, if having a capacity of 256 Kbytes, can store about nine to ten screens of image data, as mentioned above. The video memory 23 may be separated to provide an area for three screens for transmission and an area for seven screens for reception.

In the voice reception process, the MODEM section 14 in the TV telephone station 150 determines whether or not there is a voice reception signal. When there is a voice reception signal, the demodulated voice signal is sent to the voice processor 13. The received voice data is sent over the bus 15 to the voice compressing/expanding circuit 27 to be expanded. Then the expanded voice data is output via the NCU 31 in the MODEM section 14 via the DAC 29, and a voice is output to the telephone 202 via the I/O terminal 1T.

The above-described transmission and reception processes are repeatedly executed until the receiver of the telephone 202 is replaced (ON hook state).

That is, according to the first embodiment, the image data and voice data compressed by the MODEM section of the TV telephone apparatus 100 are simultaneously transmitted, and one screen of image data (211200 bits) to be displayed on the LCD 35 are divided into three blocks based on the data compression ratio (about 7/100) in the image compressing/expanding circuit 19 and the image-data transfer rate (4800 bps) of the MODEM section 14, thus allowing for transmission of a high-quality image over the analog public line. As the LCD 35 has a screen size of 3 inches and one screen has data of 110×160 pixels×12 bits (4096 colors)= 211200 bits, image data is transmitted one frame every three seconds, but the time for transmitting one screen of image data is altered in accordance with a change in the number of pixels and the number of colors (gray scales) per screen.

Suppose that, in normal mode, image data in 4096 colors is transmitted, while in high image-quality mode, image data is displayed in 65536 colors (16 bits) with the same number of pixels (110×160 pixels). To transmit image data in high image-quality mode, the amount of one screen of image data, which is 110×160×16=281600 bits (about 34.4 Kbytes), becomes 19200 bits after compression to about 68/1000 in the image compressing process. An intermittent still picture is transmitted one frame per time that is obtained by dividing 19200 bits by the number of bits (4800 bits) that can be transmitted per second, i.e., 19200÷4800=4 seconds. In this case, therefore, image data of 70400 bits (about 8.6 Kbytes), obtained by dividing 281600 bits by 4, is compressed to about 68/1000 to become an image code that includes 4800 bits of image data as shown in FIG. 8.

Figure 9:
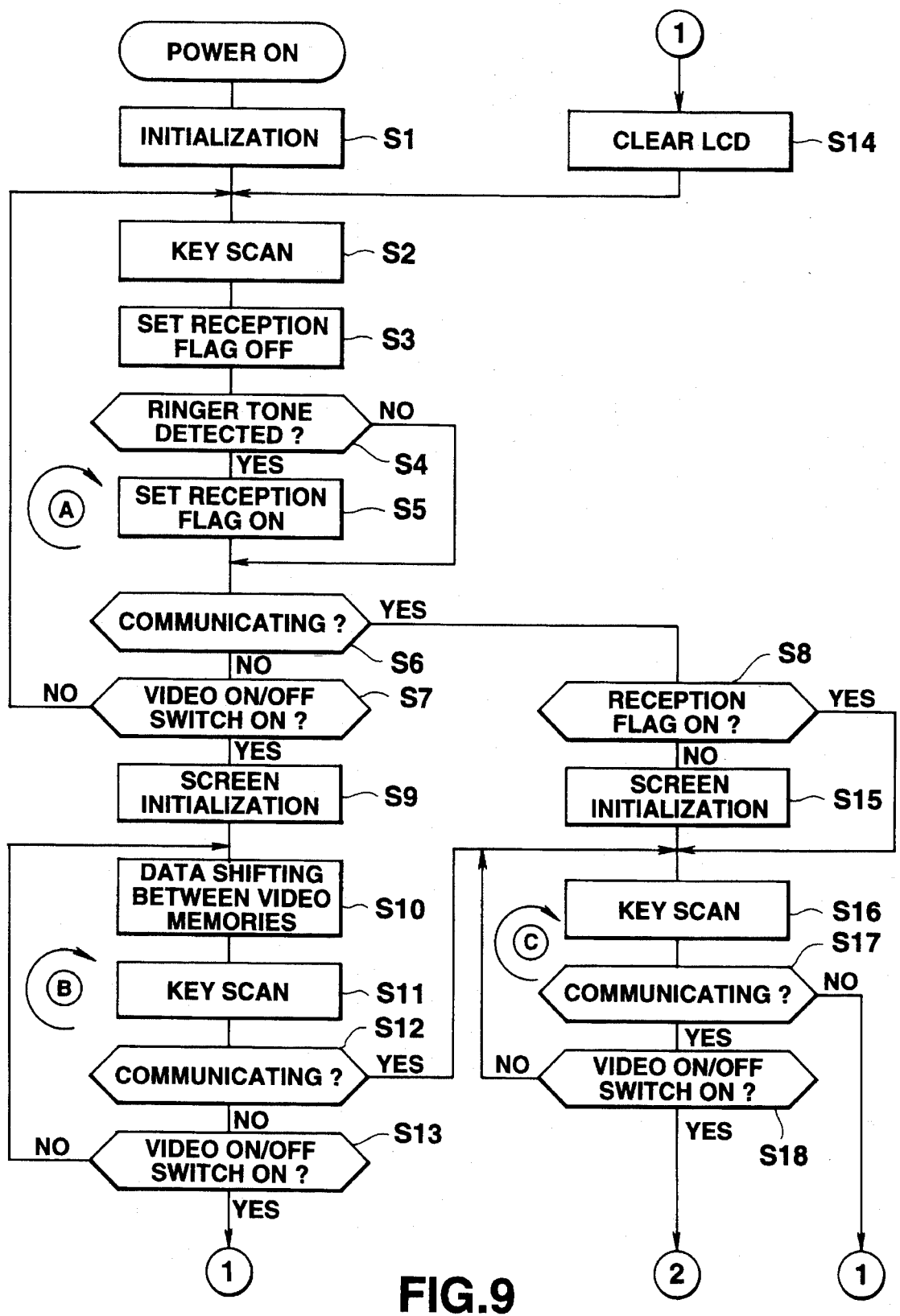
FIG. 9 is a flowchart illustrating the operation of the TV telephone apparatus and the TV telephone station.
Figure 10:
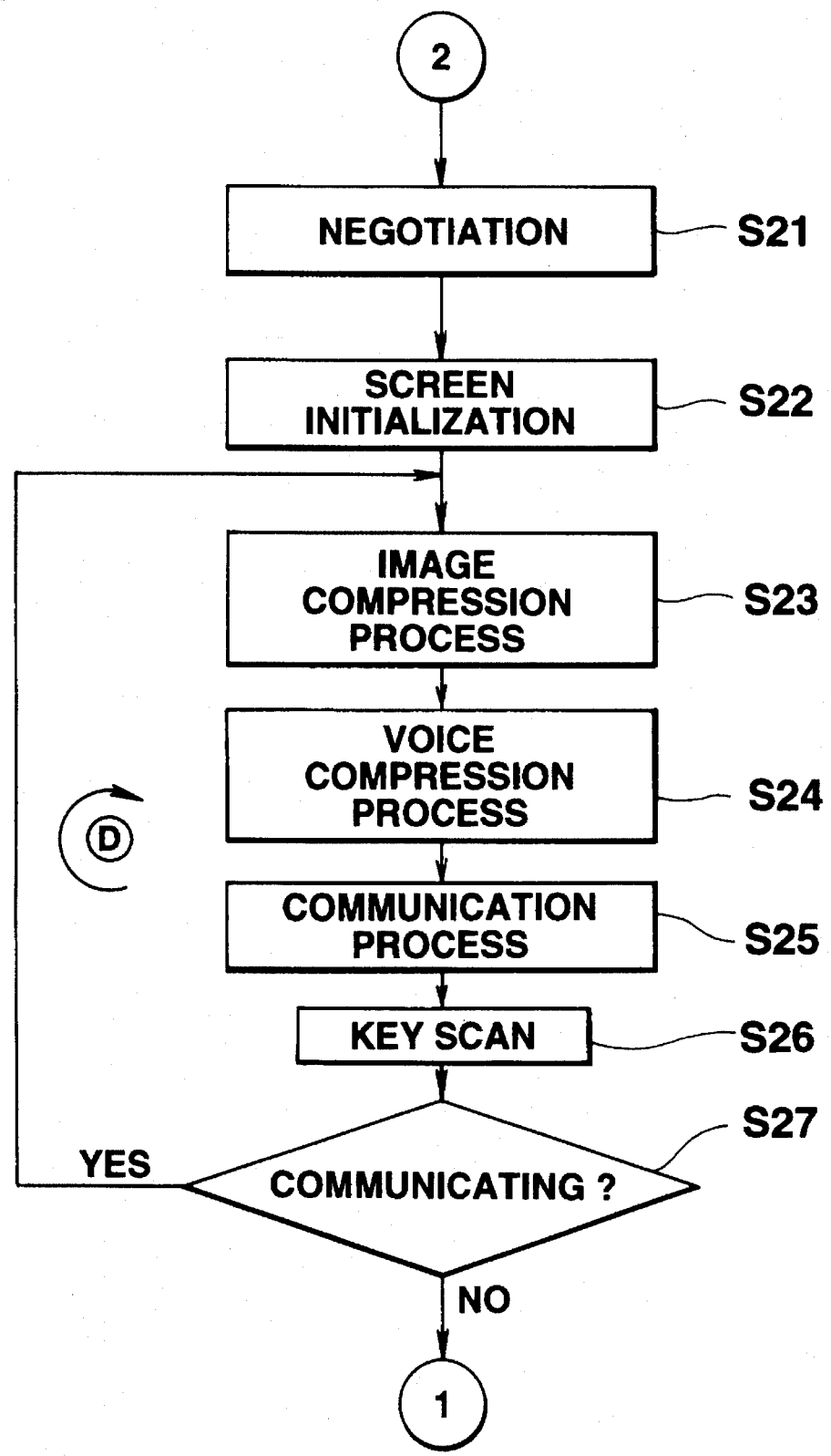
FIG. 10 is a flowchart illustrating the operation of the TV telephone apparatus and the TV telephone station.

FIGS. 9 and 10 are flowcharts for explaining the operations of the TV telephone apparatus 100 and the TV telephone station 150. As illustrated in the operation flowchart in FIG. 9, after the TV telephone apparatus 100 is powered on, initialization, such as initializing the controller 11 and clearing the individual memories, is executed (step S1). A key scan is performed to check if there is any input from the key switches 10 (step S2). If there is a key input, a process associated with that key operation is executed. Then, the reception flag is temporarily set off (="0") in (step S3), the line voltage level of the NCU 31 is monitored to check if there is a call from another party by detecting a ringer tone (step S4). When it is determined as a ringer tone period, the reception flag is set on (="1") (step S5), the line voltage level of the NCU 31 is monitored again to check if telephone communication is currently in progress (step S6). If there is no communication in progress at present, it is checked if the video switch among the key switches 10 has been depressed (step S7). When the video switch 10 has not been depressed, the flow returns to the aforementioned step S2 to repeat the same processing.

When the video switch has been depressed in the process of step S7, display screen is initialized (step S9). When the initialization of the LCD 35 is complete, the image data stored in the video memory 22 is read out to the image compressing/expanding circuit 19 from which it is output directly to the video memory 23, thus accomplishing the shifting of the image data from the video memory 22 to the video memory 23 (step S10). To check if there is any key switch 10 has been depressed, a key scan is performed (step S11). It is then determined whether or not telephone communication is in progress (step S12). When no telephone communication is in progress, it is checked if the video switch among the key switches 10 has been depressed (step S13). If the video switch has been depressed, the display screen of the LCD 35 of the LCD section 103 is cleared (step S14) and the flow then proceeds to step S2 to repeat the above-described sequence of processes. If the video switch has been depressed, the flow returns to step S10. When it is determined that telephone communication is in progress in step S12, the flow goes to step S16 which will be discussed later.

In other words, when no telephone communication is in progress, the video image picked up by the camera section 102 of the TV telephone apparatus 100 can be displayed on the LCD section 103 by switching the video switch on. Under this situation, switching the video switch off will terminate the image display on the LCD section 103.

When it is determined in the step S6 that telephone communication is in progress, it is determined whether or not the reception flag is ON (step S8). When the reception flag is OFF (="0"), the initialization of the display screen is carried out as in step S9 (step S15). Then, the key switches 10 are scanned (step S16) to check whether or not telephone communication is in progress (step S17). If telephone communication is in progress, it is checked if the video switch has been depressed (step S18). When the video switch has not been switched on, the flow returns to step S16 to repeat the above-described sequence of processes. If telephone communication is not in progress in step S17, the LCD 35 is cleared (step S14). The flow then returns to step S2 to repeat the above-described sequence of processes.

When the video switch is switched on in step S18, the flow proceeds to the process illustrated in FIG. 10. In the process in FIG. 10, first, a negotiation process is executed (step S21), and then the initialization of the screen of the LCD section 103 is performed (step S22). Next, compression/expansion of image data in the image processor 12 (step S23) and voice compression in the voice processor 13 (step S24) are performed in order. Data is transmitted or received by the communication process (step S25). A key scan is performed to check if there is any key input from the key switches 10 (step S26). It is then checked if telephone communication is in progress at present (step S27).

When the telephone communication is in progress in step S27, the flow returns to step S23 to repeat the sequence of processes starting from the compression/expansion of image data. When no telephone communication is in progress, on the other hand, the flow goes to step S14 in FIG. 9 to repeat the sequence of processes starting from the clearing of the LCD 35. That is, during telephone communication, the video image sent from the communicating party at the other end can be displayed on the LCD section 103 by switching the video image switch on, and the video image sent from the other party can be switched to the image picked up by the camera section 102 of the TV telephone apparatus 100 by switching the video switch off under this situation, thereby allowing the switched video image to be displayed on the LCD section 103.

The compression/expansion of image data in the aforementioned step S23, the compression/expansion of voice data in the step S24, and the communication process in the step S25 will now be described in detail. Since the TV telephone apparatus 100 of the first embodiment executes the image data processing and voice data in parallel in the transmission process and reception process, the following description will be given of the transmission process and reception process separately.

(Transmission Process)

Image data picked up by the camera section 102 is converted to digital data by the ADC 21, and the digital data is output to the video memory 22. The image data in the video memory 22 is compressed by the image compressing/expanding circuit 19 and is temporarily stored in the buffer memory 20. The image data stored in a compressed form in the buffer memory 20 is read out piece by piece in response to a control signal from the CPU 16. To record a self image (transmission image) which is displayed on the LCD 35 during talking, the operator should depress the image reading switch among the key switches 10. When this image reading switch is switched on, the CPU 16 transfers the image data in the buffer memory 20 to the RAM 17 for storage. In this case, since the amount of one screen of compressed image data is 14400 bits (about 1.76 Kbytes), the RAM 17 should have an image-data storing area of about 18 Kbytes to store ten screens of compressed image data.

Voice data input from the receiver of the telephone 202 is sent to the ADC 26 via the NCU 31 from the TEL I/O terminal 1T, and is converted to digital data there. The digital voice data is then compressed by the voice compressing/expanding circuit 27, and the compressed voice data is temporarily stored in the buffer memory 28. The voice data stored in a compressed form in the buffer memory 28 is read out piece by piece in response to a control signal from the CPU 16. The CPU 16 sequentially reads out the compressed image data and voice data and synthesizes both data and outputs the synthesized data to the MODEM 30. The MODEM modulates the received, compressed data, and converts the resultant data to analog data. The analog data is then output via the LINE I/O terminal 1L to the analog public line from the NCU 31.

(Reception Process)

The compressed image data and voice data are sent via the LINE I/O terminal 1L and NCU 31 to the MODEM 30 from the analog public line. The MODEM 30 demodulates the received data and converts the demodulated data to digital data, which is in turn sent piece by piece to the CPU 16 via the bus 15. The CPU 16 separates the synthesized data into image data and voice data, and temporarily stores the compressed image data in the buffer memory 20 and the compressed voice data in the buffer memory 28.

The image compressing/expanding circuit 19 sequentially reads the written image data from the buffer memory 20, expands it and then writes the expanded image data in the video memory 23. To record the image of the communicating party (reception image) which is displayed on the LCD 35 during talking, the operator should depress the image reading switch 10. When the image reading switch is switched on, the CPU 16 transfers the image data in the buffer memory 20 to the RAM 17 for storage. In this case, since the amount of one screen of compressed image data is about 25.8 Kbytes, the RAM 17, if having an image storing area of 256 Kbytes, can store about ten screens of image data, as mentioned above in the description of the transmission process. The RAM 17 may therefore be separated to provide an area for three screens for transmission image data and an area for seven screens for reception image data.

The voice compressing/expanding circuit 27 sequentially reads the written voice data from the buffer memory 28, expands it and then outputs the expanded image data to the DAC 29 at a given transfer rate. The expanded analog voice data is output via the TEL I/O terminal 1L to the telephone 202 from the NCU 31, so that the operator can hear the speech through the receiver.

The above-described transmission and reception processes are repeatedly executed until the receiver of the telephone 202 is replaced.

Figure 11:
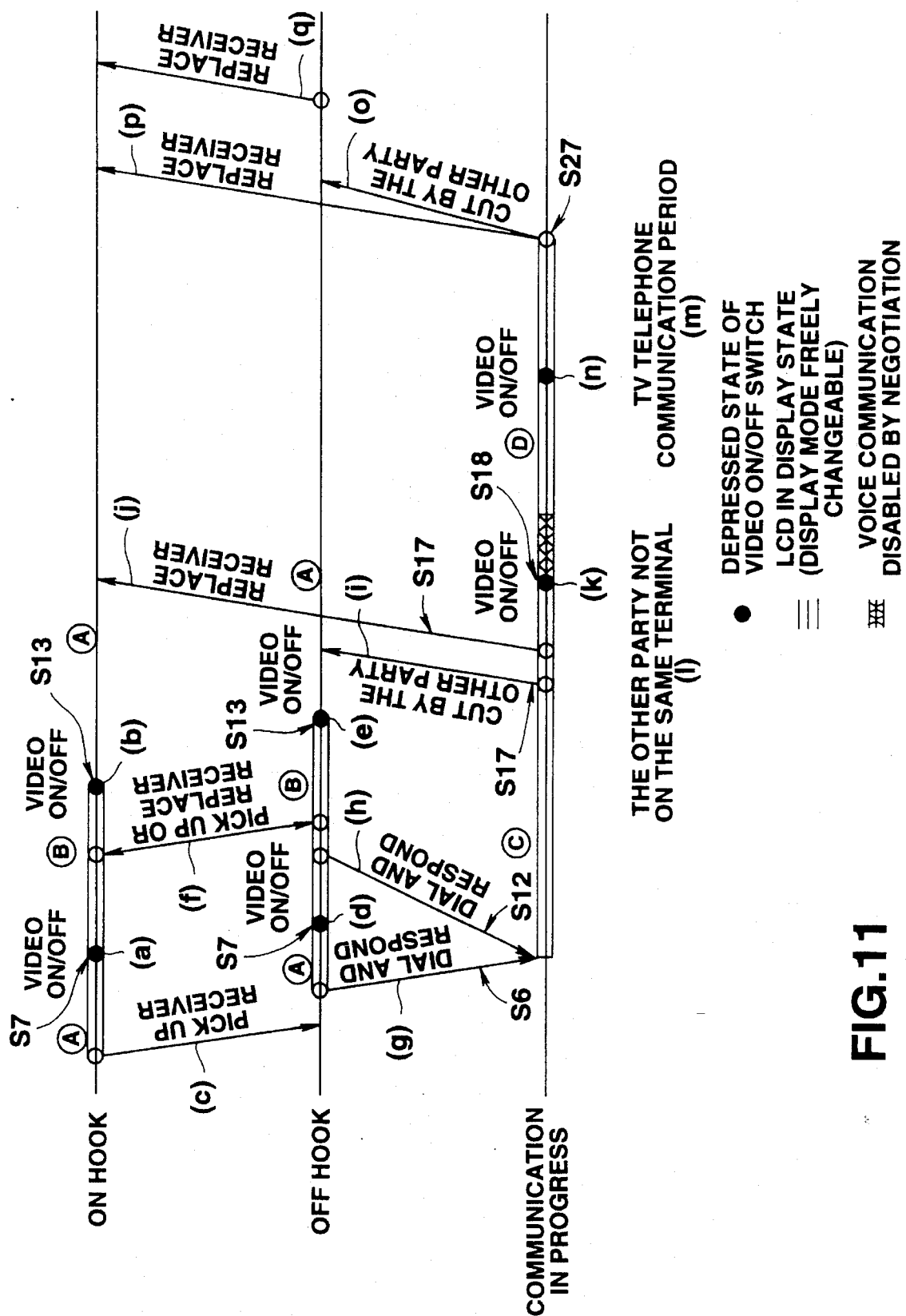
FIG. 11 is a flowchart illustrating the transmission operation of the TV telephone apparatus and the TV telephone station.
Figure 12:
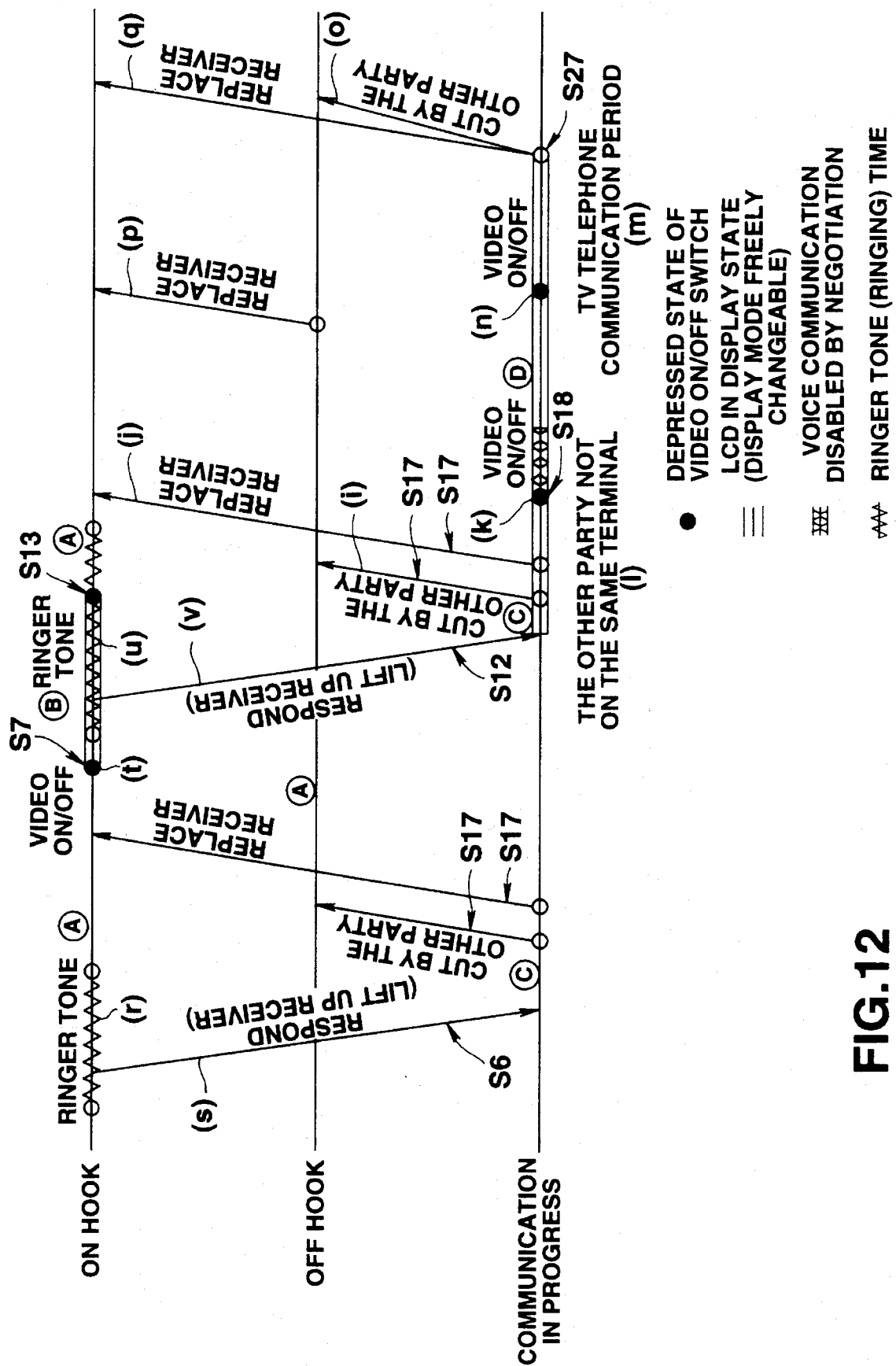
FIG. 12 is a flowchart illustrating the reception operation of the TV telephone apparatus and the TV telephone station.

FIGS. 11 and 12 are flow charts respectively illustrating the transmission operation and the reception operation of the TV telephone apparatus and the TV telephone station. In FIGS. 11 and 12, "ON hook" means that the receiver of the telephone 202 is replaced, and "OFF hook" means that the receiver of the telephone 202 is lifted. Further, "telephone communication in progress," "during telephone communication" or "during talking" means that the line is connected and two parties at both ends of the line are talking.

FIGS. 11 illustrates the transition of the communication states at the time of transmission. First, the transmission operation will be described referring to FIG. 11. In this diagram, the alphabets in capital letters A to D and the steps (S6, S7, S12, S13, S17, S18 and S27) correspond to those in the flowcharts in FIGS. 9 and 10. After power on, in an ON hook state (loop A), when the video switch is depressed once with the screen of the LCD 35 of the LCD section 103 off (see step S7 in FIG. 9 and (a) in FIG. 11), the LCD 35 becomes a display state (loop A→loop B) and the input image picked up by the camera of the TV telephone apparatus 100 on this side (the user side) is displayed as a monitored image on the LCD 35. When the video switch is depressed once under this condition (see step S13 in FIG. 9 and (b) in FIG. 11), the LCD 35 is cleared to return to the original state (loop B→loop A).

When the receiver is lifted up from the ON hook state (loop A) (see (c) in FIG. 11), this state changes to an OFF hook state.

In the OFF hook state (loop A), when the video switch is depressed once with the screen of the LCD 35 of the LCD section 103 off (see step S7 in FIG. 9 and (d) in FIG. 11), the LCD 35 becomes a display state and the input image picked up by the camera of the TV telephone apparatus 100 on this side is displayed as a monitored image on the LCD 35 (loop A→loop B), as in the aforementioned ON hook state. When the video switch is depressed once under this condition (see step S13 in FIG. 9 and (e) in FIG. 11), the LCD 35 is cleared to return to the OFF hook state (loop B→loop A).

Even when the receiver is lifted up or replaced in the ON hook and OFF hook states (see (f) in FIG. 11) with monitoring executed on the LCD 35 (the state marked by three lines in the ON hook and OFF hook states in FIG. 11), the state merely changes to the OFF hook state from the ON hook state or vice versa, and the monitored image on the LCD 35 will not change.

When a number is dialed in the OFF hook state regardless of whether the LCD 35 is in monitor display mode or is off, and communication with the intended party is established (see steps S6 and S12 in FIG. 9 and (g) and (h) in FIG. 11), the state becomes a talking state and the LCD 35 becomes a monitor display of this side (loop C). When the other party hangs up the telephone in this condition (see step S17 in FIG. 9 and (i) in FIG. 11), the state changes to the OFF hook state and the monitor display on the LCD 35 will be off (loop C→loop A). Even when the user hangs up the telephone during talking (see step S17 in FIG. 9 and (j) in FIG. 11), the state changes to the OFF hook state and the monitor display on the LCD 35 will disappear.

When the video switch is depressed during talking (loop C) and during monitoring on the LCD 35 on this side (see step S18 in FIG. 9 and (k) in FIG. 11), negotiation starts with the terminal of the other party. When it is determined that no communication between this side and the intended party is possible (see (l) in FIG. 11), the state returns to the one before the video switch has been depressed. When communication between this side and the intended party is possible, the TV telephone communication is established (see (m) in FIG. 11), after which image data and voice data are exchanged between those two parties (loop C→loop D).

In this state, depression of the video switch, irrespective of the number of the actions, is disregarded (see (n) in FIG. 11). Under this condition (loop D), when the other party hangs up the telephone (see step S27 in FIG. 9 and (o) in FIG. 11), the state changes to the OFF hook state and the monitor display on the LCD 35 will disappear (loop D→loop A). Even when the user hangs up the telephone (see step S27 in FIG. 9 and (p) in FIG. 11), the state changes to the OFF hook state and the monitor display on the LCD 35 will disappear too (loop D→loop A).

When the receiver is replaced with no monitor display made on the LCD 35 in the OFF hook state, the state changes to the ON hook state (see (q) in FIG. 11).

FIG. 12 illustrates the transition of the communication states at the reception time. The reception operation will now be described referring to FIG. 12. Those processes which have been discussed in the foregoing description of the transmission operation will not be repeated. The zone indicated by the zigzag line in FIG. 12 is a ringer tone period during which the telephone bell is ringing. During the ringer tone period (loop A) (see (r) in FIG. 12), when the receiver is lifted and answers the phone (see step S6 in FIG. 9 and (s) in FIG. 12), the state changes to a talking state. At this time, unlike in the case of transmission, the monitor display on the LCD 35 remains off (loop A→loop C). When the video switch is depressed once in the ON hook state (loop A) (see step S7 in FIG. 9 and (t) in FIG. 12), however, the LCD 35 becomes a monitor display state so that the user can monitor this side (loop A→loop B). At this time, a ringer tone is generated (see (u) in FIG. 12) and if the user responds to this ringer tone (see step S12 in FIG. 9 and (v) in FIG. 12), the communication state is established and the LCD 35 remains in a monitor display state. The video switch is effective when the apparatus is the ON hook state and also during the ringer tone period.

As described above, the TV telephone apparatus according to this embodiment comprises the portable TV telephone apparatus 100 whose case 101 is formed in a narrow rectangular box shape and which uses the LCD section 103 to be compact and light, and the TV telephone station 150, which expands or supplement the functions of the TV telephone apparatus 100. Further, the TV telephone station 150 is connected between the modular jack type socket 201 and the telephone 202, and is provided at the back with the LINE I/O terminal 1L to connect to an analog public telephone line and the TEL I/O terminal 1T to connect to the telephone 202. Therefore, when the TV telephone apparatus 100 is mounted on the TV telephone station 150, image data and voice data are transmitted and received via the telephone line. When the TV telephone apparatus 100 is used alone, the apparatus 100 can be carried around and used as a portable type due to the use of the LCD section 103 to make the apparatus compact and light. When the TV telephone apparatus 100 is installed on the TV telephone station 150, on the other hand, the telephone function incorporated in the station 150 permits the bidirectional transmission of image data and voice data becomes possible via the telephone line.

In particular, simply mounting the TV telephone apparatus 100 on the TV telephone station 150 can provide a TV telephone function due to the telephone function incorporated in the TV telephone station 150, without requiring connection of every one of terminals, such as various I/O terminals and a power terminal. It is therefore possible to relieve the user of the troublesome efforts to disconnect the I/O terminals, etc. when carrying the apparatus out and connect them again to use it. This will improve the operability of the apparatus significantly. Even any person who is not familiar with the connection/disconnection of the terminals can accomplish the proper connection to use the TV telephone function by a very simple work of mounting the TV telephone apparatus 100 on the TV telephone station 150. Therefore, anybody can easily use this TV telephone apparatus.

When the TV telephone apparatus 100, which has a function as a TV receiver, is mounted on the TV telephone station 150, the user can exchanges voices as well as can see the image of the party on the other end using the screen of the LCD section 103. Thus, high-grade image transmission can be accomplished while making the best use of the original features of the TV telephone apparatus. Particularly, the telephone function is incorporated in the TV telephone station 150 in this embodiment, so that the circuit structure of the TV telephone apparatus 100 becomes relatively simple. This contributes to making the TV telephone apparatus 100 more compact and lighter.

The TV telephone station 150 is provided with the I/O port 157 for data input/output, the pin terminal 158 for receiving and sending a video signal, the pin terminals 159 and 160 for receiving and sending a voice signal, the VHF antenna terminal 161 for receiving a VHF signal, the UHF antenna terminal 162 for receiving a UHF signal, and the S terminal 163 for receiving and sending a video signal, besides the LINE I/O terminal IL and TEL I/O terminal 1T. In addition to the aforementioned telephone function, the TV telephone apparatus 100 can exchange predetermined data with an external terminal via the TV telephone station 150 which has the above I/O terminals.

According to the conventional TV telephone apparatus, a separate recording device (e.g., an audio cassette tape recorder) is needed to record a transferred image, whereas, according to the first embodiment of the present invention, the large-capacity video memories 22 and 23 can easily store a desired image by the depression of the associated key switch 10 when on wants to record an image during talking. To record a compressed image, the image data in the video memories 22 and 23 may be compressed by the image compressing/expanding circuit 19 and then stored in the RAM 17.

If the ADC 37, which outputs the input signal from the TV tuner 36 to the buffer memory 20, is provided with a composite video I/O terminal and/or analog/digital RGB I/O terminal is provided as a video input terminal, this apparatus can be connected to video equipments including a video cassette recorder (VCR) and a laser disk player (LDP). For instance, when connected to a VCR having a video output terminal, the present apparatus can display a video image on the LCD section 103.

The conventional TV telephone apparatus which compresses image data and voice data before transmission, compressed data is transmitted, has been designed as non-portable, and once the apparatus is installed, it is not possible to move them around and use them at any desired location. According to the first embodiment, due to the recent high-quality display technology of LCD devices, a color TFT LCD is employed for the image display section to make the apparatus considerably compact and light, thus improving the portability and reducing the consumed power.

In short, the TV telephone apparatus 100 is not only designed compact and light, but has the essential sections provided inside the case 101. Particularly, the camera section 102 is attached to the case 101 with the image pickup section, such as the lens 102a, staying deep inside the case 101, so that when the TV telephone apparatus 100 is carried around in a bag or the like, the camera section 102 will not be damaged. The TV telephone apparatus 100 therefore has an improved portability. Although the camera section 102 is set deep inside the case 101, it may be attached at the same level as the outer surface of the case 101. In this case too, the portability of the TV telephone apparatus 100 can be improved.

Figure 13:
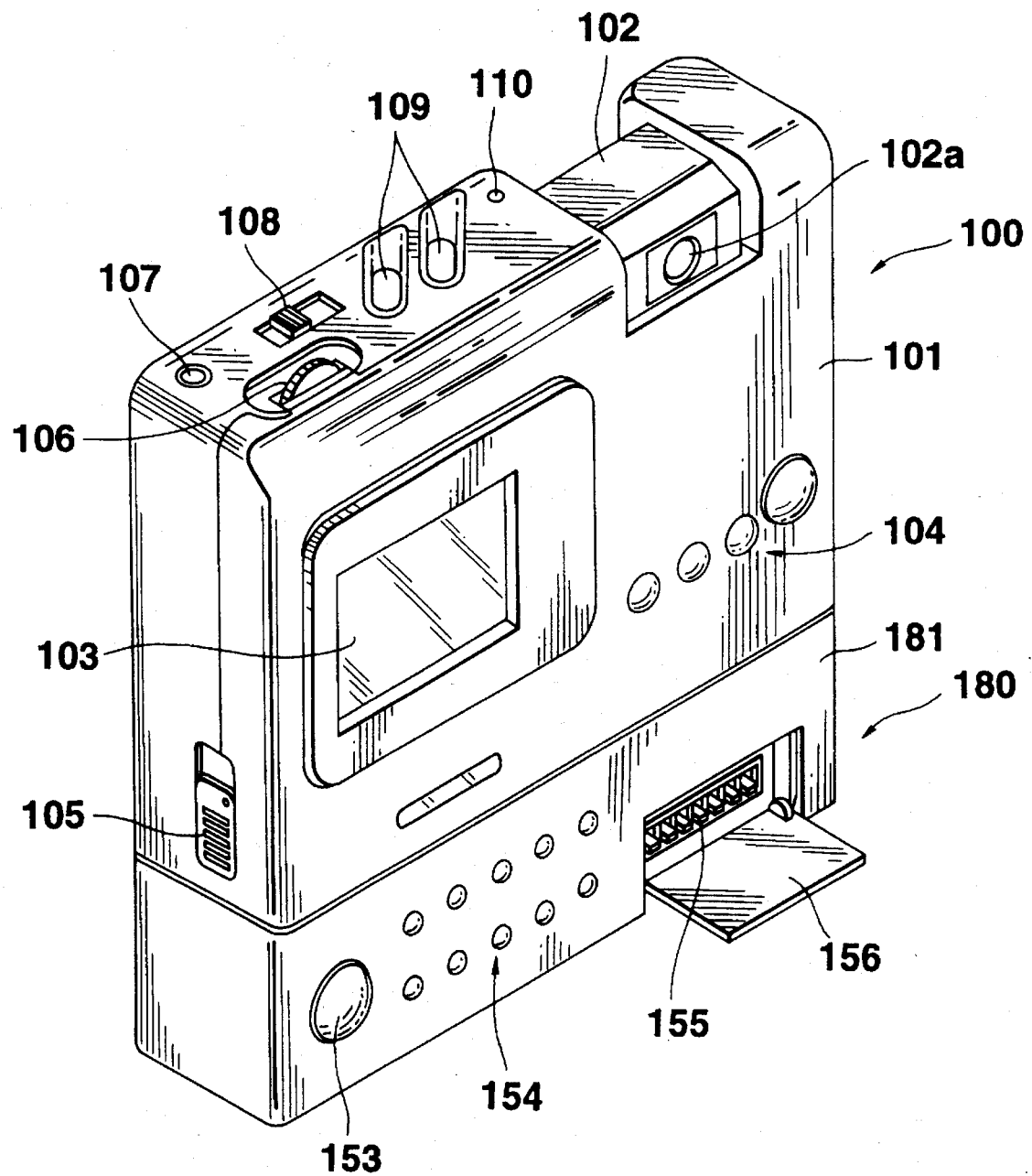
FIG. 13 is a diagram showing a modification of the first embodiment of the present invention.

FIG. 13 is a diagram showing a modification of the first embodiment of the present invention. Although the case 151 of the TV telephone station 150 has a rectangular box shape wider and deeper than the case 101 of the TV telephone apparatus 100 in the first embodiment, the present invention is not limited to this type. For example, as shown in FIG. 13, a case 181 of a TV telephone station 180 on which the TV telephone apparatus 100 is to be mounted may be formed in a narrow rectangular box shape having the same width and depth as the case 101 of the TV telephone apparatus 100. The same reference numerals as already used to described the components of the TV telephone station 150 will be used in FIG. 13 to denote corresponding or identical components, and their description will not be repeated. If the case 181 of the TV telephone station 180 is designed to have a shape matching with that of the case 101 of the TV telephone apparatus 100, the TV telephone apparatus 100, when mounted on the station 180, becomes an integral unit, so that the apparatus 100 and the station 180 can easily be carried as one unit.

The compression method for image data is not limited to the JPEG algorithm as employed in this embodiment, but other systems, such as a block coding system, predicted coding system and orthogonal transform coding system, may be used as well. The compression method for voice data is not limited to the aforementioned CELP algorithm used in this embodiment, but other systems, such as AD-PCM (Adaptive Differential Pulse Code Modulation) system and VSELP (Vector Sum Excited Linear Prediction) system may be used as well.

Second Embodiment

A pocket type TV telephone apparatus according to the second embodiment of the present invention will be described with reference to FIGS. 14 through 16. In the second embodiment, a telephone function is incorporated on the station side.

First, the structure of the second embodiment will be discussed.

FIG. 14 is a diagram for explaining the connection of a pocket type TV telephone apparatus equipped with a TV telephone station. The following description will be given with reference to the case where an ordinary analog telephone subscriber line is used as a communication line. In the description of the second embodiment, the same reference numerals as used for the TV telephone apparatus of the first embodiment will be used to denote the corresponding or identical components in order to avoid repeating their redundant description. Referring to FIG. 14, the TV telephone apparatus equipped with a TV telephone station according to this embodiment comprises a portable TV telephone apparatus 300 and a TV telephone station 350 having an integrated telephone function. The TV telephone apparatus 300 is designed to transmit and receive high-quality images, uses an LCD device to become compact and light, and is detachably mounted to the TV telephone station 350. The TV telephone station 350 is connected between a telephone line 201 and a telephone 202 to transmit and receive image data and voice data over the telephone line 201. The TV telephone station 350 where the TV telephone apparatus 300 is to be mounted, is connected between the modular jack type socket 201 and the telephone 202, and has a LINE I/O terminal 1L to connect to an analog public telephone line and a TEL I/O terminal 1T to connect to the telephone 202. The socket 201 and the LINE I/O terminal 1L, or the TEL I/O terminal 1T and the telephone 202 are connected by a modular cable 204 that has modular plugs 203 at both ends.

FIG. 15 is a perspective view of the TV telephone apparatus in FIG. 14. In FIG. 15, the TV telephone apparatus 300 has a case 301 which has a horizontally elongated, narrow rectangular box shape. The case 301 is 65 mm tall, 60 mm wide and 24 mm deep. Provided on and at the case 301 are a camera section 302, an LCD section 303, a key input section 304, a power switch 305, a volume dial 306, an earphone terminal 307, a selector switch 308, a tuning button 309 and a power indicator 310. The camera section 302 is a compact CCD camera facing the same way as the display surface of the LCD section 303. The LCD section 303 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. An operator uses the key input section 304 to select and instruct various processes for the TV telephone apparatus 300. The volume dial 306 serves to adjust the volume of a voice coming through an earphone, and the selector switch 308 switches one mode to another. The earphone terminal 307 is a terminal to which the earphone serving as an antenna wire is connected and which itself serves as an antenna terminal. The tuning button 309 is used to change the tuning frequency. The power indicter 110 indicates the ON/OFF state of the main power supply.

As shown in FIG. 14, provided at the bottom of the case 301 is an I/O port terminal 311 which connects to an I/O port (not shown) provided in the recess formed in the case 351 of the TV telephone station 350 (which will be discussed later). As the case 301 of the TV telephone apparatus 300 is designed in a vertically elongated form and is compact and light, the TV telephone apparatus 300 can be carried around easily in a pocket on clothes or the like, thus further improving the portability.

The TV telephone station 350, when connected with the compact, light and portable TV telephone apparatus 300, expands the functions of the TV telephone apparatus 300. The TV telephone station 350 of the second embodiment, which has the same function as the TV telephone station 150 of the first embodiment, incorporates a MODEM and NCU which achieve a telephone function. When connected between the modular jack type socket 201 and the telephone 202, as shown in FIG. 14, the TV telephone station 350 will transmit and receive image data and voice data by the integrated telephone function. In this case, since the TV telephone station 350 is designed on the premise that it is left in a house, an office or the like, the TV telephone station 350 may be left always connected to the telephone line 201 and the telephone 202. With this connection, even data exchange with the portable TV telephone apparatus 300 can be accomplished by connecting this TV telephone apparatus 300 to a telephone line or like outside the house.

In FIG. 14, the case 351 of the TV telephone station 350 has a telephone retaining portion 351a where the user stably places the pocket type TV telephone apparatus 300, tilting at a predetermined angle to provide better view for the user. The retaining portion 351a has a shape slightly larger in width and depth than the case 301 of the TV telephone apparatus 300 so that, when the TV telephone apparatus 300 is placed in this portion 351a, the apparatus 300 can stand upright with slight inclination. The portion of the retaining portion 351a which supports the back of the case 301 extends upward by a predetermined distance. By placing the bottom of the TV telephone apparatus 300 in the retaining portion 351a of the case 351 of the TV telephone station 350, therefore, the TV telephone apparatus 300 will be mounted on the TV telephone station 350 as shown in FIG. 16.

Formed at the bottom of the retaining portion 351a of the case 351 is an I/O port (not shown) which connects to the I/O port terminal 311, provided at the bottom of the TV telephone apparatus 300. When the TV telephone apparatus 300 is placed in the retaining portion 351a of the case 351 of the TV telephone station 350, their I/O port terminals engage with each other to ensure data exchange between the apparatus 300 and the station 350.

Provided at the bottom of the case 151 are the aforementioned LINE I/O terminal IL and TEL I/O terminal 1T, a pin terminal 352 for receiving and sending a video signal, pin terminals 353 and 354 for receiving and sending a voice signal, a VHF antenna terminal 355 for receiving a VHF signal, a UHF antenna terminal 356 for receiving a UHF signal, an S terminal 357 for receiving and sending a video signal, and a power cord (not shown), as shown in FIG. 14.

The block diagram schematically showing the structures of the TV telephone apparatus 300 and TV telephone station 350 of FIG. 14 are the same as the block diagrams of FIGS. 6 and 7, which show the schematic structures of the TV telephone apparatus 100 and TV telephone station 150 of the first embodiment. The description of the former block diagram will not therefore given below. Although the TV telephone station 350 shown in FIG. 14 do not have the power switch, LED, dip switch and so forth not illustrated, the station 305 may of course be provided with those of the TV telephone station 150.

Then, the operation of the second embodiment will now be described with reference to FIGS. 14 through 16.

According to the second embodiment, the case 301 of the TV telephone apparatus 300 has a narrow rectangular box shape for good portability, and the apparatus 300, when mounted on the TV telephone station 350, can provide a telephone function, so that the apparatus 300 will be connected between the telephone line 201 and telephone 202 via this station 350 to transmit and receive image data and voice data over the telephone line 201. Particularly, as the main body of the TV telephone apparatus 300 is very light and compact, it can be placed in a bag or a pocket on clothes. That is, the TV telephone apparatus 300 has an improved portability.

The TV telephone apparatus 300, when mounted on the TV telephone station 350, will function as follows to transmit and receive image data and voice data.

It is assumed in the following operational description of the second embodiment that the TV telephone apparatus 300 is mounted on the TV telephone station 350, and has a first operation mode to process image data and voice data and a second operation mode to receive a broadcasted TV program and display the received TV video image. When the TV telephone apparatus 300 is deactivated, or it is activated in second operation mode, the apparatus 300 is connected to the LINE I/O terminal 1L and the TEL I/O terminal 1T. Under this condition, a voice signal from the telephone 202 is output directly to the analog public line via a path from the TEL I/O terminal 1T to the LINE I/O terminal 1L, while a voice signal input from the analog public line is input directly to the telephone 202, passing through a path from the LINE I/O terminal 1L to the TEL I/O terminal 1T.

When the TV telephone apparatus 300 is powered on and is in first operation mode, the voice signal from the telephone 202 is input to the TV telephone apparatus 300 from the TEL I/O terminal 1T, is temporarily converted to a digital signal by the ADC 26, and then compressed through a predetermined compressing process in the voice compressing/expanding circuit 27. The compressed signal is then output on the bus 15. The voice signal on the bus 15 is then synthesized with the image signal by the CPU 16, and the resultant signal is modulated by the MODEM 30 and NCU 31 before being sent to the LINE I/O terminal 1L.

The input signal coming through the LINE I/O terminal 1L from the analog public line is demodulated by the MODEM 30 and NCU 31 of the TV telephone station 350. The demodulated signal is then converted to a digital signal by a DSP in the MODEM 30. The digital signal is output on the bus 15 and is then separated into an image signal and a voice signal by the CPU 16. The voice signal is expanded by the voice compressing/expanding circuit 27 and is then converted to an analog signal by the DAC 29 before being output to the TEL I/O terminal 1L.

As described above, the TV telephone apparatus according to the second embodiment comprises the portable TV telephone apparatus 300 whose case 301 is formed in a vertically elongated pocket size and which uses the LCD section 303 to be compact and light, and the TV telephone station 350, which expands or supplement the functions of the TV telephone apparatus 300. The TV telephone station 350 is connected between the modular jack type socket 201 and the telephone 202. Further, the case 351 of the TV telephone station 350 has the telephone retaining portion 351a where the user stably places the pocket type TV telephone apparatus 300, tilting at a predetermined angle to provide better view for the user, and is provided with the LINE I/O terminal 1L to connect to an analog public telephone line and the TEL I/O terminal 1T to connect to the telephone 202. Therefore, when the TV telephone apparatus 300 is mounted on the TV telephone station 350, image data and voice data are transmitted and received via the telephone line. With the above design, the TV telephone apparatus 300 is compact and light, so that it can easily be carried around in a pocket on clothes or the like, thus further improving the portability. When the TV telephone apparatus 300 is installed on the TV telephone station 350, the telephone function incorporated in the station 350 permits the bidirectional transmission of image data and voice data becomes possible via the telephone line.

In particular, as in the first embodiment, simply mounting the TV telephone apparatus 300 on the TV telephone station 350 will allow the apparatus 300 to be used as a TV telephone, without requiring connection of every one of terminals, such as various I/O terminals and a power terminal. It is therefore possible to improve the operability of the apparatus significantly.

Since the telephone function is incorporated in the TV telephone station 350 in the second embodiment too, the circuit structure of the TV telephone apparatus 300 becomes relatively simple. This contributes to making the TV telephone apparatus 300 more compact and lighter.

The TV telephone station 350 of the second embodiment is provided with the I/O port (not shown) for data input/output, the pin terminal 352 for receiving and sending a video signal, the pin terminals 353 and 354 for receiving and sending a voice signal, the VHF antenna terminal 355 for receiving a VHF signal, and the UHF antenna terminal 356 for receiving a UHF signal, besides the LINE I/O terminal IL and TEL I/O terminal 1T. Therefore, the TV telephone station 350, like the TV telephone station 150 of the first embodiment, can permit the TV telephone apparatus 300 to exchange predetermined data with an external terminal as well as provide the telephone function.

According to the second embodiment, the case 351 of the TV telephone station 350 has the telephone retaining portion 351a where the user stably places the pocket type TV telephone apparatus 300, tilting at a predetermined angle to provide better view for the user. The TV telephone station 350 is not however limited to this particular design, but may have any structure as long as the station 350 can expand the functions of the TV telephone apparatus 300 when the apparatus 300 is mounted on the station 350.

Third Embodiment

A TV telephone apparatus according to the third embodiment of the present invention will be described with reference to FIGS. 17 through 22. In the third embodiment, a telephone function and a power supply circuit are provided on the station side so that a predetermined supply voltage is supplied to the telephone main body from the station side.

First, the structure of the third embodiment will be discussed below. The following description will be given with reference to the case where an ordinary analog telephone subscriber line is used as a communication line. In the description of the third embodiment, the same reference numerals as used for the TV telephone apparatus of the first embodiment will be used to denote the corresponding or identical components in order to avoid repeating their redundant description.

FIG. 17 is a diagram for explaining the connection of a TV telephone apparatus equipped with a TV telephone station. Referring to FIG. 17, the TV telephone apparatus equipped with a TV telephone station according to the third embodiment comprises a compact and light TV telephone apparatus 400 and a TV telephone station 450, which has an integrated telephone function and is capable of supplying a predetermined supply voltage to the apparatus 400 when the apparatus 400 is mounted on the station 450. The TV telephone apparatus 400 is designed to be detachably mounted to the TV telephone station 450. The TV telephone station 450 can transmit and receive image data and voice data over the telephone line by its own telephone function in place of the telephone function of the TV telephone apparatus 400.

The TV telephone apparatus 400 of a portable type, which is light and compact, incorporates a MODEM and NCU which achieve a telephone function. The TV telephone apparatus 400 may be carried around to different places and will be connected to the telephone line 201 or the telephone 202 at the destination, as needed, so that the apparatus 400 can transmit and receive image data and voice data over the telephone line 201 by its integrated telephone function.

The TV telephone apparatus 400 may be connected between the modular jack type socket 201 and the telephone 202, and has, at the back, a LINE I/O terminal 1L to connect to an analog public telephone line and a TEL I/O terminal 1T to connect to the telephone 202. The socket 201 and the LINE I/O terminal 1L of the TV telephone apparatus 400, or the TEL I/O terminal 1T thereof and the telephone 202 are connected by a modular cable 204 that has modular plugs 203 at both ends.

When connected between the telephone line 201 and the telephone 202 as shown in FIG. 17, the TV telephone apparatus 400 will transmit and receive image data and voice data by the integrated telephone function which is achieved by the MODEM and NCU.

FIG. 18 is a perspective view of the TV telephone apparatus equipped with the TV telephone station in FIG. 17. In FIG. 18, the TV telephone apparatus 400 has a case 401 which has a horizontally elongated, narrow rectangular box shape. A camera section 102 is mounted on the top left portion of the case 401, and is supported at the top portion of the case 401 to be rotatable 180 degrees in the forward and backward direction. Therefore, the angle of the lens, 102a, of the camera 102 can be adjusted within the range of 180 degrees in the forward and backward direction of the case 401, so that an object image can be picked up within 180 degrees in that direction. An LCD section 103 and a key input section 104 are provided at the front of the case 401, with a power switch 105 provided on the side of the case 401. The LCD section 103 has a DD 34 and LCD 35, and the key input section 104 includes a plurality of key switches 10 that an operator uses to select and instruct various processes for the TV telephone apparatus 400, as will be described later.

Provided at the top of the case 401 are a volume dial 106 for adjusting the volume of voice, an earphone terminal 107, selector switches 108 and 109 for switching one mode to another, and a power indicter 110 which indicates the ON/OFF state of the main power supply. Provided at the bottom of the case 401 are a power supply terminal (not shown) and an I/O port (not shown). The power supply terminal connects to a power supply terminal 452 provided in a recess 451a formed in a case 451 of the TV telephone station 450, which will be discussed later, and supplies a DC voltage of a predetermined level to the TV telephone apparatus 400. The not-illustrated I/O port connects to an I/O port 452 provided in the recess 451a in the case 451 of the TV telephone station 450.

The TV telephone station 450, when connected with the compact, light and portable TV telephone apparatus 400, expands the functions of the TV telephone apparatus 400. The TV telephone station 450 of the third embodiment has a power supply circuit for supplying a DC voltage of a predetermined level to the TV telephone apparatus 400, in addition to the telephone function of the TV telephone station 150 of the first embodiment.

In FIG. 18, the case 451 of the TV telephone station 450 has a rectangular box shape wider and deeper than the case 401 of the TV telephone apparatus 400, and is short as compared with its width and depth so that the TV telephone apparatus 400 can stably stand upright when mounted. The power switch 153 for powering the TV telephone station 450 on or off is provided at the front of the case 451.

FIG. 19 is a perspective view showing the back of the TV telephone apparatus in FIG. 18. Provided at the back of the case 401 are the LINE I/O terminal 1L and the TEL I/O terminal 1T and an I/O port 402 that ensures data input/output over a predetermined cable, as shown in FIG. 19.

FIG. 20 is a perspective view showing the back of the TV telephone station in FIG. 18. The recess 451a is formed at the top center of the case 451 to surely position the TV telephone apparatus 400 at a predetermined position, as shown in FIG. 20. The TV telephone apparatus 400 will be mounted on the TV telephone station 450 by placing the bottom of the TV telephone apparatus 400 on the recess 451 at the top center of the case 451.

The aforementioned I/O port terminal 452 is provided at the top center of the recessed portion 451a of the case 451 and connects to the I/O port terminal (not shown) provided at the bottom of the TV telephone apparatus 400. The power supply terminal 452, which connects to a power supply terminal 51a (FIG. 21) provided at the bottom of the TV telephone apparatus 400, is provided at the left center of the recess 451a of the case 451. When the TV telephone apparatus 400 is mounted on the recess 451a of the case 451 of the TV telephone station 450, their I/O ports engage with each other to ensure data exchange between the apparatus 400 and the station 450, and the power supply terminals are connected to each other so that the DC voltage of the predetermined level will be supplied to the TV telephone apparatus 400 from the TV telephone station 450.

Provided at the back of the case 451 are the aforementioned LINE I/O terminal IL and TEL I/O terminal 1T, an I/O port 157 for data input/output via a predetermined cable, a pin terminal 158 for receiving and sending a video signal, pin terminals 159 and 160 for receiving and sending a voice signal, a VHF antenna terminal 161 for receiving a VHF signal, a UHF antenna terminal 162 for receiving a UHF signal, an S terminal 163 for receiving and sending a video signal, and a power cord 164, as shown in FIG. 20.

In this case, since the TV telephone station 450 appears to be often placed in a house, an office or the like, the LINE I/O terminal 1L and TEL I/O terminal of the TV telephone station 450 may be left always connected to the telephone line 201 and the telephone 202, respectively. With this connection, by simply placing the TV telephone apparatus 400 on the TV telephone station 450, the TV telephone apparatus 400 will be connected to the telephone line via the station 450.

FIG. 21 is a block diagram showing the schematic structure of the TV telephone apparatus 400 shown in FIGS. 18 and 19. This TV telephone apparatus 400 has a circuit structure as shown in FIG. 21. In FIG. 21, the same reference numerals as used for the circuit components of the first embodiment shown in FIGS. 6 and 7 will be used to denote the corresponding or identical components, and their description will not be repeated below. In FIG. 21, the TV telephone apparatus 400 comprises the camera section 102, the LCD section 103, a controller 11, an image processor 12, a voice processor 13 and a MODEM section 14. The key input section 104, the controller 11, the image processor 12, the voice processor 13, the MODEM section 14, and an I/O port 50a are connected together by a bus 15.

The camera section 102, like the camera section 102 of the first embodiment, comprises a lens 32 and a CCD 33 and outputs an image signal (analog signal), obtained by picking up an object, to an ADC 21 of the image processor 12.

The image processor 12 includes two video memories 22 and 23 and a buffer memory 20 in addition to the aforementioned image compressing/expanding circuit 19, ADC 21 and DAC 24. The video memories 22 and 23 are both VRAMs. The video memory 22 is a semiconductor memory for storing image data (digital data) output from the ADC 21. The video memory 23 is a semiconductor memory for storing image data (digital data) which has been compressed or expanded by the image compressing/expanding circuit 19, and has a display buffer inside. The buffer memory 20 temporarily stores image data, which is undergoing image compression/expansion in the image compressing process or image expanding process in the image compressing/expanding circuit 19.

The LCD section 103 comprises the DD 34 and LCD 35 as in the first embodiment.

The voice processor 13 has a buffer memory 28 in addition to the voice compressing/expanding circuit 27, ADC 26 and DAC 29 as in the first embodiment. The buffer memory 28 temporarily stores voice data, which is undergoing voice compression/expansion in the voice compressing process or voice expanding process in the voice compressing/expanding circuit 27.

The I/O port 50a is an I/O mechanism which receives necessary data from outside and sends out data to the TV telephone station 450.

A power supply circuit 51 has a rechargeable batter and a voltage regulator, and regulates the supply voltage of the rechargeable battery with the voltage regulator to supply the regulated supply voltage to the individual sections of the TV telephone apparatus 400. The aforementioned power supply terminal 51a is connected to this power supply circuit 51, so that the DC voltage is supplied from the power supply circuit 175 of the TV telephone station 450. The power supply circuit 51 charges the incorporated rechargeable battery with the DC voltage supplied via the power supply terminal 51a from the TV telephone station 450, or regulates the DC voltage and supplies the regulated voltage to the individual sections of the TV telephone apparatus 400. Although the power supply circuit 51 uses a rechargeable battery in this embodiment, it may use a non-rechargeable battery like a dry battery as well.

FIG. 22 is a block diagram showing the general structure of the TV telephone station. The CPU 171 controls the individual sections in the TV telephone station 450 and executes a communication control program according to the type of the communication line to be linked. When the TV telephone apparatus 400 is mounted on the TV telephone station 450, the CPU 171 receives multiplexed image data and voice data from the linked TV telephone apparatus of the other party, and demodulates those data in the MODEM section 14. The CPU 171 then separates the demodulated image data and voice data from each other, and sends compressed image data to the image compressing/expanding circuit 19 while sending compressed voice data to the voice compressing/expanding circuit 27. Further, the CPU 171 multiplexes the compressed image data sent from the image compressing/expanding circuit 19 of the TV telephone apparatus 400 and the compressed voice data sent from the voice compressing/expanding circuit 27, and outputs the multiplexed image data and voice data to the MODEM section 14. The RAM 172 is a semiconductor memory for storing program data, which is used in the programmed processing that is executed by the CPU 171, the voice data to be transmitted, etc. The ROM 173 is a semiconductor memory for storing the program, data, etc. which are used inside the TV telephone station 450.

The MODEM section 14 comprises the aforementioned MODEM 30 and NCU 31. As mentioned earlier, "1L and "1T" are I/O terminals for the communication line (ordinary subscriber line in this case). The I/O terminal 1L is connected to the modular jack type socket 201 via the modular cable 204, and the I/O terminal 1T to the telephone 202 also via the modular cable 204. The MODEM 30 and NCU 31 have a function as a modulator to convert a sequence of digital signals output from a computer or a terminal device to a transmission signal (analog signal) that can be transmitted over a communication line, and a function as a demodulator to restore a transmission signal (analog signal) received over the communication line to a digital signal that can be translated by a computer or a terminal device. The NCU 31 allows the use of an ordinary subscriber line as such a communication line. This MODEM 30 has an A/D converter and a buffer memory, and converts demodulated data to a digital signal and stores it in the buffer memory temporarily. The CPU 16 reads the data from this buffer memory, separates image data and voice data from each other, and sends the image data to the image compressing/expanding circuit 19 of the TV telephone apparatus 400 while sending the voice data to the voice compressing/expanding circuit 27 thereof.

The power supply circuit 175 is a power supply adapter for supplying a DC voltage of a predetermined level to the TV telephone apparatus 400.

Then, the operation of the third embodiment will now be described.

To begin with, the operations of the controller 11 shown in FIG. 21 and the controller 170 shown in FIG. 22 will be discussed.

A program associated with the processing of the CPU 16 in the controller 11 is stored in the ROM 18 in the controller 11. The CPU 171 of the controller 170 gives control to the CPU 16 in the controller 11 when the TV telephone apparatus 400 is mounted on the TV telephone station 450 and a predetermined condition is met.

It is assumed in the following operational description of the third embodiment that the TV telephone apparatus 400 is mounted on the TV telephone station 450 and the apparatus 400 is connected to the LINE I/O terminal 1L and the TEL I/O terminal 1T of the TV telephone station 450 in a through state when the TV telephone apparatus 400 is powered off. Under this condition, a voice signal from the telephone 202 is output directly to the analog public line via a path from the TEL I/O terminal 1T to the LINE I/O terminal 1L, while a voice signal input from the analog public line is input directly to the telephone 202, passing through a path from the LINE I/O terminal 1L to the TEL I/O terminal 1T.

When the TV telephone apparatus 400 and TV telephone station 450 are powered on, the voice signal from the telephone 202 is input to the TV telephone apparatus 400 from the TEL I/O terminal 1T, is temporarily converted to a digital signal by the ADC 21, and then compressed through a predetermined compressing process in the voice compressing/expanding circuit 27. The compressed signal is then output on the bus 15. The voice signal on the bus 15 is then synthesized with the image signal by the CPU 16, and the resultant signal is modulated by the MODEM 30 and NCU 31 of the TV telephone station 450 before being sent to the LINE I/O terminal 1L.

The input signal coming through the LINE I/O terminal 1L from the analog public line is demodulated by the MODEM 30 and NCU 31, and the demodulated signal is then converted to a digital signal by a DSP in the MODEM 30. The digital signal is output on the bus 15 and is then separated into an image signal and a voice signal by the CPU 16. The voice signal is expanded by the voice compressing/expanding circuit 27 and is then converted to an analog signal by the DAC 24 before being output to the TEL I/O terminal 1L.

As described above, the TV telephone apparatus according to the third embodiment comprises the compact and light TV telephone apparatus 400 and the TV telephone station 450, which has an integrated telephone function and is capable of supplying a predetermined supply voltage to the apparatus 400 when the apparatus 400 is mounted on the station 450. The TV telephone apparatus 400 is designed to be detachably mounted to the TV telephone station 450. The TV telephone station 450 can transmit/receive image data and voice data over the telephone line by its own telephone function in place of the telephone function of the TV telephone apparatus 400. The TV telephone apparatus 400 is connectable between the modular jack type socket 201 and the telephone 202, and has, at the back, the LINE I/O terminal 1L to connect to an analog public telephone line and the TEL I/O terminal 1T to connect to the telephone 202. The TV telephone station 450 is equipped with the power supply circuit for supplying a DC voltage of a predetermined level to the TV telephone apparatus 400, so that when the TV telephone apparatus 400 is mounted on the TV telephone station 450, the DC voltage of the predetermined level will be supplied to the apparatus 400 from the station side. Therefore, simply mounting the TV telephone apparatus 400 on the TV telephone station 450 will allow the DC voltage to be immediately supplied to the incorporated rechargeable battery in the TV telephone apparatus 400 from the power supply circuit of the TV telephone station 450 to charge the battery, as well as will allow the apparatus 400 to be used as a TV telephone, without requiring connection of every one of terminals, such as various I/O terminals and a power terminal. By placing the TV telephone apparatus 400 whose battery power becomes low due to the portable use on the TV telephone station 450, therefore, charging the battery of the apparatus 400 will start without requiring replacement of the rechargeable battery or connection of a power supply adapter to the apparatus 400. while the apparatus 400 is placed on the station 450, the battery will be automatically charged to a sufficient level, thus improving the operability and portability of the apparatus 400.

As the TV telephone apparatus 400 is provided with the telephone function, the apparatus 400 can, by itself, transmit and receive image data and voice data via a telephone line, out of an office or home, thus further contributing to the portable use out of an office or home. The TV telephone apparatus 400 can of course be used as a TV telephone, while coupled to the TV telephone station 450, in which case the user can use the apparatus 400 for a long period of time without worrying about the battery power.

Although the case 451 of the TV telephone station 450 has a rectangular box shape wider and deeper than the case 401 of the TV telephone apparatus 400 in the third embodiment, the present invention is not limited to this type. For example, as shown in FIG. 13 of the first embodiment, a case 181 of a TV telephone station 180 on which the TV telephone apparatus 400 is to be mounted may be formed in a narrow rectangular box shape having the same width and depth as the case 401 of the TV telephone apparatus 400. If the case 181 of the TV telephone station 180 is designed to have a shape matching with that of the case 401 of the TV telephone apparatus 400, the TV telephone apparatus 400, when mounted on the station 180, becomes an integral unit, so that the apparatus 400 and the station 180 can easily be carried as one unit.

The TV telephone station 450 of the third embodiment has a power supply adapter for supplying a DC voltage of a predetermined level to the TV telephone apparatus 400, and the TV telephone stations 150 and 350 of the first and second embodiments have an integrated telephone function to expand the functions of the TV telephone apparatus. But, the TV telephone station is not restricted to those types, but may be any type which expands the functions of the TV telephone apparatus. For instance, the TV telephone station 150 in FIG. 3 of the first embodiment may be added with the battery function of the TV telephone station 450 in FIG. 21 of the third embodiment.

Fourth Embodiment

FIGS. 23 through 27 illustrate a TV telephone apparatus according to the fourth embodiment of the present invention, with a telephone function incorporated in the TV telephone apparatus and a power supply circuit provided on the station side.

To begin with, the structure of the fourth embodiment will be discussed. In the description of the fourth embodiment, the same reference numerals as used for the TV telephone apparatus of the second embodiment will be used to denote the corresponding or identical components in order so that repeating their redundant description will be avoided.

FIG. 23 is a diagram for explaining the connection of a pocket type TV telephone apparatus equipped with a TV telephone station. Referring to FIG. 23, the TV telephone apparatus equipped with a TV telephone station according to the fourth embodiment comprises a portable TV telephone apparatus 500 with an integrated telephone function, and a TV telephone station 550. The telephone apparatus 400 is designed to transmit/receive highquality images when connected between a telephone line and a telephone, uses an LCD device to become compact and light, and can detachably be connected to the TV telephone station 550. The TV telephone station 550 is designed to expand the functions of the TV telephone apparatus 500.

The TV telephone apparatus 500, which is light and compact and portable, incorporates a MODEM and NCU which achieve a telephone function. The TV telephone apparatus 500 may be carried around to different places and will be connected to the telephone line 201 or the telephone 202 at the destination so that the apparatus 500 can transmit and receive image data and voice data over the telephone line 201 by its integrated telephone function, as shown in FIG. 23.

The TV telephone apparatus 500 may be connected between the modular jack type socket 201 and the telephone 202, and has, at the back, a LINE I/O terminal 1L to connect to an analog public telephone line and a TEL I/O terminal 1T to connect to the telephone 202. The socket 201 and the LINE I/O terminal 1L of the TV telephone apparatus 500, or the TEL I/O terminal 1T thereof and the telephone 202 are connected by a modular cable 204 that has modular plugs 203 at both ends.

The TV telephone station 550, when connected with the compact, light and portable TV telephone apparatus 500, expands the functions of the TV telephone apparatus 500. The TV telephone station 550 of the fourth embodiment, like the TV telephone station 350 of the third embodiment, is equipped with a power supply circuit for supplying a DC voltage of a predetermined level to the TV telephone apparatus 500.

In FIG. 23, the case 551 of the TV telephone station 550 has a telephone retaining portion 351a where the user stably places the pocket type TV telephone apparatus 500, tilting at a predetermined angle to provide better view for the user. The retaining portion 551a has a shape slightly larger in width and depth than the case 501 of the TV telephone apparatus 500 so that when the TV telephone apparatus 500 is placed in this portion 551a, the apparatus 500 can stand upright with slight inclination. The portion of the retaining portion 551a which supports the back of the case 501 extends upward by a predetermined distance.

FIG. 24 is a perspective view of the TV telephone apparatus in FIG. 23. In FIG. 24, the TV telephone apparatus 500 has a case 501 which has a horizontally elongated, narrow rectangular box shape. Provided on and at the case 501 are a camera section 302, an LCD section 303, a key input section 304, a power switch 305, a volume dial 306, an earphone terminal 307, a selector switch 308, a tuning button 309 and a power indicator 310.

Provided at the upper portion of the back of the case 501 are the LINE I/O terminal 1L and the TEL I/O terminal 1T and an I/O port 503 that ensures data input/output over a predetermined cable, as shown in FIG. 25.

Provided at the bottom of the case 501 is a power supply terminal 502 for supplying a DC voltage of a predetermined level to the TV telephone apparatus 500 when coupled to a power supply terminal (not shown) provided at a retaining portion 551a of a case 551 of the TV telephone station 550 (which will be discussed later), as shown in FIG. 23.

As the case 501 of the TV telephone apparatus 500 is designed in a vertically elongated form and is compact and light, the portability of the TV telephone apparatus 500 is improved. By placing the bottom of the TV telephone apparatus 500 in the retaining portion 551a of the case 551 of the TV telephone station 550, therefore, the TV telephone apparatus 500 will be mounted on the TV telephone station 550.

FIG. 25 is a perspective view showing the back of the telephone apparatus in FIG. 23. Since the LINE I/O terminal 1L, TEL I/O terminal 1T and the I/O port terminal 503 for data input/output using a predetermined cable are provided at the upper portion of the back of the case 501, the LINE I/O terminal 1L, TEL I/O terminal 1T and the I/O port terminal 503 will come above the portion of the case 501 which supports the back of the TV telephone apparatus 500 even if the apparatus 500 is fully placed in the retaining portion 551a of the case 551. It is therefore possible to mount the TV telephone apparatus 500 on the TV telephone station 550 with the modular plug 203, etc. left connected to the LINE I/O terminal 1L, TEL I/O terminal 1T and the I/O port terminal 503.

As mentioned above, the power supply terminal (not shown) which connects to the power supply terminal 502 provided at the bottom of the TV telephone apparatus 500 is provided at the bottom of the retaining portion 551a of the case 551. When the TV telephone apparatus 500 is placed in the retaining portion 551a of the case 551 of the TV telephone station 550, therefore, the power supply terminals are connected together to supply a DC voltage of a predetermined level to the apparatus 400 from the station 550.

FIG. 26 is a diagram of the power supply circuit portion for explaining the TV telephone apparatus 500 and the power supply circuit of the TV telephone station 550. In FIG. 26, the TV telephone station 550 has an AC-DC converter 552 for converting an AC voltage available at home to a predetermined DC voltage, and a charging circuit 553 for charging a rechargeable battery 551, incorporated in the TV telephone apparatus 500, with the DC voltage from the AC-DC converter 552. Further incorporated in the TV telephone station 500 are a switch 510 for detecting the connection of the TV telephone apparatus 500 to the TV telephone station 550, the rechargeable battery 511, which is charged with the power from the charging circuit 553 of the TV telephone station 550 and supplies the power to the individual sections of the TV telephone apparatus 500 when the apparatus 500 is coupled to the station 550, and a selector 512, which supplies the DC voltage from the AC-DC converter 552 to the individual sections of the apparatus 500 when the connection of the apparatus 500 to the station 550 is detected by a detection signal from the switch 510 and supplies the DC voltage from the rechargeable battery 511 to the individual sections of the apparatus 500 when the disconnection of the apparatus 500 from the station 550 is detected.

The block diagram showing the schematic structure of the TV telephone apparatus 500 is the same as the schematic structural diagram of FIG. 21 for the TV telephone apparatus 400 of the third embodiment, the description of this portion will not be given below.

Then, the operation of the fourth embodiment will now be described.

According to the fourth embodiment, the case 501 of the TV telephone apparatus 500 has a narrow rectangular box shape for good portability, and when the apparatus 500 is mounted on the TV telephone station 550, a DC voltage of a predetermined level can be supplied to the TV telephone apparatus 500 from the station 550 and the rechargeable battery 511 of the apparatus 500 will be charged by the battery function. That is, when the TV telephone apparatus 500 is placed in the retaining portion 551a of the case 551 of the TV telephone station 550, the power supply terminals are connected together to supply a DC voltage of the predetermined level to the apparatus 400 from the station 550, and charging the battery of the apparatus 400 will start when the battery power of the apparatus 400 is low due to the portable usage, without requiring replacement of the rechargeable battery or connection of a power supply adapter to the apparatus 400. While the apparatus 400 is placed on the station 450, the battery will be automatically charged to a sufficient level, thus improving the operability and portability of the apparatus 400.

In this case, the selector 512 supplies the DC voltage from the AC-DC converter 552 to the individual sections of the apparatus 500 when the connection of the apparatus 500 to the station 550 is detected by the detection signal from the switch 510, and supplies the DC voltage from the rechargeable battery 511 to the individual sections of the apparatus 500 when the disconnection of the apparatus 500 from the station 550 is detected.

As the TV telephone apparatus 500 itself, like the TV telephone apparatus 300 of the second embodiment, is very compact and light, the apparatus 500 has an improved portability and can be carried around in a pocket, a bag or the like.

The conventional TV telephone apparatuses have generally been designed as non-portable, and, once the apparatuses are installed, it is not easy to move them around and use them at any desired location. In the conventional TV telephone apparatuses, therefore, a camera section as an image input/output unit, a CRT as an image display unit, and a telephone as a voice input/output unit are designed as one integrated unit. It is therefore difficult to provide portable and lighter TV telephone apparatuses according to the prior art or use the existing telephones in such a TV telephone apparatus. According to the fourth embodiment, however, due to the recent high-quality display technology of LCD devices, a color TFT LCD is employed instead of the CRT for the image display section to make the apparatus considerably compact and light, thus improving the portability and reducing the consumed power. In this case, a compact flat fluorescent tube may be used as the back light in the LCD device so that the LCD 35 can be made flatter, thus significantly contributing to making the apparatus compact and light.

In short, when the TV telephone apparatus 500 is mounted on the TV telephone station 550, a DC voltage of a predetermined level is supplied to the apparatus 500 from the station 550. By simply placing the TV telephone apparatus 400 whose battery power becomes low due to the portable use on the TV telephone station 550, therefore, charging the battery of the apparatus 500 will start without requiring replacement of the rechargeable battery or connection of a power supply adapter to the apparatus 500. While the apparatus 500 is placed on the station 550, the battery will be automatically charged to a sufficient level, thus improving the operability and portability of the apparatus 500.

As the TV telephone apparatus 500 is provided with the telephone function, the apparatus 500 can, by itself, transmit/receive image data and voice data via a telephone line, out of an office or home, thus further contributing to the portable use out of an office or home. In this case, since the LINE I/O terminal 1L, TEL I/O terminal 1T and the I/O port terminal 503 for data input/output using a predetermined cable are provided at the upper portion of the back of the case 501, the LINE I/O terminal 1L, TEL I/O terminal 1T and the I/O port terminal 503 will come above the portion of the case 501 which supports the back of the TV telephone apparatus 500 even if the apparatus 500 is fully placed in the retaining portion 551a of the case 551. It is therefore possible to use the TV telephone apparatus 500 which stays mounted on the TV telephone station 550, so that the user can use the apparatus 500 for a long period of time without worrying about the battery power.

According to the fourth embodiment, the case 551 of the TV telephone station 550 has the telephone retaining portion 551a where the user stably places the TV telephone apparatus 500, tilting at a predetermined angle to provide better view for the user. The TV telephone station 550 is not however limited to this particular design, but may have any structure as long as the station 550 can expand the functions of the TV telephone apparatus 500 when the apparatus 500 is mounted on the station 550.

FIG. 27 is a diagram showing a modification of the fourth embodiment of the present invention. The TV telephone station 550 of the fourth embodiment has a power supply adapter for supplying a DC voltage of a predetermined level to the TV telephone apparatus 500. But, the TV telephone station is not restricted to those this type, but may be any type which expands the functions of the TV telephone apparatus. For instance, the present TV telephone system may be designed as shown in FIG. 27, in which the structure the TV telephone apparatus 300 and the TV telephone station 350 of the second embodiment shown in FIG. 14 may be added with the battery functions of the TV telephone apparatus 500 and the TV telephone station 550 of the fourth embodiment shown in FIG. 24. More specifically, as shown in FIG. 27, an I/O port terminal 311, which connects to an I/O port (not shown) provided in a retaining portion 651a of a case 651 of a TV telephone station 650, is provided at the bottom of a case 601 of a TV telephone apparatus 600, and a power supply terminal 602 for supplying a DC voltage of a predetermined level to the TV telephone apparatus 600 when connected to a power supply (not shown) provided at the retaining portion 651a of the case 651. This design allows sufficient battery charging while image data and voice data are exchanged via the telephone line, thus improving the operability of the TV telephone apparatus.

Fifth Embodiment

FIGS. 28 through 35 illustrate a TV telephone apparatus according to the fifth embodiment of the present invention, with a telephone function incorporated on a TV telephone station which serves as a parent TV telephone apparatus.

First, the structure of the fifth embodiment will be discussed. The following description will be given with reference to the case where an ordinary analog telephone subscriber line is used as a communication line.

FIG. 28 is a diagram showing the connection of a TV telephone system equipped with detachable parent and child TV telephone apparatuses, and FIG. 29 is a diagram showing the connection of the parent TV telephone apparatus. Referring to FIG. 28, the TV telephone system equipped with detachable parent and child TV telephone apparatuses according to the fifth embodiment comprises a portable child TV telephone apparatus 1100 and a parent TV telephone station 1150 incorporates a telephone function and an LCD device. The child TV telephone apparatus 1100 is designed to transmit and receive high-quality images when connected between a telephone line and a telephone, uses an LCD device to become compact and light, and is detachably mounted to the parent TV telephone apparent 1150. The parent TV telephone apparatus 1150 can exchange image data and voice data with the child TV telephone apparatus 1100 over the telephone line in a self-transmission manner.

The child TV telephone apparatus 1100 of a portable type, which is light and compact, incorporates a MODEM and NCU which achieve a telephone function. The TV telephone apparatus 1100 may be carried around to different places and will be connected to the telephone line 1201 or the telephone 1202 at the destination, as needed, as shown in FIG. 28, so that the apparatus 1100 can transmit and receive image data and voice data over the telephone line 1201 by its integrated telephone function.

The child TV telephone apparatus 1100 may be connected between the modular jack type socket 1201 and the telephone 1202, and has, at the back, a LINE I/O terminal 1L to connect to an analog public telephone line and a TEL I/O terminal 1T to connect to the telephone 1202. In this case, the child TV telephone apparatus 1100 has an excellent portability such that when its LINE I/O terminal 1L and TEL I/O terminal 1T are respectively connected to the modular jack type socket 1201 and a telephone 1202 at a location remote from the office or home, the child TV telephone apparatus 1100 can exchange image data and voice data via a telephone line with the parent TV telephone apparatus 1150 which is located at home.

Provided at the bottom of the case 1101 is an I/O port terminal 1112 which connects to an I/O port (not shown) provided in the recess formed in the case 1151 of the parent TV telephone station 1150 (which will be discussed later) as shown in FIGS. 28 and 29. Provided at the bottom of the case 1101 is a power supply terminal 1113, which supplies a DC voltage of a predetermined level to the child TV telephone apparatus 1100 when connected to a power supply terminal (not shown) provided at the retaining portion 1151a of the case 1151 of the parent TV telephone apparatus 1150 (which will be discussed later), as shown in FIG. 28.

As the case 1101 of the child TV telephone apparatus 1100 is designed in a vertically elongated form and is compact and light, the child TV telephone apparatus 1100 can be carried around easily in a pocket on clothes or the like, thus further improving the portability.

The parent TV telephone station 1150 is connectable to the compact, light and portable child TV telephone apparatus 1100. The parent TV telephone apparatus 1150 of this embodiment has an integrated telephone function accomplished by the incorporated MODEM and NCU. When connected between the telephone line 1251 and the telephone 1252 at home, for example, the TV telephone station 1150 will exchange image data and voice data with the child TV telephone apparatus 1150 at a remote place via the telephone line 1251 by the incorporated telephone function. That is, the child TV telephone apparatus 1100 exchanges image data and voice data with the parent TV telephone apparatus 1150 via the telephone line in a self-transmission manner (i.e., without involving another TV telephone intervening between the child TV telephone 1100 and the parent TV telephone apparatus 1150, like a transceiver). The parent TV telephone apparatus 1150 is equipped with a power supply circuit 1175 for supplying a DC voltage of a predetermined level to the parent TV telephone apparatus 1100.

FIG. 30 is a perspective view of the child TV telephone apparatus in FIG. 28. In FIG. 30, the child TV telephone apparatus 1100 has a case 1101 which has a horizontally elongated, narrow rectangular box shape. The case 1101 is 65 mm tall, 60 mm wide and 24 mm deep. A camera section 1102 is attached on the upper left portion of the case 1101 to pick up the image of a target object. The camera section 1102 is a compact CCD camera facing the same way as the display surface of the LCD section 1103. An LCD section 1103 and a key input section 1104 are provided at the front of the case 1101. The LCD section 1103 has a DD 34 and LCD 35, and the key input section 1104 includes a plurality of key switches 10 that an operator uses to select and instruct various processes for the child TV telephone apparatus 1100, as shown in FIG. 34. The LCD section 1103 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. The LCD section 1103 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. An operator uses the key input section 1104 to select and instruct various processes for the child TV telephone apparatus 1100.

A power switch 1105 is provided on one side of the case 1101 to turn on or off the main power supply of the child TV telephone apparatus 1100.

Provided at the top of the case 1101 are a volume dial 1106 for adjusting the volume of voice, an earphone terminal 1107, a selector switch 1108 for switching one mode to another, a tuning button 1109, and a power indicter 1110 which indicates the ON/OFF state of the main power supply. The volume dial 1106 serves to adjust the volume of a voice coming through an earphone, and the selector switch 1108 switches one mode to another. The earphone terminal 1107 is a terminal to which the earphone serving as an antenna wire is connected and which itself serves as an antenna terminal. The tuning button 1109 is used to change the tuning frequency. The power indicter 1110 indicates the ON/OFF state of the main power supply of the child TV telephone apparatus 1100 that is established by the power switch 1105.

Provided at the bottom of the case 1101 is an I/O port terminal 1112 to connect to an I/O port terminal 1350 provided at a recessed portion 1151a of a case 1151 of the parent TV telephone station 1150, which will be discussed later.

Provided at the upper portion of back of the case 1101 are the LINE I/O terminal 1L and the TEL I/O terminal 1T and an I/O port terminal 1111 that ensures data input/output over a predetermined cable, as shown in FIG. 31.

FIG. 32 is a perspective view of the parent TV telephone apparatus in FIG. 29. In FIG. 32, the case 1151 of the parent TV telephone station 1150 has a telephone retaining portion 1151a where the user stably places the child TV telephone apparatus 1100, tilting at a predetermined angle to provide better view for the user. The retaining portion 1151a has a shape slightly larger in width and depth than the case 1101 of the child TV telephone apparatus 1100 so that when the child TV telephone apparatus 1100 is placed in this portion 1151a, the apparatus 1100 can stand upright with slight inclination. The portion of the retaining portion 1151a which supports the back of the case 1101 extends upward by a predetermined distance. By placing the bottom of the child TV telephone apparatus 1100 in the retaining portion 1151a of the case 1151 of the parent TV telephone station 1150, therefore, the child TV telephone apparatus 1100 will be mounted on the parent TV telephone station 1150 as shown in FIG. 33.

In this case, since the LINE I/O terminal 1L, TEL I/O terminal 1T and the I/O port terminal 1111 for data input/output using a predetermined cable are provided at the upper portion of the back of the case 1101, the LINE I/O terminal 1L, TEL I/O terminal 1T and the I/O port terminal 1111 will come above the portion of the case 1101 which supports the back of the child TV telephone apparatus 1100 even if the apparatus 1100 is fully placed in the retaining portion 1151a of the case 1151. It is therefore possible to mount the child TV telephone apparatus 1100 on the parent TV telephone station 1150 with the modular plug 1203, etc. left connected to the LINE I/O terminal 1L, TEL I/O terminal 1T and the I/O port terminal 1111.

The I/O port (not shown), which connects the power supply terminal (not shown) which connects to the I/O port terminal 1112 provided at the bottom of the child TV telephone apparatus 1100, and the power supply terminal 502, which connects to the power supply terminal 1113 provided at the bottom of the child TV telephone apparatus 1100, are both provided at the bottom of the retaining portion 1151a of the case 1151. When the child TV telephone apparatus 1100 is placed in the retaining portion 1151a of the case 1151 of the parent TV telephone station 1150, therefore, the I/O ports are connected together to ensure data exchange between the child and parent TV telephone apparatuses 1100 and 1150 and the power supply terminals are connected together to supply a DC voltage of a predetermined level to the child TV telephone apparatus 1100 from the power supply circuit 1175 of the parent TV telephone apparatus 1150.

A camera section 1152 is attached on the upper left portion of the case 1151 to pick up the image of a target object. The camera section 1152 is a compact CCD camera facing the same way as the display surface of the LCD section 1153.

An LCD section 1153 is provided at the front of the retaining portion 1151a of the case 1151. The LCD section 1153 has a DD 1034 and LCD 1035, described later. Like the LCD section 1103 of the child TV telephone apparatus 1100, this LCD section 1153 is equipped with, for example, a TFT type active matrix LCD device having a screen size of 1.4 inches. The LCD section 1153 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form.

A key input section 1154 is provided at the front of the case 1151 to allows an operator to select and instruct various processes for the parent TV telephone apparatus 1150. The operator uses the key input section 1154 to select and instruct various processes for the parent TV telephone apparatus 1150.

Provided at one side of the case 1151 are a power switch 1155 to turn on or off the main power supply of the parent TV telephone apparatus 1150 and a volume dial 1156 for controlling the volume of voices. The volume dial 1156 serves to adjust the volume of a voice coming through an earphone.

Provided at the front of the case 1151 are an earphone terminal 1157, a selector switch 1158 for switching one mode to another, a tuning button 1159, and a power indicter 1160 which indicates the ON/OFF state of the main power supply. The selector switch 1158 switches one mode to another. The tuning button 1159 is used to change the tuning frequency. The power indicter 1160 indicates the ON/OFF state of the main power supply of the parent TV telephone apparatus 1150 that is established by the power switch 1155.

Provided at the back of the case 1150 are the aforementioned LINE I/O terminal IL and TEL I/O terminal 1T, a pin terminal 1161 for receiving and sending a video signal, pin terminals 1162 and 1163 for receiving and sending a voice signal, a VHF antenna terminal 1164 for receiving a VHF signal, a UHF antenna terminal 1165 for receiving a UHF signal, an S terminal 1166 for receiving and sending a video signal, and a power cord (not shown), as shown in FIG. 32. That is, the I/O terminals 1L and 1T are provided at the back of the case 1151, so that the parent TV telephone apparatus 1150 intervenes between the modular jack type socket 1251 and the telephone 1252 (FIG. 29) and is connected therebetween by the modular cables 1254 having the modular plugs 1253.

In this case, since the parent TV telephone apparatus 1150 is designed on the premise that it is left home or the like, the LINE I/O terminal 1L and TEL I/O terminal 1T of the parent TV telephone apparatus 1150 may always stay connected respectively to the telephone line 1251 and telephone 1252 at home. With this connection, data exchange between the child TV telephone apparatus 1100 and the parent TV telephone apparatus 1150 can be accomplished by connecting the I/O terminal of this child TV telephone apparatus 1100 to a telephone line at a remote location.

FIG. 34 is a block diagram schematically showing the structure of the child TV telephone apparatus 1100 shown in FIG. 30. The same reference numerals as used for the circuit components of the third embodiment in FIG. 21 will be used in FIG. 34 to denote the corresponding or identical components, so that their description will not be repeated below. The CPU 1016 outputs various control signals over the bus 15 to the individual sections of the child TV telephone apparatus 1100 to control those sections, and runs a communication control program according to the type of the communication line to be linked. The CPU 1016 receives multiplexed image data and voice data from the TV telephone apparatus) at the linked end, including the parent TV telephone apparatus 1150, demodulates those data in a MODEM section 14. The CPU 1016 separates the demodulated image data and voice data from each other, and sends compressed image data to an image compressing/expanding circuit 19 via the bus 15 while sending compressed voice data to a voice compressing/expanding circuit 27 via the bus 15. In this case, the CPU 1016 may directly receive image data and voice data, sent from the parent TV telephone apparatus 1150, via the I/O port 1050 when the child TV telephone apparatus 1100 is mounted on the parent TV telephone apparatus 1150. Further, the CPU 1016 multiplexes the compressed image data sent from the image compressing/expanding circuit 19 via the bus 15 and the compressed voice data sent from the voice compressing/expanding circuit 27 via the bus 15, and outputs the multiplexed image data and voice data to the MODEM section 14 of the TV telephone station 150 via the bus 15.

FIG. 35 is a block diagram schematically showing the structure of the parent TV telephone apparatus 1150 shown in FIG. 32, which has nearly the same structure as the child TV telephone apparatus 1100. No detailed description of the components in FIG. 35 which are designed in the same manner as those in FIG. 34 will be given below. The I/O port 1350 is an I/O mechanism which receives necessary data from outside and sends out data to an external device, such as the child TV telephone apparatus 1100. The controller 1311 comprises a CPU 1316, RAM 1317 and ROM 1318. The CPU 1316 controls the individual sections in the parent TV telephone apparatus 1150 and executes a communication control program according to the type of the communication line to be linked. The CPU 1316 receives multiplexed image data and voice data from the child TV telephone apparatus 1100, and demodulates those data in the MODEM section 1314. The CPU 1316 then separates the demodulated image data and voice data from each other, and sends compressed image data to the image compressing/expanding circuit 1319 of the child TV telephone apparatus 1100 while sending compressed voice data to the voice compressing/expanding circuit 1327. Further, the CPU 1316 multiplexes the compressed image data sent from the image compressing/expanding circuit 1319 of the child TV telephone apparatus 1100 and the compressed voice data sent from the voice compressing/expanding circuit 1327 thereof, and outputs the multiplexed image data and voice data to the MODEM section 1314. In this case, when the child TV telephone apparatus 1100 is placed on the parent TV telephone apparatus 1150, the CPU 1316 performs control to exchange data directly with the child TV telephone apparatus 1100 via the I/O port 1350 and the I/O port 1050 of the apparatus 1100.

Next, the operation of the fifth embodiment will now be described.

First, the operations of the controller 11 of the child TV telephone apparatus 1100 shown in FIG. 34 and the controller 1311 of the parent TV telephone apparatus 1150 shown in FIG. 35 will be discussed.

A program associated with the processing of the CPU 1016 in the controller 11 is stored in the ROM 18 in the controller 11. A program associated with the processing of the CPU 1316 in the controller 1311 is likewise stored in the ROM 1318 in the controller 1311.

It is assumed in the following operational description of the fifth embodiment that the child TV telephone apparatus 1100 exchanges data with the parent TV telephone apparatus 1150 in a self-transmission manner, and that with the parent TV telephone apparatus 1150 left home, the user carries the child TV telephone apparatus 1100 away from home and links this apparatus 1100 at a remote location with the apparatus 1150 at home.

When the parent TV telephone apparatus 1150 is powered off, the LINE I/O terminal 1L and the TEL I/O terminal 1T of the parent TV telephone apparatus 1150 are connected in a through state. Under this condition, a voice signal from the telephone 1252 is output directly to the analog public line via a path from the TEL I/O terminal 1T to the LINE I/O terminal 1L, while a voice signal input from the analog public line is input directly to the telephone 1252, passing through a path from the LINE I/O terminal 1L to the TEL I/O terminal 1T.

When the parent TV telephone apparatus 1150 is powered on, the voice signal from the telephone 1252 is input to the parent TV telephone apparatus 110 from the TEL I/O terminal 1T, is temporarily converted to a digital signal by the ADC 1321, and then compressed through a predetermined compressing process in the voice compressing/expanding circuit 1327. The compressed signal is then output on the bus 1315. The voice signal on the bus 1315 is then synthesized with the image signal by the CPU 1316, and the resultant signal is modulated by the MODEM 1330 and NCU 1331 of the parent TV telephone apparatus 1150 before being sent to the LINE I/O terminal 1L.

The input signal coming through the LINE I/O terminal 1L from the analog public line is demodulated by the MODEM 1330 and NCU 1331, and the demodulated signal is then converted to a digital signal by a DSP in the MODEM 1330. The digital signal is output on the bus 1315 and is then separated into an image signal and a voice signal by the CPU 1316. The voice signal is expanded by the voice compressing/expanding circuit 1327 and is then converted to an analog signal by the DAC 1324 before being output to the TEL I/O terminal 1L.

As mentioned above, the child TV telephone apparatus 1100 is characterized by its ability to exchange data with the parent TV telephone apparatus 1150 in a self-transmission manner. A description will thus be given of the operation for data exchange between the child TV telephone apparatus 1100 at a remote location and the parent TV telephone apparatus 1150 left home, as viewed from the child TV telephone apparatus 1100.

Before executing data exchange between the child TV telephone apparatus 1100 at a remote location and the parent TV telephone apparatus 1150 left home, both TV telephone apparatuses 1100 and 1150 should be connected to a predetermined telephone line and telephones and should be powered on. In this case, since it is assumed that the parent TV telephone apparatus 1150 is left home, the TV telephone apparatus 1150 can always stay connected to the telephone line 1251 and telephone 1252. With this connection, even data exchange with the child TV telephone apparatus 1100 can be accomplished by simply connecting this child TV telephone apparatus 1100 to the telephone line or like at a remote location.

After powering on the parent and child TV telephone apparatuses 1150 and 1100, the operator lifts the receiver of the telephone 1202 to set an OFF hook state, and dials the telephone number of the intended party. As a result, the NCU 31 generates dial tones.

When the communication line is connected, the following transmission process and reception process will be executed. In the transmission process and reception process, the parent and child TV telephone apparatuses 1150 and 1100 of the fifth embodiment execute the image processing and voice processing in parallel. In the following description, therefore, the transmission process will be separately discussed for an image transmission process and a voice transmission process, and the reception process will be separately discussed for an image reception process and a voice reception process.

In the image transmission process, image data picked up by the camera section 1102 of the child TV telephone apparatus 1100 is stored via the ADC 21 into the video memory 22 and the image data in the video memory 22 is compressed through a predetermined compressing process by the image compressing/expanding circuit 19. The compressed image data is output to the MODEM section 14 via the bus 15, and is then transmitted to the communicating destination. To record a self image (transmission image) which is displayed on the LCD 35 during talking, the operator should depress the image recording switch among the key switches 10, causing the image data to be stored in the video memory 23. Since the amount of one screen of image data is 211200 bits (about 25.8 Kbytes), the video memory 23, if having a capacity of 256 Kbytes, can store about nine to ten screens of image data. As one screen of compressed image data is 14400 bits (about 1.76 Kbytes), the RAM 17 should have an image-data storing area of about 18 Kbytes to store ten screens of compressed image data.

In the voice transmission process, the voice data input from the receiver of the telephone 1202 is sent to the ADC 26 of the child TV telephone apparatus 1100 via the MODEM section 1314 of the parent TV telephone apparatus 1150 and the I/O ports 1350 and 1050. The voice data is compressed through a predetermined compressing process by the voice compressing/expanding circuit 27. The compressed voice data is sent via the bus 1315 to the MODEM 1330 in the MODEM section 1314 of the parent TV telephone apparatus 1150, and is transmitted to the communicating destination via the NCU 1331 and the I/O terminal 1L.

In the image reception process, the MODEM section 1314 in the parent TV telephone apparatus 1150 determines whether or not there is an image reception signal. When there is an image reception signal, the demodulated image data is sent via the I/O port 1350 and the bus 1315 to the image processor 1312 where the received image data is expanded by the image compressing/expanding circuit 1319. Then the expanded image data is stored in the video memory 1323, and is output via the DAC 1324 to the LCD section 1153 so that it is displayed on the LCD 1335. To record the image of the communicating party (reception image) which is displayed on the LCD 1335 during talking, the operator should depress the image recording switch 154 for image recording, causing the image data to be stored in the video memory 1323. Since the amount of one screen of image data is about 25.8 Kbytes, the video memory 23, if having a capacity of 256 Kbytes, can store about nine to ten screens of image data, as mentioned above. The video memory 23 may be separated to provide an area for three screens for transmission and an area for seven screens for reception.

In the voice reception process, the MODEM section 1314 in the parent TV telephone apparatus 1150 determines whether or not there is a voice reception signal. When there is a voice reception signal, the demodulated voice signal is sent to the voice processor 1313. The received voice data is sent over the bus 1315 to the voice compressing/expanding circuit 1327 to be expanded. Then the expanded voice data is output via the NCU 1331 in the MODEM section 1314 via the DAC 1329, and a voice is output to the telephone 1202 via the I/O terminal 1T. The above-described transmission and reception processes are repeatedly executed until the receiver of the telephone 1202 is replaced (ON hook state).

According to the fifth embodiment, the image data and voice data compressed by the MODEM section 14 of the child TV telephone apparatus 1100 are simultaneously transmitted, and one screen of image data (211200 bits) to be displayed on the LCD 35 are divided into three blocks based on the data compression ratio (about 7/100) in the image compressing/expanding circuit 19 and the image-data transfer rate (4800 bps) of the MODEM section 14, thus allowing for transmission of a high-quality image over the analog public line. As the LCD 35 has a screen size of 3 inches and one screen has data of 110×160 pixels×12 bits (4096 colors)=211200 bits, image data is transmitted one frame every three seconds, but the time for transmitting one screen of image data is altered in accordance with a change in the number of pixels and the number of colors (gray scales) per screen.

Suppose that, in normal mode, image data in 4096 colors is transmitted, while in high image-quality mode, image data is displayed in 65536 colors (16 bits) with the same number of pixels (110×160 pixels). To transmit image data in high image-quality mode, the amount of one screen of image data, which is 110×160×16=281600 bits (about 34.4 Kbytes), becomes 19200 bits after compression to about $68/1000$ in the image compressing process, and an intermittent still picture is transmitted one frame per time that is obtained by dividing 19200 bits by the number of bits (4800 bits) that can be transmitted per second, i.e., 19200÷4800=4 seconds. In this case, therefore, image data of 70400 bits (about 8.6 Kbytes), obtained by dividing 281600 bits by 4, is compressed to about $68/1000$ to become an image code that includes 4800 bits of image data as shown in FIG. 9.

The processing of the child TV telephone apparatus 1100 to communicate with the parent TV telephone apparatus 1150 or the processing of the parent TV telephone apparatus 1150 to communicate with the child TV telephone apparatus 1100 conform to the processing of the TV telephone apparatus 100 and TV telephone station 150 of the first embodiment to communicate with another TV telephone apparatus, i.e., the processing illustrated in FIGS. 9 through 12 and described referring to those diagrams.

As described above, the TV telephone system according to the fifth embodiment comprises the portable child TV telephone apparatus 1100, which has an integrated telephone function, can transmit and receive high-quality images when connected between a telephone line and a telephone, and uses an LCD device to become compact and light, and the parent TV telephone station 1150, which incorporates a telephone function and an LCD device and can exchange image data and voice data with the child TV telephone apparatus 1100 over the telephone line in a self-transmission manner. Even if there is no TV telephone apparatus provided at a remote location, the user can bring the child TV telephone apparatus 1100 there and can use it as a TV telephone to communicate with the parent TV telephone apparatus 1150 in a self-transmission manner (like a transceiver).

Sixth Embodiment

FIGS. 36 and 37 illustrate a TV telephone apparatus according to the sixth embodiment of the present invention, which has an incorporated pager function.

First, the structure of the sixth embodiment will be discussed. The same reference numerals as used for the components of the TV telephone apparatus in FIG. 30 will be used for the sixth embodiment to denote the corresponding or identical components, so that their description will not be repeated below.

FIG. 36 presents a perspective view of a TV telephone apparatus with an incorporated pager function, and corresponds to FIG. 30 of the fifth embodiment. In FIG. 36, a TV telephone apparatus 1400 with a pager function has a case 1401 which has a horizontally elongated, narrow rectangular box shape of the same size as that of the child TV telephone apparatus 1100 in FIG. 30 of the fifth embodiment. A camera section 1102 is attached on the upper left portion of the case 1401 to pick up the image of a target object. An LCD section 1103, a key input section 1104, an indicator 1403 and a buzzer 1404 are provided at the front of the case 1401. The latter two elements 1403 and 1404 inform an incoming call from another party. The LCD section 1103 has a DD 1034 and LCD 1035. The key input section 1402 includes a plurality of key switches 10 that an operator uses to select and instruct various processes for the child TV telephone apparatus 1400 with a pager function. A part of the key input section 1402 serves as a switch 1402a which stops the ringing sound of the buzzer 1404 when a call from another party is received through the pager function. The indicator 1403, constituted of an LED, blinks when there is an incoming call from another party and will stay blinking so that, even if the call has not been answered, the user can confirm later that there was a call. The buzzer 1404 generates a predetermined calling tone when called, to inform the user of the telephone call. In this case, when a silent function is set to indicate an incoming call by flickering of the indicator 1403 alone, no calling tone will be generated.

A power switch 1405 is provided on one side of the case 1401. The power switch 1405 consists of a power ON/OFF switch to enable or disable all the functions of the main body of the child TV telephone apparatus 1400 equipped with a pager function, such as the TV receiving function and TV telephone function, and a reception-mode ON/OFF switch which enables only the pager function to always receive a call from another party. The function of the power switch 1405 is separated to the main power ON/OFF switching and the reception-mode ON/OFF switching, so that power dissipation in reception mode can be minimized. It is important that the child TV telephone apparatus 1400 with a pager function can be called anytime while the user is carrying it around. When the reception-mode ON/OFF switch is set on, no power will be supplied the LCD 1035, which consumes power greatly, and other circuits than a pager section 1420, thus reducing the power consumption.

Provided at the top of the case 1401 are a volume dial 1106 for adjusting the volume of voice, an earphone terminal 1107, a selector switch 1108 for switching one mode to another, a tuning button 1109, a power indicter 1110a which indicates the ON/OFF state of the main power supply and a power indicter 1110b which indicates the ON/OFF state of the reception mode when the pager function is used. LEDs of different display colors (e.g., red and green LEDs) are used for those power indicators 1110a and 1110b so that the user can easily see the power ON/OFF state by the colors.

Provided at the upper portion of back of the case 1401 are the LINE I/O terminal 1L and the TEL I/O terminal 1T and an I/O port terminal 1111 (not shown) that ensures data input/output over a predetermined cable, as in the child TV telephone apparatus 1100 shown in FIG. 31.

Provided at the bottom of the case 1401 is an I/O port 1112 which connects to an I/O port (not shown) provided in a recess in the case 1151 of the parent TV telephone apparatus 1150 that can transmit and receive image data and voice data, as in the child TV telephone apparatus 1100 shown in FIG. 31. Provided at the bottom of the case 1401 is a power supply terminal 1113, which supplies a DC voltage of a predetermined level to the child TV telephone apparatus 1400 with a pager function when connected to a power supply terminal (not shown) provided at the retaining portion 1151a of the case 1151 of the parent TV telephone apparatus 1150.

The parent TV telephone apparatus 1150, which can be coupled to the child TV telephone apparatus 1400 with a pager function, may be of the same type as the parent TV telephone apparatus 1150 of the fifth embodiment. When connected between the telephone line 1251 and the telephone 1252 at home, for example, the parent TV telephone apparatus 1150 will exchange image data and voice data with the child TV telephone apparatus 1400 at a remote place via the telephone line 1251 by the incorporated telephone function. In this case, before starting data exchange with the child TV telephone apparatus 1400 at a remote place, it is necessary to inform this child TV telephone apparatus 1400 that communication is about to start. In the sixth embodiment, therefore, the child TV telephone apparatus 1400 will be called from home utilizing the pager function of the child TV telephone apparatus 1400 to be ready to start data exchange. Thereafter, the child TV telephone apparatus 1400 with a pager function exchanges image data and voice data with the parent TV telephone apparatus 1150 via the telephone line in a self-transmission manner (i.e., without involving another TV telephone intervening between the child TV telephone 1400 and the parent TV telephone apparatus 1150, like a transceiver).

FIG. 37 presents a block diagram showing the general structure of the TV telephone apparatus with a pager function. In the description of the sixth embodiment, the same reference numerals as used for the TV telephone apparatus 1100 of the fifth embodiment shown in FIG. 34 will be used to denote the corresponding or identical components in order so that repeating their redundant description will be avoided. Referring to FIG. 37, the child TV telephone apparatus 1400 with a pager function comprises the camera section 1102, LCD section 1103, controller 11, image processor 12, voice processor 13, MODEM section 14, pager section 1420, and I/O port 50. The key input section 1402, controller 11, 10 image processor 12, voice processor 13, LCD section 14, pager section 1420 and I/O port 1051 are connected together by the bus 15. Therefore, the child TV telephone apparatus 1400 with a pager section is the child TV telephone apparatus 1100 of the fifth embodiment to which the pager section 1420 is added.

The key input section 1402 comprises a plurality of key switches 10 including the switch 1402a to stop the calling tone from the buzzer 1404. The operator can selectively instruct various processes of the child TV telephone apparatus 1400 with a pager function.

The pager function 1420 includes an antenna 1421, a receiving section 1422, a decoder section 1423, an ID-ROM 1424, the switch 1402a, a CPU 1425, a ROM 1426, a RAM 1427, a display buffer 1428, a driver 1429, an LED 1403, the buzzer 1404 and a character generator (CG) 1430.

The antenna 1421 receives a call signal that is transmitted by radio from a pager service company or the like (not shown) and outputs the signal to the receiving section 1422. In response to an intermittent signal coming from the decoder section 1423, the receiving section 1422 intermittently receives the call signal from the antenna 1421, amplifies and demodulates the received signal, and outputs the demodulated signal to the decoder section 1423. The decoder section 1423 refers to the contents of the ID-ROM 1424 where ID numbers have been previously registered to determine if the call number of the call signal coming from the receiving section 1422 matches with the ID number of its own. When there is a match, the decoder section 1423 resumes the signal reception at the receiving section 1422 and outputs a call detection signal to the CPU 1425. Based on a request from the CPU 1425, the decoder section 1423 outputs management information, received together with the call signal, and processing information about the management information, to the CPU 1425. The switch 1402a is provided as one function of the key input section 1402 in FIG. 36. The switch 1402a becomes a stop switch to stop the calling tone from the buzzer 1404 when an incoming call is indicated by the buzzer 1404, and a message sending switch to send a plurality of messages in order when those messages are received.

Connected to the pager CPU 1425 are the ROM 1426 where various control programs are stored, a timer, an input register for holding a key input, and the RAM 1427 for storing the received management information, the keyed-in management information or the like. The RAM 1427 in use has a memory capacity of, for example, 256 Kbytes, and has an address data area, a schedule data area, an ordinary data (memo data) area and an original data area set as a data table. The address data area stores a company name, a name, a telephone number, an address and memos. The schedule data area stores schedule information, the contents of the schedule, an appointment destination, a sender name and memos. The memo data area stores the reception time, the contents of memos and a sender name. The ordinary data area stores the reception time and received data. As the reception time, the time data is read from a timer incorporated in the pager 1 and is stored. The user can freely set the data format in the original data area, and no partition is set in the data area.

Based on various control programs stored in the ROM 1426, the CPU 1425 controls the individual sections of the pager section 1420 in accordance with the management information and processing information about the management information input from the decoder 1423 and an instruction signal input through the key switches 10, stores the received management information or the key-in management information, etc. in the RAM 1427 while outputting a buzzer signal to the buzzer 1404 via the driver 1429 and a lighting signal to the LED 1403 to indicate that there is an incoming call. Further, the CPU 1425 reads a character pattern corresponding to the received management information or the key-in management information from the CG 1429, and outputs the character pattern to the display buffer 1428 to cause the LCD 35 to display the management information. The video input terminal 34a and video output terminal 34b shown in FIG. 34 are not provided for making the apparatus light. Based on address information, the CPU 1425 manages the memory area in the RAM 1427 for management information that is set for each processing mode in order to use the management information to be stored in the RAM 1427 in each processing in each processing mode.

The display buffer 1428 temporarily stores the character pattern input from the CPU 1425, and outputs the character pattern to the DD 1034 of the LCD section 1103 at a given timing to display the management information on the LCD 1035. The driver 1429 amplifies the buzzer signal from the CPU 1425 to generate a buzzer sound from the buzzer 1404, and amplifies the lighting signal from the CPU 1425 to light the LED 1403. The CG 1430 generates a plurality of character patterns to be displayed on the LCD 1035 and outputs the patterns to the CPU 1425 in accordance with a request from the CPU 1425.

Next, the operation of the sixth embodiment will now be described.

It is assumed in the following operational description that the child TV telephone apparatus 1400 with a pager function exchanges data with the parent TV telephone apparatus 1150 in a self-transmission manner, and that with the parent TV telephone apparatus 1150 left home, the user carries the child TV telephone apparatus 1400 with a pager function away from home and links this apparatus 1400 at a remote location with the apparatus 1150 at home, as in the case of the fifth embodiment.

As mentioned above, like the child TV telephone apparatus 1100 of the fifth embodiment, the child TV telephone apparatus 1400 with a pager function according to this embodiment can exchange data with the parent TV telephone apparatus 1150. But, the child TV telephone apparatus 1100 of the fifth embodiment is designed in such a way that while the child TV telephone apparatus 1100 at a remote place can inform the parent TV telephone apparatus 1150 at home of the start of TV telephone communication, the parent TV telephone apparatus 1150 at home cannot inform the child TV telephone apparatus 1100 at a remote place of the start of TV telephone communication. That is, the user should simply connect the child TV telephone apparatus 1100 at a remote place to the telephone line or the like at the remote place (the parent TV telephone apparatus 1150 at home always connected to the telephone line or the like) to start communication from this apparatus 1100, but there is no way to inform the child TV telephone apparatus 1100 at the remote place of the user's intention to start communication from the parent TV telephone apparatus 1150.

The child TV telephone apparatus 1400 with a pager function according to the sixth embodiment is designed so that this apparatus 1400 at a remote place can be called anytime to establish TV telephone communication.

The following description will be given of the case, as an example, where the child TV telephone apparatus 1400 with a pager function at a remote place is called from the parent TV telephone apparatus 1150 to exchange data.

Before the data exchange between the child TV telephone apparatus 1400 with a pager function at a remote place and the parent TV telephone apparatus 1150 at home, either the main power switch of the power switch 1405 of the child TV telephone apparatus 1400 or the reception-mode switch of the power switch 1405 should be set on so that this apparatus 1400 can receive a call. The parent TV telephone apparatus 1150 should be connected to the telephone line 1251 and telephone 1252 at home.

To call the child TV telephone apparatus 1400 at a remote place from the parent TV telephone apparatus 1150 at home to establish TV telephone communication, the child TV telephone apparatus 1400 should be called through the pager function first. More specifically, the user should lift the receiver of the telephone 1252 connected to the parent TV telephone apparatus 1150 to set the OFF hook state and then dial the number of the target child TV telephone apparatus 1400 with a pager function, so that the NCU 31 initiates the transmission.

When the child TV telephone apparatus 1400 with a pager function that the user carries in person receives a call signal transmitted by radio from a pager service company or the like, the buzzer 1404 of the child TV telephone apparatus 1400 generates a buzzer sound and the LED 1403 also flickers. The management information received together with the call signal and the processing information about the management information are temporarily stored in the RAM 1427 of the pager section 1420.

The user of the child TV telephone apparatus 1400 with a pager function will know that the user's machine has been called by the buzzer sound from the buzzer 1404 and/or the flickering of the LED 1403. The buzzer sound from the buzzer 1404 or the flickering of the LED 1403 will be generated or continues for a predetermined time or a predetermined number of times to inform the user of an incoming call. If the user presses the switch 1402a, the buzzer sound from the buzzer 1404 and the flickering of the LED 1403 will be stopped then. Although the buzzer 1404 and the LED 1403 are deactivated by the operation of the switch 1402a in this embodiment, the same may be possible by operating another switch by a simple modification.

During the period from the stop of the buzzer sound from the buzzer 1404 by the operation of the switch 1402a to the establishment of TV telephone communication with the caller by the user of the child TV telephone apparatus 1400, the LCD section 1103 displays the message from the caller (e.g., the telephone number of the telephone 1252 connected to the parent TV telephone apparatus 1150) when the main power ON/OFF switch is set on. In this case, when the user is receiving a TV program, a telop may be displayed on the TV screen if a telop mode has been specified in advance.

When the telop mode is not set by the user, the child TV telephone apparatus 1400 is in use as an electronic camera, or the main power ON/OFF switch is set off (reception-mode ON/OFF switch set on), nothing will be displayed on the LCD section 1103 and a message will be temporarily stored in the RAM 1427 of the pager section 1420 with the LED 1403 left flickering.

With the LED 1403 flickering, the user will know that there has been a call, and if the caller is known, the user should set the main power ON/OFF switch after connecting the telephone line or the like to initiate TV telephone communication. If the caller is unknown or the user wants to check the caller and the transmission content, the user should set the main power ON/OFF switch and operate the switch 1402a to display the message, stored in the RAM 1427, on the LCD section 1103. When there are a plurality of messages in the RAM 1427, the user should operate the switch 1402a every time to display each received message on the LCD section 1103.

Thereafter, the user of the child TV telephone apparatus 1400 which has been called should connect the child TV telephone apparatus 1400 to the telephone line 1201 and telephone 1202 at the remote place or connect the apparatus 1400 to a public telephone having an ISDN terminal, and should switch the selector switch 1108 to the TV telephone function. Then, the user should lift the receiver of the telephone 1202 to set the OFF hook state and dial the telephone number of the caller so that the NCU 31 initiates the transmission.

The transmission process and reception process when the communication line is established are the same as those of the first embodiment.

As the child TV telephone apparatus 1400 of the sixth embodiment is equipped with the pager section 1420, communication with the parent TV telephone apparatus 1150 or the like at home can be initiated from the child TV telephone apparatus 1400 at a remote place, and the child TV telephone apparatus 1400 at a remote place can be called anytime from a plurality of terminals including the parent TV telephone apparatus 1150 at home, in which case the user of the child TV telephone apparatus 1400 can establish communication by connecting the apparatus 1400 to the communication line of a nearby public telephone or the like. Even if there is no TV telephone apparatus provided at a remote location, the user can bring the child TV telephone apparatus 1400 with a pager function there and can use it as a TV telephone to communicate with the parent TV telephone apparatus 1150 at home in a self-transmission manner.

Seventh Embodiment

The seventh embodiment will now be discussed referring to FIGS. 38 through 42 that illustrate a TV telephone apparatus according to the seventh embodiment which is adapted to a TV telephone apparatus equipped with an electronic camera function as an imaging device.

First, the structure of the seventh embodiment will be discussed. The following description will be given with reference to the case where an ordinary analog telephone subscriber line is used as a communication line.

FIG. 38 is a diagram showing the connection of an electronic camera equipped with an image station. Referring to FIG. 38, the electronic camera equipped with an image station according to the seventh embodiment comprises a compact, light and portable electronic camera 2100, and an image station 2150 to which the electronic camera 2100 can be detachably connected and which has a display function to display image data on a home TV set, a printing function to print image data and a data communication function including a TV telephone function. When the electronic camera 2100 is mounted on the image station 2150, this image station 2150 can expand the functions of the electronic camera 2100.

The image station 2150 on which the electronic camera 2100 is mounted is connected between a modular jack type socket 2201 which is connected to an analog public line and a telephone 2202, and has, at the back, a LINE I/O terminal 1L to connect to the analog public telephone line and a TEL I/O terminal 1T to connect to the telephone 2202. The socket 2201 and the LINE I/O terminal 1L or the TEL I/O terminal 1T and the telephone 2202 are connected by a modular cable 2204 that has modular plugs 2203 at both ends. The image station 2150 is connected to a TV set 2250 by a three-terminal cable 2252 having I/O plugs 2251.

The details of the image station 2150 in FIG. 38 are almost the same as the TV telephone station 350 of the second embodiment shown in FIG. 14, with the following portions added thereto.

The lower portion of a case 2151 is a card seal printer section 2151b which prints image data on a card seal 2180. The card seal printer 2151b can print image data, stored in an internal large-capacity memory, on the card seal 2180 in color, and can receive image data from the electronic camera 2100, when placed in a retaining portion 2151a of the image station 2150, and can print the received image data on the card seal 2180 in color.

The retaining portion 2151a at the upper portion of the case 2151 and the card seal printer at the lower portion thereof are rotatably supported by a hinge (not shown) provided at the back of the case 2151. When the front of the retaining portion 2151a is lifted up to open the retaining portion 2151a and the retaining portion 2151a is then turned backward, the inside the case 2151 will be exposed. Disposed inside the case 2151 are a printing section 2191 (to be described later) which can print image data on the card seal 2180 in full colors, a feeding section (not shown) including rubber rollers to feed the printed card seal 2180 out of the card seal printer 2151b, and a tray (not shown) for retaining a plurality of unprinted card seals 2180 (e.g., 20 card seals) as one unit. The card seal 2180 is a special-purpose seal separatably adhered on a card seal paper 2181 as shown in FIG. 38, and a set of, for example, twenty card seals are retained on the tray (not shown).

Provided at the front of the card seal printer 2151b of the case 2151 are a power switch 2152 for turning the main power supply of the image station 2150 on or off, a card seal outlet port 2153 from which the card seal printer 2180 printed on the card seal paper 2181 is output, and a lid 2154 which is to be lifted to cancel jamming of the card seal 2180 upon occurrence. Provided at the front of the retaining portion 2151a of the case 2151 are a plurality of key switches 2155 that the user use to selectively instruct various processes including a card-seal printing process in the image station 2150, and a display section 2156 for displaying the target printing section designated by the operation of the key switches 2155, the number of printouts, the printing state of a card seal, etc.

Provided at the back of the case 2151 are the aforementioned LINE I/O terminal IL and TEL I/O terminal 1T, a pin terminal 2161 for receiving and sending a video signal, pin terminals 2162 and 2163 for receiving and sending a voice signal, a VHF antenna terminal 2164 for receiving a VHF signal, a UHF antenna terminal 2165 for receiving a UHF signal, an S terminal 2166 for receiving and sending a video signal, and a power cord (not shown). That is, the I/O terminals 1L and 1T are provided at the back of the case 2151, so that the image station 2150 intervenes between the modular jack type socket 2201 and the telephone 2202 and is connected therebetween by the modular cables 2204 having the modular plugs 2203.

The I/O plugs 2251 at one end of the three-terminal cable 2252 are connected to those pin terminals 2161, 2162 and 2163, while the I/O plugs 2251 at the other end are connected to external I/O terminals (not shown) of the TV set 2250.

In this case, since the image station 2150 is designed on the premise that it is left home or the like, the LINE I/O terminal 1L and TEL I/O terminal 1T of the image station 2150 always stay connected to the telephone line 2251 and telephone 2252 at home. The pin terminals 2161, 2162 and 2163 of the image station 2150 should also stay connected to the TV set 2250 at home via the three-terminal cable 2252.

With the above structure and connection, by simply mounting the electronic camera 2100 on the image station 2150, the electronic camera 2100 will be connected to the telephone line or the like via the image station 2150 to ensure data exchange with another imaging device that is connected to this electronic camera 2100 via a telephone line or the like. The image data of the electronic camera 2100 can be viewed right away on the large-screen TV set 2250 at home via the image station 2150. In this case, when the electronic camera 2100 and image station 2150 are used as a TV telephone apparatus, the image of the communication destination can be viewed on the large screen.

FIG. 39 is a perspective view of the electronic camera equipped with the image station in FIG. 38. As the schematic structure of the electronic camera 2100 in FIG. 39 is nearly the same as the TV telephone apparatus of the second embodiment shown in FIG. 15, its detailed description will not be given here.

FIG. 40 is a block diagram showing the general structure of the electronic camera. As the structure in really the same as that of the first embodiment, its detailed description will not be given here.

FIG. 41 is a block diagram showing the general structure of the image station. The image station 2150 in FIG. 41 is provided with a printer image processor 2190.

FIG. 42 is a block diagram showing the printer image processor 2190 and the printing section 2191 of the image station 2150 shown in FIG. 41. In FIG. 42, the printer image processor 2190 includes a Y/C separator 2192, a color difference converter 2193, A/D converters 2194 and 2195, a memory 2196, a digital interface 2197 and a YMC converter 2198. The Y/C separator 2192 separates an analog video signal into a luminance signal Y and a color signal C. The color difference converter 2193 converts the color signal C separated by the Y/C separator 2192 to color difference signals (R-Y, B-Y). The A/D converter 2194 converts the luminance signal Y separated by the Y/C separator 2192 to a digital signal. The A/D converter 2195 converts the color difference signals converted by the color difference converter 2193 to digital signals. In this case, although the amount of data of the color difference signal (R-Y) or color difference signal (B-Y) is about a half of the amount of data of the luminance signal Y, the time for converting the color difference signals (R-Y, B-Y) to digital signals is about the same as the time required to convert the luminance signal Y to a digital signal in the A/D converter 2194. The memory 2196 is a semiconductor memory, such as a dual-port RAM, for storing image data to be printed. The digital interface 2197 is an interface circuit for converting an incoming digital video signal to data that can be stored in the memory 2196. For instance, the digital interface 2197 converts a digital signal, input in a predetermined format, in the same format as the digital signal obtained by the aforementioned A/D conversion of the analog video signal, and then stores the data in the memory 2196. The YMC converter 2198 converts the image data, read from the memory 2196, to individual color data, yellow Y, magenta M and cyan C, so that the image data can be printed in full colors by the printing section 2191.

The printing section 2191 is a card seal printer which prints image data on the card seal 2180 based on the individual color data of the yellow Y, magenta M and cyan C, output from the YMC converter 2198. The printing section 2191 in use is a melting type thermal transfer printer which can print image data in full colors on a special-purpose card seal 2180 at a high quality. If a sublimation type thermal transfer printer is used as the printing section 2191, the image density can be varied pixel by pixel to provide the grade scale of the image data at high fidelity by properly controlling the amount of heat from the individual heating elements of the thermal head. Besides the melting type thermal transfer printer and sublimation type thermal transfer printer, an ink-jet printer may be used as a full color printer.

The power supply circuit 2175 serves as a power supply to supplying a predetermined voltage to the individual section of the image station 2150 and also as a power supply adapter for supplying a DC voltage of a predetermined level to the electronic camera 2100.

Then, the operation of the seventh embodiment will be described below.

The electronic camera 2100 and image station 2150 of the seventh embodiment are designed so that the body of the electronic camera 2100 is made compact and light for a portable use and its functions can be expanded when the camera 2100 is mounted on the image station 2150 placed at home or the like.

(1) More specifically, the electronic camera 2100 serves as an electronic still camera which stores plural pieces of image data, picked up by the camera section 2102, in a compressed form, while the image station 2150 serves as a station to expand the functions of the electronic still camera.

The expandable functions the image station 2150 can provide include the following three functions:

a) A monitor function to show image data, sent from the electronic camera 2100, on the large screen of the home TV set 2250 connected to the image station 2150.

b) A function to store image data, sent from the electronic camera 2100, in a large-capacity external memory device 2174 of the image station 2150.

c) A printer function to print image data, sent from the electronic camera 2100, image data, stored in the external memory device 2174, etc. in full colors on the card seal 2180 by the printing section 2191 in the card seal printer 2151b.

The imaging device of the seventh embodiment is characterized by the telephone function, accomplished by the incorporated MODEM and NCU, in addition to the aforementioned functions as an electronic still camera and as a station to expand the functions of the electronic still camera.

(2) The expandable functions the image station 2150 can provide when the telephone function is used, include the following functions:

a) An expansion station function to connect the electronic camera 2100 to the telephone line 2201 and telephone 2202 via the image station 2150.

b) A transmission function to transmit image data, picked by the camera section 2102 of the electronic camera 2100 and processed by the image processor 12, to a TV telephone apparatus (imaging device) of another party linked by the expansion station function, using the incorporated telephone function, and to send voice data to the destination TV telephone apparatus via the connected telephone 2202 using the telephone function.

c) A TV telephone function having a reception function to receive image data, sent from the destination TV telephone apparatus, using the telephone function and display the image data on the LCD section 2103 of the electronic camera 2100 and the TV set 2250 connected to the image station 2150 while receiving voice data, sent from the destination TV telephone apparatus, and generating the speech from the telephone 2202 using the telephone function.

d) A memory function to store image data, sent from the destination TV telephone apparatus, in the large-capacity external memory device 2174 of the image station 2150.

e) A printer function to print image data, sent from the destination TV telephone apparatus, on the card seal 2180 in full colors by the printing section 2191 in the card seal printer 2151b.

The electronic camera 2100 is not limited to a TV telephone apparatus as long as the camera 2100 has a function as an electronic still camera to pick up image data and the image station 2150 can expand the functions of the electronic camera 2100.

(3) Another auxiliary function of the image station 2150 is a power supply function as a power supply adapter for supplying a DC voltage of a predetermined level to the electronic camera 2100.

To use the functions (1), (2) and (3) when the electronic camera 2100 is mounted on the image station 2150, the image station 2150 should remain powered on and should stay connected to the TV set 250 via the three-terminal cable 252 and between the telephone line 2201 and telephone 2202.

With this connection made, simply mounting the electronic camera 2100 on the image station 2150 allows the aforementioned individual functions to be available immediately and the expansion of the functions of the electronic camera 2100.

First, the operations of the controller 11 shown in FIG. 40 and the controller 2170 shown in FIG. 41 will be discussed. The operations of the controllers 11 and 170 will provide the TV telephone function and the electronic camera function. A program associated with the processing of the CPU 16 in the controller 11 is stored in the ROM 18 in the controller 11. The CPU 2171 in the controller 2170 gives control to the CPU 16 in the controller 11 when the electronic camera 2100 is mounted on the image station 2150 and predetermined conditions are satisfied. It is assumed in the following operational description of this embodiment that the electronic camera 2100 is mounted on the image station 2150, which is connected via the three-terminal cable 2252 to the TV set 2250 and between the telephone line 2201 and telephone 2202 by the modular cable 2204.

When the electronic camera 2100 is powered off, the LINE I/O terminals 1L and the TEL I/O terminals 1T of the electronic camera 2100 and the image station 2150 are connected in a through state. Under this condition, a voice signal from the telephone 2202 is output directly to the analog public line via a path from the TEL I/O terminal 1T to the LINE I/O terminal 1L, while a voice signal input from the analog public line is input directly to the telephone 2202, passing through a path from the LINE I/O terminal 1L to the TEL I/O terminal 1T.

When the electronic camera 2100 and image station 2150 are powered on, the voice signal from the telephone 2202 is input to the electronic camera 2100 from the TEL I/O terminal 1T, is temporarily converted to a digital signal by the ADC 21, and then compressed through a predetermined compressing process in the voice compressing/expanding circuit 27. The compressed signal is then output on the bus 15. The voice signal on the bus 15 is then synthesized with the image signal by the CPU 16, and the resultant signal is modulated by the MODEM 30 and NCU 31 of the image station 150 before being sent to the LINE I/O terminal 1L.

The input signal coming through the LINE I/O terminal 1L from the analog public line is demodulated by the MODEM 30 and NCU 31, and the demodulated signal is then converted to a digital signal by a DSP in the MODEM 30. The digital signal is output on the bus 15 and is then separated into an image signal and a voice signal by the CPU 16. The voice signal is expanded by the voice compressing/expanding circuit 27 and is then converted to an analog signal by the DAC 24 before being output to the TEL I/O terminal 1L.

After both the electronic camera 2100 and image station 2150 are powered on, the user lifts the receiver of the telephone 2202 to set an OFF hook state, and dials the telephone number of the intended party. As a result, the NCU 31 generates dial tones.

The basic operations of the electronic camera 2100 and image station 2150 at the time the communication line is established are nearly the same as those of the second embodiment, so that only those portions specific to this embodiment will be discussed below.

Next, the operation of the printer image processor 2190 shown in FIG. 42 will be explained below. The printer image processor 2190 performs an operation to print input image data on the card seal 2180 in full colors by means of the printing section 2191 in the card seal printer 151b. In this case, the input image data is image data that has been sent from the electronic camera 2100, image data that is stored in the external memory device 2174 or data read from an IC card when such is connected to the present system, besides an analog video signal as a video input.

When an analog video signal is input as a video input to the printer image processor 2190, as shown in FIG. 42, the analog video signal is input to the Y/C separator 2192, which separates the analog video signal into a luminance signal Y and a color signal C and outputs the luminance signal Y to the A/D converter 2194. The A/D converter 2194 converts the analog luminance signal Y to a digital signal and outputs the digital signal to the memory 2196 for storage. The color signal C separated by the Y/C separator 2192 is input to the color difference converter 2193, which converts the color signal C separated by the Y/C separator 2192 to color difference signals (R-Y, B-Y) and outputs them to the A/D converter 2195. The A/D converter 2195 converts the received analog color difference signals (R-Y, B-Y) to digital signals and outputs them to the memory 2196 for storage.

When a digital video signal is input to the printer image processor 2190 as in the case where an IC card is coupled to the present system, the digital video signal is input to the digital interface 2197, which in turn converts the digital video signal to data that can be stored in the memory 2196. The memory 2196 stores image data to be printed. When instructed to output predetermined image data by the CPU 2171, the memory 2196 outputs the specified image data to the YMC converter 2198. The YMC converter 2198 converts the image data, read from the memory 2196, to individual color data, yellow Y, magenta M and cyan C, and outputs those data to the printing section 2191, so that the image data can be printed in full colors by the printing section 2191. The printing section 2191 prints image data in full colors on the card seal 2180 based on the individual color data of the yellow Y, magenta M and cyan C, output from the YMC converter 2198.

The card seal 2180 printed in full colors by the printing section 2191 is discharged from the card seal outlet portion 2153 at the front of the card seal printer 2151b as shown in FIG. 38. The card seal 2180 may have the shape of the title section of a video tape where a title or the like is to be described. The card seal 2180 printed in full colors can be separated from the card seal paper 2181 and stuck on the video tape as a title sheet.

As described above, the imaging device according to the seventh embodiment comprises the portable electronic camera 2100 whose case 2101 is formed in a narrow rectangular box shape and which uses the LCD section 2103 to be compact and light, and the image station 2150 which has an integrated telephone function to expand the functions of the electronic camera 2100. The image station 2150 stays connected to the TV set 2250 by the three-terminal cable 252 for video and audio input/output and is equipped with the card seal printer 2151b for printing image data, the external memory device 2174 for storing a vast amount of data and the power supply circuit 2175 for supplying a DC voltage of a predetermined level to the electronic camera 2100. Therefore, simply mounting the electronic camera 2100 on the image station 2150 allows those individual functions to be available immediately and the expansion of the functions of the electronic camera 2100.

Particularly, simply mounting the electronic camera 2100 on the image station 2150 will allow image data, sent from the electronic camera 2100, to be displayed on the large screen of the home TV set 2250 connected to the image station 2150, without requiring troublesome connection of every one of terminals, such as various I/O terminals and a power terminal, and permits immediate printing of the specified image by the card seal printer 2151*b*. Even any person who is not familiar with the connection/disconnection of the terminals can accomplish the proper connection to use the electronic camera 2100 by a very simple work of mounting the electronic camera 2100 on the image station 2150. Therefore, anybody can easily use this electronic camera.

Although the seventh embodiment is adapted for a TV telephone apparatus having an electronic camera function as an imaging device, the seventh embodiment may be used for any apparatus as long as it is equipped with a station that can expand the functions of the portable imaging device.

The compression method for image data is not limited to the JPEG algorithm as employed in the seventh embodiment, but other systems, such as a block coding system, predicted coding system and orthogonal transform coding system, may be used as well. The compression method for voice data is not limited to the aforementioned CELP algorithm used in the seventh embodiment, but other systems, such as AD-PCM (Adaptive Differential Pulse Code Modulation) system and VSELP (Vector Sum Excited Linear Prediction) system may be used as well.

Eighth Embodiment

The eighth embodiment will now be described referring to FIGS. 43 through 50 that illustrate a TV telephone apparatus according to the eighth embodiment which is adapted to a TV telephone apparatus equipped with an electronic camera function.

To begin with, the structure of the eighth embodiment will be discussed. The following description will be given with reference to the case where an ordinary analog telephone subscriber line is used as a communication line.

FIG. 43 is a diagram showing the connection of a TV telephone apparatus equipped with a TV telephone station. Referring to FIG. 43, the TV telephone apparatus equipped with a TV telephone station according to the eighth embodiment comprises a compact, light and portable TV telephone apparatus 3100 and a TV telephone station 3150 to which the TV telephone apparatus 3100 can detachably be mounted and which has a data communication function including an auto-answering function. When the TV telephone apparatus 3100 is mounted on the TV telephone station 3150, this station 3150 will expand the functions of the apparatus 3100. The TV telephone station 3150 where the TV telephone apparatus 3100 is to be mounted, is connected a modular jack type socket 3201, and has a LINE I/O terminal 1L to connect to an analog public telephone line and a TEL I/O terminal 1T to connect to another telephone or facsimile (not shown). The socket 3201 and the LINE I/O terminal 1L are connected by a modular cable 3204 that has modular plugs 3203 at both ends.

Provided at the bottom of the case 3101 is an I/O port terminal 3111 which connects to an I/O port (not shown) provided in the recess formed in the case 3151 of the TV telephone station 3150 as shown in FIG. 43. Provided at the bottom of the case 3101 is a power supply terminal 3112, which supplies a DC voltage of a predetermined level to the TV telephone apparatus 3100 when connected to a power supply terminal (not shown) provided at the retaining portion 3151*a* of the case 3151 of the TV telephone station 3150, as shown in FIG. 43.

In FIG. 43, the TV telephone station 3150 has the shape of a telephone with a handset and the upper portion of its case 3151 is a telephone retaining portion 3151*a* where the user stably places the pocket type TV telephone apparatus 3100, tilting at a predetermined angle to provide better view for the user. The retaining portion 3151*a* has a shape slightly larger in width and depth than the case 3101 of the TV telephone apparatus 3100 so that when the TV telephone apparatus 3100 is placed in this portion 3151*a*, the apparatus 3100 can stand upright with slight inclination. By placing the bottom of the TV telephone apparatus 3100 in the retaining portion 3151*a* of the case 3151 of the TV telephone station 3151, therefore, the TV telephone apparatus 3100 will be mounted on the TV telephone station 3150.

Formed at the bottom of the retaining portion 3151*a* of the case 3151 is an I/O port (not shown) which connects to the I/O port terminal 3111, provided at the bottom of the TV telephone apparatus 3100, and a power supply terminal (not shown) which connects to the power supply terminal 3112 provided at the bottom of the TV telephone apparatus 3100. When the TV telephone apparatus 3100 is placed in the retaining portion 3151*a* of the case 3151 of the TV telephone station 3150, their I/O port terminals 3111 engage with each other to ensure data exchange between the apparatus 3100 and the station 3150. As a result, the TV telephone station 3150 can receive the image data sent from the TV telephone apparatus 3100. Further, as the power supply terminals are connected together, a DC voltage of a predetermined level will be supplied to the TV telephone apparatus 3100 from the power supply circuit 175 of the TV telephone station 3150.

A power switch 3152 for turning the main power supply of the TV telephone station 3150 on or off is provided at the right-hand side of the retaining portion 3151*a* of the case 3151, and a handset 3153 having the transmitter and receiver portions integrated by the grip portion is attached to the left-hand side of the case 3151.

Provided at the front of the retaining portion 3151*a* of the case 3151 are key switches 3154, which include keys for designating various modes of the TV telephone station 3150 (transmission button, reception button, a key for setting an automatic reception mode and an auto-answering mode) and ten keys, and an LCD section 3155 comprising an LCD or the like for displaying the caller number, the time, the talking period, the telephone charge, etc. Reference numeral "3156" is a lid which covers the retaining portion 3151*a* of the case 3151 of the TV telephone station 3150 when the TV telephone apparatus 3100 is detached from this retaining portion 3151*a*.

Provided at the back of the case 3151 are the aforementioned LINE I/O terminal IL and TEL I/O terminal 1T, a pin terminal 3161 for receiving and sending a video signal, pin terminals 3162 and 3163 for receiving and sending a voice signal, a VHF antenna terminal 3164 for receiving a VHF signal, a UHF antenna terminal 3165 for receiving a UHF signal, an S terminal 3166 for receiving and sending a video signal, and a power cord (not shown). That is, with the I/O terminals 1L and 1T provided at the back of the case 3151, the TV telephone station 3150 is connected to the socket modular jack socket 3201 by the modular cables 3204 having the modular plugs 3203 connected to the LINE I/O terminal 1L. In this case, since the TV telephone station 3150 is designed on the premise that it is left home or the like, the LINE I/O terminal 1L of the TV telephone station 3150 should always stay connected to the telephone line 3201 at home.

The I/O plugs at one end of the three-terminal cable are connected to the pin terminals 3161, 3162 and 3163, while the I/O plugs at the other end are connected to the external I/O terminals of a TV set (not shown). The TV telephone station 3150 should also always remain connected to the TV set at home by the three-terminal cable.

FIG. 44 is a perspective view of the TV telephone apparatus FIG. 43. In FIG. 44, the TV telephone apparatus 3100 has a case 3101 which has a horizontally elongated, narrow rectangular box shape and is 65 mm tall, 60 mm wide and 24 mm deep. A camera section 3102 is mounted on the top left portion of the case 3101 to pick up the image of a target object. The camera section 3102 is a compact CCD camera facing the same way as the display surface of the LCD section 3103. An LCD section 3103 and a key input section 3104 are provided at the front of the case 3101. The LCD section 3103 has a DD 34 and LCD 35, and the key input section 3104 includes a plurality of key switches 10 that an operator uses to select and instruct various processes for the TV telephone apparatus 3100, as will be described later with reference to FIG. 46. The LCD section 3103 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. The LCD section 3103 is a TFT type active matrix LCD device having a screen size of 1.4 inches, and is equipped with a high-resolution color LCD panel having a total of 220×279=61380 pixels of which every three pixels corresponding to three primary colors R (Red), G (Green) and B (Blue) are arranged in a delta form. An operator uses the key input section 3104 to select and instruct various processes for the TV telephone apparatus 3100. A power switch 3105 is provided on one side of the case 3101 to turn on or off the main power supply of the TV telephone apparatus 3100.

Provided at the top of the case 3101 are a volume dial 3106 for adjusting the volume of voice, an earphone terminal 3107, a selector switch 3108 for switching one mode to another, a tuning button 3109, and a power indicter 3110 which indicates the ON/OFF state of the main power supply. The volume dial 3106 serves to adjust the volume of a voice coming through an earphone, and the selector switch 3108 switches one mode to another. The earphone terminal 3107 is a terminal to which the earphone serving as an antenna wire is connected and which itself serves as an antenna terminal. The tuning button 3109 is used to change the tuning frequency. The power indicter 3110 indicates the ON/OFF state of the main power supply of the TV telephone apparatus 3100 that is established by the power switch 3105.

Provided at the bottom of the case 3101 is an I/O port (not shown) to connect to an I/O port terminal 3111 provided at a recessed portion 3151a of a case 3151 of the TV telephone station 3150, which will be discussed later.

As the case 3101 of the TV telephone apparatus 3100 is designed in a vertically elongated form and is compact and light, the TV telephone apparatus 3100 can be carried around easily in a pocket on clothes or the like, thus further improving the portability.

The TV telephone station 3150 expands the functions of the compact and light TV telephone apparatus 3100 for a portable use when this apparatus 3100 is mounted on the TV telephone station 3150. The TV telephone station 3150 has a telephone function that is achieved by the incorporated MODEM and NCU and an auto-answering function as expanded functions. The TV telephone station 3150 should remain connected to a telephone line 3201 as shown in FIG. 43. The TV telephone station 3150 further has a power supply circuit 175 (shown in FIG. 46) for supplying a DC voltage of a predetermined level to the TV telephone apparatus 3100. Therefore, simply mounting the TV telephone apparatus 3100 on the TV telephone station 3150 as shown in FIG. 45 allows those functions to be available immediately and the expansion of the functions of the TV telephone apparatus 3100.

With the above structure and connection, by simply mounting the TV telephone apparatus 3100 on the TV telephone station 3150, the TV telephone apparatus 3100 will be connected to the telephone line or the like via the TV telephone station 3150 to ensure data exchange with another TV telephone apparatus that is connected to this TV telephone apparatus 3100 via a telephone line or the like. The image data of the TV telephone apparatus 3100 can be viewed right away on the TV set at home via the TV telephone station 3150. In this case, when the TV telephone apparatus 3100 and TV telephone station 3150 are used as a TV telephone apparatus, the image of the communication destination can be viewed on the large screen of the TV set.

FIG. 46 shows the schematic structure of the TV telephone apparatus 3100 in FIG. 44. As the structure is nearly the same as that of the first embodiment shown in FIG. 9, its detailed description will not be given here.

FIG. 47 shows the schematic structure of the TV telephone station 3150 in FIG. 43. As the structure is nearly the same as that of the first embodiment shown in FIG. 7, only the differences will be discussed below. The handset 3153 has a transmitter 3153a and a receiver 3153b integrated by the grip portion as mentioned earlier. The key switches 3154 include keys for designating various modes of the TV telephone station 3150 (transmission button, reception button, a key for setting an automatic reception mode and an auto-answering mode) and ten keys, and are used to specify the TV telephone processing for the switched mode. The LCD section 3156 displays the caller number, the time, the talking period, the telephone charge, etc. and also displays the auto-answering mode when the mode is switched to such.

A controller 3170 comprises a CPU 3171, RAM 3172 and ROM 3173. The CPU 3171 controls the individual sections in the parent TV telephone station 3150 and executes a communication control program according to the type of the communication line to be linked. When the TV telephone apparatus 3100 is mounted on the TV telephone station 3150, the CPU 3171 receives multiplexed image data and voice data from the TV telephone apparatus of the communication destination, and demodulates those data in the MODEM section 3014. The CPU 3171 then separates the demodulated image data and voice data from each other, and sends compressed image data to the image compressing/expanding circuit 3019 of the TV telephone apparatus 3100 while sending compressed voice data to the voice compressing/expanding circuit 3027 thereof. The ROM 3172 is a semiconductor memory for storing the program, data, etc. which are used by the CPU 3171, voice data to be transmitted, and other data.

A message memory 3174 is a semiconductor memory for storing image data and voice data, which are to be transmitted as a message to the destination when in auto-answering mode, and storing image data and voice data sent from the destination terminal in auto-answering mode. A fast and large-capacity magnetic disk device or magneto-optical disk device, which can store a vast amount of image data, may be used as the message memory 3174 instead of the semiconductor memory.

Then, the operation of the eighth embodiment will be described below.

The TV telephone apparatus 3100 and TV telephone station 3150 of the eighth embodiment are designed so that the body of the TV telephone apparatus 3100 is made compact and light for a portable use and its functions can be expanded when the apparatus 3100 is mounted on the TV telephone station 3150 placed at home or the like. The main expanding functions are the telephone function and auto-answering function.

(1) The expandable functions the TV telephone station 3150 can provide when the telephone function is used, include the following functions:

a) An expansion station function to connect the TV telephone apparatus 3100 to the telephone line 2201 via the TV telephone station 3150.

b) A transmission function to transmit image data, picked by the camera section 3102 of the TV telephone apparatus 3100 and processed by the image processor 12, to a TV telephone apparatus (TV telephone apparatus) of another party linked by the expansion station function, using the incorporated telephone function, and to send voice data from the linked TV telephone apparatus 3100 to the destination TV telephone apparatus using the telephone function.

c) A TV telephone function having a reception function to receive image data, sent from the destination TV telephone apparatus, using the telephone function and display the image data on the LCD section 3103 of the TV telephone apparatus 3100 and the TV set connected to the TV telephone station 3150 while receiving voice data, sent from the destination TV telephone apparatus, and generating the speech from the linked TV telephone station 3150 using the telephone function.

(2) The expandable functions the TV telephone station 3150 can provide when the auto-answering function is used, include the following functions:

a) An expansion station function to connect the TV telephone apparatus 3100 to the telephone line 2201 via the TV telephone station 3150.

b) A transmission function to transmit image data and voice message data, stored in the message memory 3174, to another TV telephone apparatus (TV telephone apparatus) of another party linked by the expansion station function, using the incorporated telephone function, and to send voice message data to the destination TV telephone apparatus in auto-answering function, using the telephone function.

c) A TV telephone function having a reception function to receive image data, sent from the destination TV telephone apparatus, using the telephone function of the TV telephone station 3150, and stores the image data in the message memory 3174 of the TV telephone station 3150 using the telephone function.

(3) Another auxiliary function of the TV telephone station 3150 is a power supply function as a power supply adapter for supplying a DC voltage of a predetermined level to the TV telephone apparatus 3100.

To use the functions (1), (2) and (3) when the TV telephone apparatus 3100 is mounted on the TV telephone station 3150, the TV telephone station 3150 should remain powered on and should stay connected to the telephone line 31201.

With this connection made, simply mounting the TV telephone apparatus 3100 on the TV telephone station 3150 allows the aforementioned individual functions to be available immediately and the expansion of the functions of the TV telephone apparatus 3100.

To begin with, the operations of the controller 3011 shown in FIG. 46 and the controller 3170 shown in FIG. 47 will be discussed. The operations of the controllers 3011 and 3170 will provide the TV telephone function and the electronic camera function. A program associated with the processing of the CPU 3016 in the controller 3011 is stored in the ROM 18 in the controller 11. The CPU 3017 in the controller 3170 gives control to the CPU 3016 in the controller 3011 when the TV telephone apparatus 3100 is mounted on the TV telephone station 3150 and predetermined conditions are satisfied. It is assumed in the following operational description of the eighth embodiment that the TV telephone apparatus 3100 is mounted on the TV telephone station 3150, which is connected via the three-terminal I/O cable to the TV set (not shown) and to the telephone line 3201 by the modular cable 3204.

When the TV telephone apparatus 3100 is powered off, the LINE I/O terminals 1L and the TEL I/O terminals 1T of the TV telephone apparatus 3100 and the TV telephone station 3150 are connected in a through state. Under this condition, a voice signal from the handset 3153 of the TV telephone station 3150 is output directly to the analog public line via a path from the TEL I/O terminal 1T to the LINE I/O terminal 1L, while a voice signal input from the analog public line is input directly to the TV telephone station 3150, passing through a path from the LINE I/O terminal 1L to the TEL I/O terminal 1T.

When the TV telephone apparatus 3100 and TV telephone station 3150 are powered on, the voice signal from the handset 3153 is input to the TV telephone apparatus 3100 from the TEL I/O terminal 1T, is temporarily converted to a digital signal by the ADC 21, and then compressed through a predetermined compressing process in the voice compressing/expanding circuit 27. The compressed signal is then output on the bus 15. The voice signal on the bus 15 is then synthesized with the image signal by the CPU 3016. The resultant signal is modulated by the MODEM 30 and NCU 31 of the TV telephone station 3150 before being sent to the LINE I/O terminal 1L.

The input signal coming through the LINE I/O terminal 1L from the analog public line is demodulated by the MODEM 30 and NCU 31. The demodulated signal is then converted to a digital signal by a DSP in the MODEM 30. The digital signal is output on the bus 15 and is then separated into an image signal and a voice signal by the CPU 3016. The voice signal is expanded by the voice compressing/expanding circuit 27 and is then converted to an analog signal by the DAC 24 before being output to the TEL I/O terminal 1L.

After powering on the TV telephone apparatus 3100 and the TV telephone station 3150, the operator lifts up the receiver 3153b of the handset 3153 to set an OFF hook state, and dials the telephone number of another party. As a result, the NCU 31 generates dial tones.

When the communication line is connected, the following transmission process and reception process will be executed. In the transmission process and reception process, the TV telephone apparatus 3100 and the TV telephone station 3150 of this embodiment execute the image processing and voice processing in parallel. In the following description, therefore, the transmission process will be separately discussed for an image transmission process and a voice transmission process, and the reception process will be separately discussed for an image reception process and a voice reception process.

In the image transmission process, image data picked up by the camera section 3102 is stored via the ADC 21 into the video memory 22 and the image data in the video memory 22 is compressed through a predetermined compressing process by the image compressing/expanding circuit 19. The compressed image data is output to the MODEM section 14 of the TV telephone station 3150 via the bus 15 and the I/O ports 50 and 52, and is then transmitted to the communicating destination. To record a self image (transmission image) which is displayed on the LCD 35 during talking, the operator should depress the image recording switch among the key switches 10, causing the image data to be stored in the video memory 23. Since the amount of one screen of image data is 211200 bits (about 25.8 Kbytes), the video memory 23, if having a capacity of 256 Kbytes, can store about nine to ten screens of image data. As one screen of compressed image data is 14400 bits (about 1.76 Kbytes), the RAM 17 should have an image-data storing area of about 18 Kbytes to store ten screens of compressed image data.

In the voice transmission process, the voice data input from the receiver 3153b of the handset 3153 is sent to the ADC 26 of the TV telephone apparatus 3100 via the MODEM section 14 of the TV telephone station 3150 and the I/O ports 52 and 50. The voice data is compressed through a predetermined compressing process by the voice compressing/expanding circuit 27. The compressed voice data is sent via the bus 15 to the MODEM 30 in the MODEM section 14 of the TV telephone station 3150, and is transmitted to the communicating destination via the NCU 31 and the I/O terminal 1L.

In the image reception process, the MODEM section 14 in the TV telephone station 3150 determines whether or not there is an image reception signal. When there is an image reception signal, the demodulated image data is sent via the I/O ports 50 and 52 and the bus 15 to the image processor 12 where the received image data is expanded by the image compressing/expanding circuit 19. Then the expanded image data is stored in the video memory 23, and is output via the DAC 24 to the LCD section 3103 so that it is displayed on the LCD 35. The expanded image data is also output to the TV set via the I/O port 51 and the three-terminal I/O cable to be displayed on its large screen. To record the image of the communicating party (reception image) which is displayed on the LCD 35 and the display screen of the TV set (not shown) during talking, the operator should depress the image recording switch 10 for image recording, causing the image data to be stored in the video memory 23. Since the amount of one screen of image data is about 25.8 Kbytes, the video memory 23, if having a capacity of 256 Kbytes, can store about nine to ten screens of image data, as mentioned above. The video memory 23 may be separated to provide an area for three screens for transmission and an area for seven screens for reception.

In the voice reception process, the MODEM section 14 in the TV telephone station 3150 determines whether or not there is a voice reception signal. When there is a voice reception signal, the demodulated voice signal is sent to the voice processor 13. The received voice data is sent over the bus 15 to the voice compressing/expanding circuit 27 to be expanded. Then the expanded voice data is output via the NCU 31 in the MODEM section 14 via the DAC 29, and a voice is output to the telephone 3202 via the I/O terminal 1T.

The above-described transmission and reception processes are repeatedly executed until the receiver 3153b of the handset 3153 is replaced to set the ON hook state.

That is, according to the eighth embodiment, the image data and voice data compressed by the MODEM section of the TV telephone apparatus 3100 are simultaneously transmitted, and one screen of image data (211200 bits) to be displayed on the LCD 35 are divided into three blocks based on the data compression ratio (about 7/100) in the image compressing/expanding circuit 19 and the image-data transfer rate (4800 bps) of the MODEM section 14, thus allowing for transmission of a high-quality image over the analog public line. As the LCD 35 has a screen size of 3 inches and one screen has data of 110×160 pixels×12 bits (4096 colors)=211200 bits, image data is transmitted one frame every three seconds, but the time for transmitting one screen of image data is altered in accordance with a change in the number of pixels and the number of colors (gray scales) per screen.

Suppose that, in normal mode, image data in 4096 colors is transmitted, while in high image-quality mode, image data is displayed in 65536 colors (16 bits) with the same number of pixels (110×160 pixels). To transmit image data in high image-quality mode, the amount of one screen of image data, which is 110×160×16=281600 bits (about 34.4 Kbytes), becomes 19200 bits after compression to about 68/1000 in the image compressing process, and an intermittent still picture is transmitted one frame per time that is obtained by dividing 19200 bits by the number of bits (4800 bits) that can be transmitted per second, i.e., 19200÷4800=4 seconds. In this case, therefore, image data of 70400 bits (about 8.6 Kbytes), obtained by dividing 281600 bits by 4, is compressed to about 68/1000 to become an image code that includes 4800 bits of image data.

The processing of the TV telephone apparatus 3100 to communicate with the TV telephone station 3150 or the processing of the parent TV telephone apparatus 3150 to communicate with the child TV telephone apparatus 3100 conform to the processing of the TV telephone apparatus 100 and TV telephone station 150 of the first embodiment to communicate with another TV telephone apparatus, i.e., the processing illustrated in FIGS. 9 through 12 and described referring to those diagrams.

The operation of the auto-answering function will now be described.

FIGS. 48 to 50 are flowcharts for explaining the processes of the TV telephone apparatus 3100 and the TV telephone station 3150 in auto-answering mode.

FIG. 48 shows a flowchart for explaining an operation for setting the sound/image recording of a message. First, it is determined whether or not the voice/image record button is set ON in step S31. When the voice/image record button is set not ON, the flow proceeds to the normal mode (step S32), and when the voice/image record button is ON, it is determined whether or not the system is on line in step S33. That is, when the voice/image record button is ON but not in on line mode, the voice/image recording of the message will be carried out. When it is on line, the flow returns to the previous job to execute the on-line process (step S34). When it is not on line, the image processor 12 is prepared for image compression in step S35, and the voice processor 13 is prepared for voice compression in step S36. Then, a start pilot signal is generated in step S37 to start voice/image recording in step S38. The time for the voice/image recording after the generation of the start pilot signal is set to about 15 to 20 seconds, during which a person who wants to set the auto-answering mode stands in front of the camera section 3102 to pick up his or her image while recording a vocal message.

In step S39, it is determined whether or not voice/image recording is completed. When the voice/image recording is not completed, it is determined whether or not a predetermined time has passed since the beginning of the voice/image recording, thus causing timeout, in step S40 as one way to detect the data overflow of the recording medium. When the predetermined time has not passed yet, the flow returns to step S39 to determined if the voice/image recording is completed. When the voice/image recording is completed, the flow proceeds to step S41 wherein end pilot signal is recorded and then proceeds to step S42 to terminate this routine.

FIG. 49 shows a flowchart for explaining the reception processing. First, it is determined whether or not a ringer is detected in step S51. When a ringer is detected, it is then determined whether or not the operator has set the OFF hook state in step S52. When the operator has set the OFF hook state, the normal processing (see FIGS. 9 through 12) will be executed in step S53. When the operator has not set the OFF hook state yet, it is considered necessary to use the auto-answering function and it is determined if the ringer has rung a predetermined number of times (e.g., five times) in step S54. When the number of ringings is below the predetermined number, the flow returns to step S52.

When the number of ringings reaches the predetermined value, the process enters the auto-answering mode in step S53 and charging will start as in the normal ON hook state. When the mode is not the auto-answering mode, the ringing continues.

In auto-answering mode, first, a prerecorded message is sent in step S56 and the caller's terminal is detected in step S57. The prerecorded message here may be "I'm out right now. Please press the video button for a TV telephone user. For an ordinary telephone user, please wait for a while." As it is not possible for the receiver side to discriminate whether the caller is a TV telephone or an ordinary telephone, such a prerecorded vocal message is sent to the caller so that the TV telephone can be distinguished from the ordinary telephone upon reception of a video ON signal from the caller.

It is determined in step S58 if the caller's terminal is a TV telephone by the transmission of the video ON signal from the caller. The processing will branch to either step S59 or step S65 depending on whether or not the caller's terminal is a TV telephone.

When the caller's terminal is not a TV telephone (i.e., an ordinary telephone), the processing enters the ordinary communication mode in auto-answering mode in step S59, voice reproduction is carried out in step S60 and voice recording starts in step S61. Then, an application-based process (which will be discussed later referring to FIG. 50), such as a remote control, will be executed in step S62. In the subsequent step S63, it is determined if the caller has disconnected the line or a predetermined time has passed so that a timeover has occurred. When the line disconnection by the caller or a timeover has occurred, the flow proceeds to step S64 to terminate this routine. When no line disconnection by the caller or no timeover has occurred, on the other hand, the flow returns to step S62 and the application-based processing will be repeated until the line disconnection by the caller or a timeover actually occurs.

When the caller's terminal is a TV telephone, the processing enters the specific communication mode for a TV telephone in auto-answering mode in step S65, voice/image reproduction is carried out in step S66 and voice/image recording starts in step S67. Then, an application-based process (which will be discussed later referring to FIG. 50), such as a remote control, will be executed in step S68. In the subsequent step S69, it is determined if the caller has disconnected the line or a predetermined time has passed so that a timeover has occurred. When the line disconnection by the caller or a timeover has occurred, the flow proceeds to step S670 to terminate this routine. When no line disconnection by the caller or no timeover has occurred, on the other hand, the flow returns to step S68 and the application-based processing will be repeated until the line disconnection by the caller or a timeover actually occurs.

FIG. 50 presents a flowchart illustrating the operation for an application-based process, which corresponds to the aforementioned steps S62 and S69 in FIG. 49. This program starts when the flow enters step S62 or S69. First, it is determined whether or not a DTMF (Dual Tone Multi-Frequency) tone is detected in step S71. When no DTMF tone is detected, it is considered that the process is not associated with this application-based process and the flow proceeds to the next process in step S72. The DTMF tone is generated by a DTMF circuit (not shown) when there is depression information of a button dial switch. When the DTMF tone is detected, a message is reproduced in step S73 or a message is updated in step S74, or other various controls are executed before the flow returns to step S71. Through the application-based process, remote control may be performed to call the auto-answering machine from a public telephone, for example, and push a predetermined button to monitor the room to listen to the recorded message.

As described above, the TV telephone apparatus according to this embodiment comprises the portable TV telephone apparatus 3100, which uses the LCD section 3103 to be compact and lighter, and the TV telephone station 3150 to which the TV telephone apparatus 3100 can detachably be mounted and which has the integrated auto-answering function to expand the functions of the TV telephone apparatus 3100. The TV telephone station comprises the handset (transmitter and receiver) 3153, the key switches 3154 including keys for setting the auto-answering mode, the LCD section 3155 for displaying the state of the auto-answering mode, the controller 3170, the message memory 3174 for storing image data and voice data to be sent as a message to a caller in auto-answering mode and store image data and voice data sent from the caller in auto-answering mode, the MODEM section 14, the I/O port 52, and the power supply circuit 3175 for supplying a DC voltage of a predetermined level to the TV telephone apparatus 3100. The controller 3170 executes the auto-answering processing illustrated in FIGS. 48 to 50, so that simply mounting the TV telephone apparatus 3100 on the TV telephone station 3150 will permit the immediate use of the auto-answering function, so that a message will be sent to a caller, and receive and record image data and voice data from the caller using the auto-answering function even if the user is not home.

Although the eighth embodiment is adapted for a TV telephone apparatus having an electronic camera function, the eighth embodiment may be used for any TV telephone station on which a portable TV telephone apparatus is mountable and which is equipped with the auto-answering function. The compression method for image data is not limited to the JPEG algorithm as employed in this embodiment, but other systems, such as a block coding system, predicted coding system and orthogonal transform coding system, may be used as well. The compression method for voice data is not limited to the aforementioned CELP algorithm used in this embodiment, but other systems, such as AD-PCM system and VSELP system may be used as well.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A TV telephone system connected to another TV telephone system of a same type through a telephone line, the system comprising, a portable first apparatus including:
   image pickup means for obtaining image data;
   display means for displaying one of the image data obtained from said image pickup means and image data transmitted from said another system;
   memory means for storing one of the image data obtained from said image pickup means and image data transmitted from said another system;
   voice input means for inputting voice data;
   voice output means for outputting voice data; and
   a battery; and a second apparatus including:
   a first terminal for connecting said second apparatus to a telephone line;
   a second terminal for connecting said second apparatus to a telephone;
   modem means for modulating the image data obtained from the image pickup means of said first apparatus and the voice data input by the voice input means of said first apparatus and for transmitting the modulated data to the telephone line, and for demodulating the image data and voice data transmitted from said another system through the telephone line; and
   a power supply for supplying power to said first apparatus;

said second apparatus being electrically and mechanically detachable from said first apparatus; and wherein (i) when said first apparatus, said second apparatus and said telephone are connected with each other, one of the image data obtained from the image pickup means of said first apparatus and the image data of said another system received by said second apparatus is displayed on the display means of said first apparatus, and the battery of said first apparatus is charged by the power supply of said second apparatus, and (ii) when said first apparatus alone is disconnected from said second apparatus, one of the image data obtained from the image pickup means of said first apparatus and the image data stored in the memory means of said first apparatus is displayed on the display means of said first apparatus while said display means of said first apparatus is powered by the battery of said first apparatus.

2. The TV telephone system according to claim 1, wherein:
   said voice input means of said first apparatus receives voice data from a transmitter of the telephone through said second apparatus; and
   said voice output means of said first apparatus causes a receiver of the telephone to output voice data, transmitted from said another system, through the telephone line.

3. The TV telephone system according to claim 1, wherein said second apparatus includes:
   image combining means connected to a home TV set; and
   means for displaying at least one of the image data obtained by the image pickup means of said first apparatus and the image data of said another system transmitted through the telephone line on the home TV set.

4. The TV telephone system according to claim 1, wherein said second apparatus further includes an answer-phone.

5. The TV telephone system according to claim 1, wherein said first apparatus further includes a TV tuner.

6. The TV telephone system according to claim 1, wherein said second apparatus further includes a printer.

7. A TV telephone system connected to another TV telephone system of a same type through a telephone line, comprising, a portable first apparatus including:
   image pickup means for obtaining image data;
   display means for displaying one of the image data obtained from said image pickup means and image data transmitted from said another system;
   memory means for storing one of the image data obtained from said image pickup means and image data transmitted from said another system;
   voice input means for inputting voice data; voice output means for outputting voice data;
   a first terminal for connecting said second apparatus to a telephone line;
   a second terminal for connecting said second apparatus to a telephone; and
   modem means for modulating the image data obtained from said image pickup means and the voice data input by said voice input means and transmitting the modulated data to the telephone line, and for demodulating the image data and voice data transmitted from said another system through the telephone line; and a second apparatus including:
   a power supply for supplying power to said first apparatus; and
   image combining means, connected to a home TV set, for displaying at least one of the image data obtained by said image pickup means of said first apparatus and the image data of said another system transmitted through the telephone line on the home TV set;

said second apparatus being electrically and mechanically detachable from said first apparatus; and wherein (i) when said first apparatus, said second apparatus and said telephone are connected with each other, one of the image data obtained from the image pickup means of said first apparatus and the image data of said another system received by said second apparatus is displayed on the home TV set, and (ii) when said first apparatus is coupled with the telephone, one of the image data obtained from the image pickup means of said first apparatus, the image data stored in the memory means of said first apparatus, and the image data transmitted from said another system through the telephone line is displayed on the display means of said first apparatus.

8. The TV telephone system according to claim 7, wherein said second apparatus further includes an answerphone.

9. The TV telephone system according to claim 7, wherein said first apparatus further includes a TV tuner.

10. The TV telephone system according to claim 1, wherein said second apparatus further includes a printer.

* * * * *